US009357247B2

(12) United States Patent
Cronk et al.

(10) Patent No.: US 9,357,247 B2
(45) Date of Patent: May 31, 2016

(54) APPARATUS AND METHODS FOR CONTENT DELIVERY AND MESSAGE EXCHANGE ACROSS MULTIPLE CONTENT DELIVERY NETWORKS

(75) Inventors: Gary Cronk, Colts Neck, NJ (US); Jonathan Putsch, Westminster, CO (US); James Boutilier, Denver, CO (US); Paul L. Miller, Rochester, NY (US); Michael Dillon, Aldie, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 829 days.

(21) Appl. No.: 12/834,796

(22) Filed: Jul. 12, 2010

(65) Prior Publication Data

US 2012/0011567 A1 Jan. 12, 2012
US 2014/0298418 A9 Oct. 2, 2014

Related U.S. Application Data

(63) Continuation-in-part of application No. 12/536,724, filed on Aug. 6, 2009, now Pat. No. 8,341,242.

(60) Provisional application No. 61/117,265, filed on Nov. 24, 2008, provisional application No. 61/117,248, filed on Nov. 24, 2008.

(51) Int. Cl.
*H04L 9/32* (2006.01)
*G06F 21/24* (2006.01)
(Continued)

(52) U.S. Cl.
CPC ........ *H04N 21/25875* (2013.01); *H04L 63/102* (2013.01); *H04N 21/47202* (2013.01); *H04N 21/6581* (2013.01)

(58) Field of Classification Search
CPC ......... H04L 67/20; H04L 67/14; H04L 63/08; H04L 63/0815; H04L 63/102; G06F 21/6218; G06F 21/00; G06F 21/10
USPC ............ 726/2–10, 21, 26–29; 705/51, 59, 78, 705/902, 904, 908; 709/203, 219, 224, 204; 709/229; 713/168; 725/109
See application file for complete search history.

(56) References Cited

U.S. PATENT DOCUMENTS 5,528,284 A 6/1996 Iwami et al.
5,708,961 A 1/1998 Hylton et al.
(Continued)

FOREIGN PATENT DOCUMENTS

JP A-2005-519365 6/2005
JP A-2005-519501 6/2005
(Continued)

OTHER PUBLICATIONS

Frank Siebenlist et al, "Global Grid Forum Specification Roadmap towards a Secure OGSA", pp. 1-22, Jul. 2002.*
(Continued)

*Primary Examiner* — Shewaye Gelagay
*Assistant Examiner* — Shanto M Abedin
(74) *Attorney, Agent, or Firm* — Gazdzinski & Associates, PC

(57) ABSTRACT

Methods and apparatus for providing protected content to subscribers of a managed (e.g., MSO) network via a content source accessible via an internetwork such as the Internet. In one embodiment, a user accesses a programmer website, and requests content. The programmer determines whether the requesting user is permitted to access the content, and what rights or restrictions are associated with the user. This includes authenticating the user as a subscriber of the MSO, and determining the subscriber's subscription level. In another embodiment, a user's account with the MSO and programmer may be federated, thus a given user will have MSO-specific information regarding its identity (such as login information, GUID, etc.) and/or information regarding subscription level and service details, stored at the programmer. Messages received from the MSO representing permission for the user to access content may also be stored at the programmer site for later reference.

20 Claims, 17 Drawing Sheets

(51) Int. Cl.
  *H04N 21/258* (2011.01)
  *H04L 29/06* (2006.01)
  *H04N 21/472* (2011.01)
  *H04N 21/658* (2011.01)

(56) References Cited

U.S. PATENT DOCUMENTS

| | | |
|---|---|---|
| 5,818,438 A | 10/1998 | Howe et al. |
| 5,897,635 A | 4/1999 | Torres et al. |
| 6,167,432 A | 12/2000 | Jiang |
| 6,181,697 B1 | 1/2001 | Nurenberg et al. |
| 6,219,710 B1 | 4/2001 | Gray et al. |
| 6,259,701 B1 | 7/2001 | Shur et al. |
| 6,519,062 B1 | 2/2003 | Yoo |
| 6,523,696 B1 | 2/2003 | Saito |
| 6,640,145 B2 | 10/2003 | Hoffberg et al. |
| 6,694,145 B2 | 2/2004 | Riikonen et al. |
| 6,788,676 B2 | 9/2004 | Partanen et al. |
| 6,925,257 B2 | 8/2005 | Yoo |
| 6,944,150 B1 | 9/2005 | McConnell et al. |
| 7,006,881 B1 | 2/2006 | Hoffberg et al. |
| 7,009,972 B2 | 3/2006 | Maher et al. |
| 7,027,460 B2 | 4/2006 | Iyer et al. |
| 7,039,048 B1 | 5/2006 | Monta et al. |
| 7,054,902 B2 | 5/2006 | Toporek et al. |
| 7,068,639 B1 | 6/2006 | Varma et al. |
| 7,099,308 B2 | 8/2006 | Merrill et al. |
| 7,106,382 B2 | 9/2006 | Shiotsu |
| 7,149,772 B1 | 12/2006 | Kalavade |
| 7,174,126 B2 | 2/2007 | McElhatten et al. |
| 7,174,127 B2 | 2/2007 | Otten et al. |
| 7,174,385 B2 | 2/2007 | Li |
| 7,209,458 B2 | 4/2007 | Ahvonen et al. |
| 7,242,960 B2 | 7/2007 | Van Rooyen |
| 7,254,608 B2 | 8/2007 | Yeager et al. |
| 7,325,073 B2 | 1/2008 | Shao et al. |
| 7,330,483 B1 | 2/2008 | Peters et al. |
| 7,359,375 B2 | 4/2008 | Lipsanen et al. |
| 7,376,386 B2 | 5/2008 | Phillips et al. |
| 7,457,520 B2 | 11/2008 | Rossetti et al. |
| 7,486,869 B2 | 2/2009 | Alexander |
| 7,592,912 B2 | 9/2009 | Hasek |
| 7,602,820 B2 | 10/2009 | Helms et al. |
| 7,690,020 B2 | 3/2010 | Lebar |
| 7,693,171 B2 | 4/2010 | Gould |
| 7,721,314 B2 | 5/2010 | Sincaglia |
| 7,742,074 B2 | 6/2010 | Minatogawa |
| 7,809,942 B2 | 10/2010 | Baran et al. |
| 7,954,131 B2 | 5/2011 | Cholas et al. |
| 2001/0004768 A1 | 6/2001 | Hodge et al. |
| 2002/0002688 A1* | 1/2002 | Gregg et al. ............ 713/202 |
| 2002/0024943 A1 | 2/2002 | Karaul et al. |
| 2002/0027883 A1 | 3/2002 | Belaiche |
| 2002/0032754 A1 | 3/2002 | Logston et al. |
| 2002/0056125 A1 | 5/2002 | Hodge et al. |
| 2002/0059619 A1 | 5/2002 | Lebar |
| 2002/0066033 A1* | 5/2002 | Dobbins et al. ............ 713/201 |
| 2002/0123931 A1 | 9/2002 | Splaver et al. |
| 2002/0147771 A1 | 10/2002 | Traversat et al. |
| 2002/0152299 A1 | 10/2002 | Traversat et al. |
| 2002/0188744 A1 | 12/2002 | Mani |
| 2002/0188869 A1* | 12/2002 | Patrick .................... 713/201 |
| 2003/0056217 A1 | 3/2003 | Brooks |
| 2003/0097574 A1* | 5/2003 | Upton ..................... 713/183 |
| 2003/0115267 A1 | 6/2003 | Hinton et al. |
| 2003/0135628 A1* | 7/2003 | Fletcher et al. ............ 709/229 |
| 2003/0165241 A1 | 9/2003 | Fransdonk |
| 2003/0166401 A1 | 9/2003 | Combes et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0133923 A1 | 7/2004 | Watson et al. |
| 2004/0137918 A1 | 7/2004 | Varonen et al. |
| 2004/0250273 A1* | 12/2004 | Swix et al. ................ 725/25 |
| 2005/0034171 A1 | 2/2005 | Benya |
| 2005/0049886 A1* | 3/2005 | Grannan et al. ............ 705/1 |
| 2005/0055220 A1 | 3/2005 | Lee et al. |
| 2005/0086683 A1* | 4/2005 | Meyerson ................ 725/30 |
| 2005/0108763 A1 | 5/2005 | Baran et al. |
| 2005/0114701 A1* | 5/2005 | Atkins et al. ............ 713/201 |
| 2005/0114900 A1 | 5/2005 | Ladd et al. |
| 2005/0177855 A1 | 8/2005 | Maynard et al. |
| 2005/0289618 A1 | 12/2005 | Hardin |
| 2006/0020786 A1 | 1/2006 | Helms |
| 2006/0021004 A1 | 1/2006 | Moran et al. |
| 2006/0021019 A1* | 1/2006 | Hinton et al. ............ 726/10 |
| 2006/0047957 A1 | 3/2006 | Helms et al. |
| 2006/0095940 A1 | 5/2006 | Yearwood |
| 2006/0130099 A1 | 6/2006 | Rooyen |
| 2006/0130101 A1 | 6/2006 | Wessel van Rooyen |
| 2006/0130107 A1 | 6/2006 | Gonder |
| 2006/0130113 A1 | 6/2006 | Carlucci et al. |
| 2006/0136964 A1 | 6/2006 | Diez et al. |
| 2006/0149850 A1 | 7/2006 | Bowman |
| 2006/0161635 A1 | 7/2006 | Lamkin et al. |
| 2006/0187900 A1 | 8/2006 | Akbar |
| 2006/0206712 A1* | 9/2006 | Dillaway et al. ............ 713/176 |
| 2006/0209799 A1 | 9/2006 | Gallagher et al. |
| 2006/0218604 A1 | 9/2006 | Riedl et al. |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |
| 2007/0033531 A1 | 2/2007 | Marsh |
| 2007/0049245 A1 | 3/2007 | Lipman |
| 2007/0067851 A1* | 3/2007 | Fernando et al. ............ 726/26 |
| 2007/0094691 A1 | 4/2007 | Gazdzinski |
| 2007/0121678 A1 | 5/2007 | Brooks |
| 2007/0124488 A1 | 5/2007 | Baum et al. |
| 2007/0209054 A1* | 9/2007 | Cassanova ................ 725/100 |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0250880 A1 | 10/2007 | Hainline |
| 2007/0261116 A1 | 11/2007 | Prafullchandra et al. |
| 2007/0276925 A1* | 11/2007 | La Joie et al. ............ 709/219 |
| 2007/0276926 A1* | 11/2007 | LaJoie et al. ............ 709/219 |
| 2007/0288637 A1* | 12/2007 | Layton et al. ............ 709/226 |
| 2008/0021836 A1 | 1/2008 | Lao |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1* | 4/2008 | Strub et al. ................ 709/223 |
| 2008/0133551 A1 | 6/2008 | Wensley et al. |
| 2008/0155059 A1 | 6/2008 | Hardin |
| 2008/0162353 A1 | 7/2008 | Tom et al. |
| 2008/0222684 A1 | 9/2008 | Mukraj et al. |
| 2008/0235746 A1 | 9/2008 | Peters |
| 2008/0273591 A1 | 11/2008 | Brooks |
| 2008/0282299 A1 | 11/2008 | Koat et al. |
| 2009/0083813 A1 | 3/2009 | Dolce et al. |
| 2009/0098861 A1* | 4/2009 | Kalliola et al. ............ 455/414.1 |
| 2009/0100459 A1 | 4/2009 | Riedl |
| 2009/0172776 A1* | 7/2009 | Makagon et al. ............ 726/2 |
| 2009/0185576 A1 | 7/2009 | Kisel et al. |
| 2009/0201917 A1 | 8/2009 | Maes et al. |
| 2009/0210912 A1 | 8/2009 | Cholas |
| 2009/0225760 A1 | 9/2009 | Foti |
| 2009/0282241 A1 | 11/2009 | Prafullchandra et al. |
| 2009/0282449 A1 | 11/2009 | Lee |
| 2009/0293101 A1 | 11/2009 | Carter et al. |
| 2009/0296621 A1 | 12/2009 | Park et al. |
| 2010/0030578 A1 | 2/2010 | Siddique et al. |
| 2010/0042478 A1 | 2/2010 | Reisman |
| 2010/0083329 A1 | 4/2010 | Joyce et al. |
| 2010/0083362 A1* | 4/2010 | Francisco ................ 726/9 |
| 2010/0106846 A1 | 4/2010 | Noldus et al. |

(56) References Cited

U.S. PATENT DOCUMENTS

| | | | |
|---|---|---|---|
| 2010/0131973 A1* | 5/2010 | Dillon et al. | 725/27 |
| 2010/0138900 A1 | 6/2010 | Peterka et al. | |
| 2010/0169977 A1 | 7/2010 | Dasher et al. | |
| 2010/0251305 A1 | 9/2010 | Kimble et al. | |
| 2010/0287609 A1 | 11/2010 | Gonzalez et al. | |
| 2010/0313225 A1 | 12/2010 | Cholas et al. | |
| 2011/0071841 A1 | 3/2011 | Fomenko et al. | |
| 2011/0093900 A1 | 4/2011 | Patel et al. | |
| 2011/0103374 A1 | 5/2011 | LaJoie et al. | |
| 2011/0213688 A1* | 9/2011 | Santos et al. | 705/34 |
| 2011/0219229 A1* | 9/2011 | Cholas et al. | 713/168 |
| 2012/0008786 A1 | 1/2012 | Cronk et al. | |
| 2012/0011567 A1 | 1/2012 | Cronk et al. | |

FOREIGN PATENT DOCUMENTS

| | | |
|---|---|---|
| JP | A-2005-339093 | 12/2005 |
| JP | A-2008-015936 | 1/2008 |
| JP | A-2009-211632 | 9/2009 |
| JP | A-2010-502109 | 1/2010 |
| JP | A-2010-079902 | 4/2010 |
| JP | A-2012-505436 | 3/2012 |
| JP | A-2012-523614 | 10/2012 |
| WO | WO 01/10125 | 2/2001 |
| WO | WO 2005/015422 | 2/2005 |
| WO | WO 2012/021245 | 2/2012 |

OTHER PUBLICATIONS

Security Assertion Markup language (SAML) Specification (Version 2.0 released in 2005), as SAML Core: S. Cantor et al. Assertions and Protocols for the Oasis Security Assertion Markup Language (SAML) V2.0. OASIS Standard, Mar. 2005. Document ID saml-core-2.0-os (http://docs.oasis-open.org/security/saml/v2.0/saml-core-2.0-os.pdf).

Saml Binding: S. Cantor et al. Bindings for the OASIS Security Assertion Markup Language (SAML) V2.0. OASIS Standard, Mar. 2005. Document ID saml-bindings-2.0-os (http://docs.oasis-open.org/security/saml/v2.0/saml-bindings-2.0-os.pdf).

International Search Report dated Oct. 22, 2010 and Written Opinion, Intl. Application PCT/US2010/044756; International Searching Authority: European Patent Office (ISA/EP); 8 pages.

International Preliminary Report on Patentability, Intl. Application PCT/US2010/044756, dated Feb. 16, 2012, 7 pages.

* cited by examiner

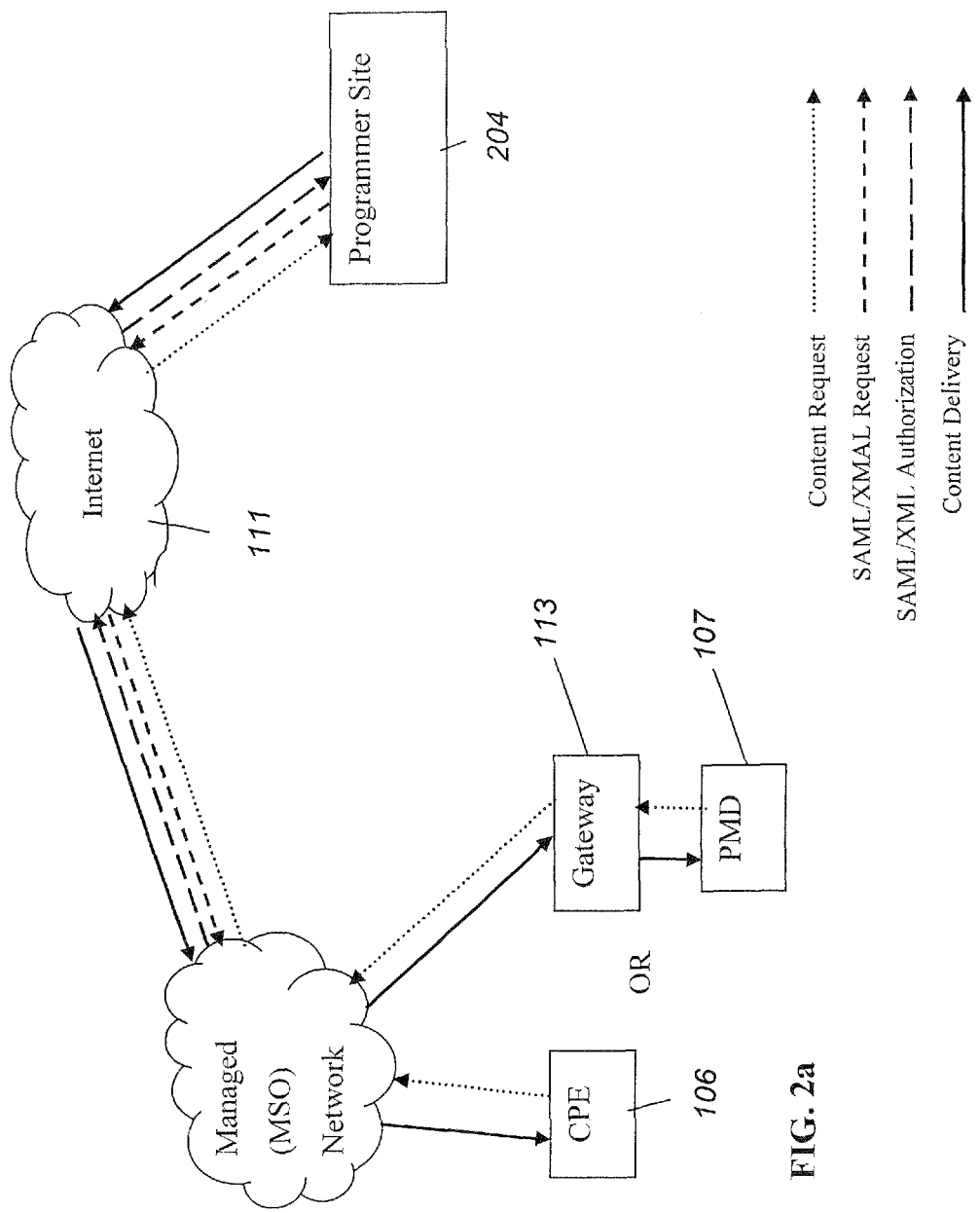

Authorization Service Summary Logging Report by Service (Total and Programmer specific)
- Average total successful service call duration
- Average total successful service call wait
- Percentage wait/duration
- Average total unsuccessful service call duration
- Percentage unsuccessful duration / successful duration
- Number of successful transactions
- Percentage successful transactions
- Number of unsuccessful transactions
- Percentage unsuccessful transactions Authorization Response Summary by Programmer
- PERMIT
- DENY
    - Not Subscribed
    - Fraud Detection
    - Not Part of Trial
- Not Applicable
    - Invalid Programmer
    - Invalid Subscriber
    - Invalid Resource
    - Other
- Indeterminate
    - IDMS Failure
    - CVC Failure
    - ICOMS Failure
    - CSG Failure Authorization Summary - Transaction Volumes by Service By Hour of Day

| QueryEntitlement | TotalTrn | %Trn | Avg Duration |
|---|---|---|---|
| 01:00 | 50000 | 1.82% | 1.3 |
| ......... | ......... | ........% | ..... |
| 24:00 | 10000 | 0.36% | 1.5 |
| Total | 2749000 | 100.00% | 1.2 |

FIG. 9

APPARATUS AND METHODS FOR CONTENT DELIVERY AND MESSAGE EXCHANGE ACROSS MULTIPLE CONTENT DELIVERY NETWORKS

PRIORITY AND RELATED APPLICATIONS

This application is a continuation-in-part of to co-owned, co-pending U.S. patent application Ser. No. 12/536,724, filed on Aug. 6, 2009 and entitled "SYSTEM AND METHOD FOR MANAGING ENTITLEMENTS TO DATA OVER A NETWORK", which is incorporated herein by reference in its entirety, which is now issued as U.S. Pat. No. 8,341,242, and which claims priority to (i) U.S. Provisional Application Ser. No. 61/117,265 filed on Nov. 24, 2008 and entitled "SYSTEM AND METHOD FOR MANAGING ENTITLEMENTS TO DATA OVER A NETWORK" and (ii) U.S. Provisional Application Ser. No. 61/117,248 filed on Nov. 24, 2008 and entitled "SYSTEM AND METHOD FOR MANAGING ENTITLEMENTS TO STORED DATA OVER A NETWORK". This application is related to co-owned U.S. Provisional Application Ser. No. 61/256,903 filed on Oct. 30, 2009 and entitled "METHODS AND APPARATUS FOR PACKETIZED CONTENT DELIVERY OVER A CONTENT DELIVERY NETWORK", and to co-owned, co-pending U.S. patent application Ser. No. 12/834,801 filed concurrently herewith and entitled "APPARATUS AND METHODS FOR CONTENT MANAGEMENT AND ACCOUNT LINKING ACROSS MULTIPLE CONTENT DELIVERY NETWORKS", each of the foregoing which is incorporated herein by reference in its entirety. The present application is further related to co-owned and co-pending U.S. patent application Ser. No. 13/721,154 filed on Dec. 20, 2012 and entitled "SYSTEM AND METHOD FOR MANAGING ENTITLEMENTS TO DATA OVER A NETWORK", which is also incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over one or more networks. More particularly, the present invention is related in one exemplary aspect to apparatus and methods for content delivery and message exchange across these networks.

2. Description of Related Technology

Recent advances in digital information processing and technology have made a whole range of services and functions available for delivery to consumers at various types devices for very reasonable prices or subscription fees. These services and functions include digital content or programming (movies, etc.), digital video-on-demand (VOD), personal video recorder (PVR) and networked PVR (nPVR), Internet Protocol television (IPTV), digital media playback and recording, as well high speed Internet access (including so-called "Internet TV", where television programming is delivered over the Internet without QoS) and IP-based telephony (e.g., VoIP). Other services available to network users include access to, and recording of, digital music (e.g., MP3 files).

Currently, many of these services are provided to the user via a wide variety of different equipment environments and delivery paradigms including, inter alia, cable or satellite modems or QAMs, HFCu (i.e., Hybrid Fiber-copper distribution via indigenous POST/PSTN and/or coaxial wiring in a premises), optical fiber such as FTTC, FTTH, etc., Wi-Fi™ hubs, Ethernet hubs, gateways, switches, and routers, to a plurality of user equipment types. For example, content may be delivered to users at set-top boxes, personal (desktop) computers, laptop computers, other mini-computers (such as so-called "netbooks", mini-notebook computers), and/or other devices. Recent advances in consumer electronics have also led to the widespread introduction of a variety of portable media devices (PMDs) such as, inter alia, portable digital music devices such as the well known Apple iPod™ and other so-called "MP3 players", cellular telephones/smartphones, handheld computers, and personal digital assistants (PDA), which allow users to store and playback audio and video files. Furthermore, many users today wish to view at least some content via the Internet.

Although a myriad of services, equipment, data formats and providers are available, current systems offer no mechanism for a managed network operator (e.g., MSO) to partner with programmers (content producers) in order to allow users who are verified as subscribers of the MSO network to utilize and purchase content from the network (such as via a subscription, pay-per-view, etc.), and to be able to view this content via the Internet or another such external or internetwork via partnered programmer websites.

Hence, methods and apparatus are needed which enable a partnered programmer to, either on its own or through communication with the network operator, determine if an identified potential viewer of Internet content already subscribes to this content through the MSO, and if so provide the content (e.g., according to one or more delivery models associated with the user's subscription). Such methods and apparatus would advantageously enable a user to receive content on any device and via any delivery paradigm, thereby enhancing the user experience by no longer anchoring the user to a fixed location. Ideally, the aforementioned methods and apparatus might also allow users to access real-time and scheduled content from multiple viewing mediums without being restricted to fixed schedules, and further enable users to achieve geographical independence via use of mobile technology which provides enhanced flexibility over traditional means of video distribution. Furthermore, the ideal solution would include enhanced access to premium-based content which not available to non-subscribers, or which cannot be delivered across traditional transport (i.e., behind the scenes outtakes, alternate endings, actor interviews, etc.).

SUMMARY OF THE INVENTION

The present invention addresses the foregoing needs by disclosing, inter alia, apparatus and methods for content management and message exchange between entities of two networks.

In a first aspect of the invention, a method for determining content permission(s) is disclosed. In one embodiment, the determination is made at a content distribution network entity, and the permission relates to access of protected content from a remote source via an internetwork (e.g., the Internet). In one variant, the method comprises: receiving at the network entity a communication relating to a request for the protected content from a user device, the communication being sent to the content distribution network entity from an entity associated with the remote source; determining whether the user device is associated to the subscriber of the content distribution network; if the user device is associated to the subscriber, determining whether the protected content is within an approved level of service of the subscriber; and if the protected content is within the approved level of service of the subscriber, transmitting a message to the entity associated with the remote source, the message causing the remote source to deliver the protected content to the user device.

In a second aspect of the invention, an apparatus for managing delivery of a plurality of protected content from a remote device is disclosed. In one embodiment, the remote device comprises a content server, and the apparatus comprises: at least one first interface for receiving a plurality of information from a user device, the information comprising: information identifying a user of the user device; and information identifying a particular one of the plurality of protected content requested by the user; a first computer program configured to utilize the information identifying the user to determine whether the user is among the plurality of entitled users; a second computer program configured to utilize the information identifying the user and the information identifying the particular one of the plurality of protected content to determine whether the particular one of the plurality of protected content is within an authorized service class for the user; and at least one second interface for transmitting at least one message to a remote content server. The at least one message causes the remote content sever to: (i) provide the protected content to the user device, or (ii) to deny the user device the protected content. The message may be based at least in part on the determination of whether the user is among the plurality of entitled users, and/or on the determination of whether the particular one of the plurality of protected content is within the authorized service class for the user.

In a third aspect of the invention, a method for determining whether a user is permitted in a first network to access protected content associated with a second network is disclosed. In one embodiment, the method comprises: receiving a request for the protected content from the user in the first network; determining the second network to which the user is associated; sending a message to the second network, the message comprising: login and password information entered by the user; and the request for the protected content; and receiving, in response to the message, a message indicating whether the user is permitted in the first network to access the protected content associated with the second network.

In a fourth aspect of the invention, a method of determining whether a particular one of a plurality of protected content may be provided to a user via a first network based at least in part on service details of the user in a second network is disclosed. In one embodiment, the method comprises: receiving a request for authorization of the user's access to the particular one of the plurality of protected content from an entity of the first network, the request for authorization comprising at least a globally unique identifier (GUID) associated with the user and information identifying the particular one of the plurality of protected content; determining in response to the request, whether a session has been established by the user and the second network; determining a subscriber identity within the second network based at least in part on the GUID; retrieving the service details associated with the user; comparing the service details to the information identifying the particular one of the plurality of protected content; and if the service details match the information identifying the particular one of the plurality of protected content, providing a message enabling the particular one of the plurality of protected content to be delivered to the user via the first network.

In a fifth aspect of the invention, a method for enabling the distribution of protected content associated with a managed content distribution network to subscribers of the network is disclosed. In one embodiment, the method comprises receiving a communication relating to a request for the protected content from a subscriber, the communication being sent from an entity associated with a third party content source that has access to the protected content; determining whether the protected content is authorized for delivery to the subscriber; and if the protected content is authorized, causing the third party content source to deliver the protected content to the subscriber (e.g., via the Internet).

In a sixth aspect of the invention, a computer readable apparatus is disclosed. In one embodiment, the apparatus comprises a storage medium, the medium comprising at least one computer program adapted for use in managing remote requests for protected content of a managed content distribution network. The program comprises first logic configured to process a received content request from a third party entity, the request being generated at least in part using network subscriber login information; second logic configured to utilize at least portions of the login information to access a subscriber database maintained by the network; third logic configured to determine, based on the access and the at least portions of the login information, whether the subscriber is entitled to access the protected content; and fourth logic configured to cause issuance of a message to the third party entity authorizing or denying provision of the requested content to the subscriber by the third party entity.

In a seventh aspect of the invention, a client device having a processor configured to run at least one client application thereon is disclosed. In one embodiment, the client application follows appropriate protocol for sending requests for content and receiving requested content as well as for providing additional information to the network to facilitate authentication and authorization. In another embodiment, the client application is configured to collect information regarding the user's actions with respect to content, and pass this information upstream. In one variant this information is used to make business decisions including e.g., secondary content insertion decisions.

In an eighth aspect of the invention, a business and operation "rules" engine is disclosed. In one embodiment, the engine comprises one or more computer programs adapted to control various aspects of content and message exchange between two entities so as to achieve desired business or operation goals (or obey certain rules).

In a ninth aspect of the invention, methods of doing business relating to content provision and permissions are disclosed.

These and other aspects of the invention shall become apparent when considered in light of the disclosure provided herein.

BRIEF DESCRIPTION OF THE DRAWINGS

FIG. 2a is a functional block diagram illustrating a first exemplary use case of the content delivery and message exchange network architecture of FIG. 2.

FIG. 9 illustrates tables for exemplary authorization-based metrics for use in one embodiment of the present invention.

Figure 1:
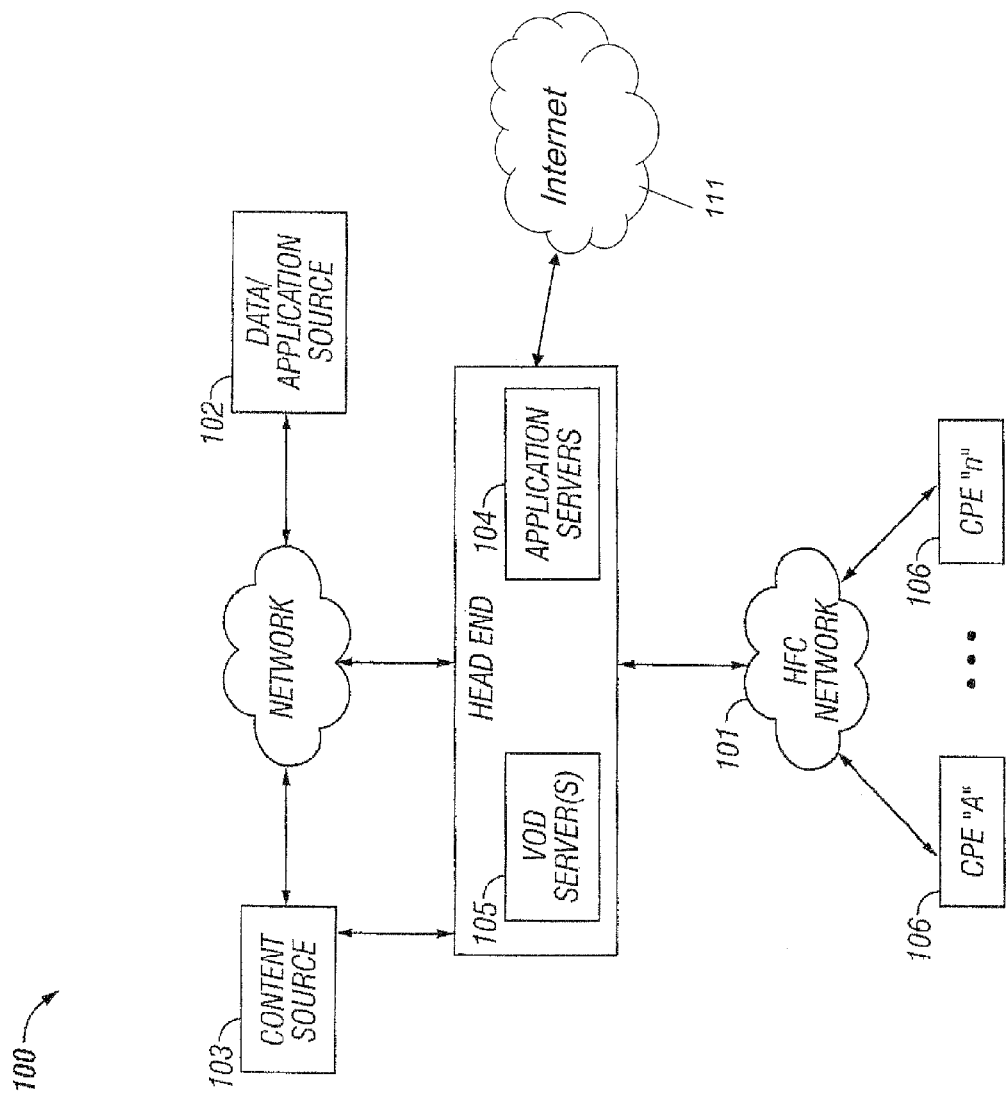
FIG. 1 is a functional block diagram illustrating an exemplary hybrid fiber network configuration useful with the present invention.

All Figures and Appendices ©Copyright 2010 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components. As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11a,b,g,n), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including 802.11a/b/g/n/v.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention discloses, inter alia, methods and apparatus for providing protected content to subscribers of a managed network (e.g., MSO network such as cable, satellite, or HFCu) via a content source accessible to the subscriber via an internetwork (e.g., the Internet). In one embodiment, a user accesses a programmer (content source) website, or an MSO website, and requests content. If the particular content requested is protected content, or content which is only accessible to certain types of subscribers, the programmer and/or MSO determines whether the requesting user is permitted to access the content and if so, what use restrictions if any apply. The process by which it is determined whether a user may access content includes: (i) authenticating the user as a subscriber to the MSO, and then (ii) determining whether the subscriber's service level (subscription level) permits or entitles viewing of the requested content.

In one embodiment, the user is authenticated by requiring him/her to establish a login identity and password, and/or assigning the user a globally unique identifier (GUID). This unique information is stored at an MSO entity such as an entitlements or authentication server, and when the user logs into a website (such as a common login application (CLA) maintained by the MSO), the information is accessed and compared to information the user provides to login. If valid login information is entered (i.e., the information provided matches the stored information for that user GUID), then a session is created between the MSO and user.

The aforementioned authentication at the MSO may be facilitated by various entities associated with the programmer. For instance, the user may first log in to a third party (e.g., programmer's) website, such as by establishing a login identity and password which are stored at the programmer's site. Once logged in, the programmer may forward requests to view content to an appropriate MSO, and provide a platform for the user to log in to the MSO site (e.g., a virtual MSO interface).

In one embodiment, the programmer and MSO accounts for a particular user may be linked or "federated". According to this embodiment, a given user will have MSO-specific information regarding its identity (such as login information for the MSO, GUID, etc.) and/or information regarding its subscription level and other service details stored at the programmer site, or other entity accessible to the programmer without requiring consultation with the MSO. Messages received from the MSO representing permission for the user to access content may also be stored at the programmer site. The programmer may later reference this information when subsequent requests for content are made by the user, and thereby provide faster and more efficient service. Methods for unlinking or de-federating a user's account in the programmer and MSO sites are also given.

Determination of whether the subscriber's service level (e.g., subscription level) permits viewing of the requested content is, in one embodiment, performed at the MSO in response to receiving a request for content. In one embodiment, one or more MSO entities utilize the user login information to determine the identity of the user as a subscriber, and then determines the details of the service to which the subscriber has subscribed. The identity of the user may also be determined at least in part via a device ID associated with the request (e.g., MAC, IP address, etc.), which can be correlated to one or more subscriber accounts by the MSO.

The MSO generates and transmits messages to the third party programmer (content source) indicating whether or not the user should be permitted access to the content (and optionally what restrictions if any apply) based on the authentication and authorization determinations. In one variant, the programmer may store a so-called "entitlement cookie" which may be referred to at future instances wherein the subscriber requests content. The entitlement cookie may comprise a stored MSO message indicating the subscriber is entitled to access the content, which may be relied upon for, e.g., a certain period of time or number of transactions.

Delivery of the requested content may occur via a number of different models, including for example (i) delivery back over the MSO's infrastructure, and (ii) delivery over non-MSO operated infrastructure, such as the Internet, wireless link, etc.

Business rules for the implementation of the aforementioned authentication and authorization and for the delivery of content are also described.

A uniform description language (e.g., "entitlements description language" or EDL that allows for management of protected content across heterogeneous network environments (including those outside of the MSO's direct control) is also described.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system or satellite network architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature. For instance, the invention may be adapted for use on so-called hybrid fiber copper (HFCu) networks, or WiMAX (IEEE Std. 802.16) wireless networks.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Also, while certain aspects are described primarily in the context of the well-known Internet Protocol (described in, inter alia, RFC 791 and 2460) and Session Initiation Protocol (SIP), it will be appreciated that the present invention may utilize other types of protocols (and in fact bearer networks to include other internets and intranets) to implement the described functionality.

Moreover, while many aspects of the invention are described within the context of traditional "on demand" services traditionally provided over e.g., a cable, satellite, or HFCu network (e.g., FVOD, SVOD, MOD, etc.), it will be appreciated that the concepts and apparatus described herein are readily extensible to other content delivery paradigms including without limitation broadcast (linear) and "start over".

Other features and advantages of the present invention will immediately be recognized by persons of ordinary skill in the art with reference to the attached drawings and detailed description of exemplary embodiments as given below.
Exemplary Content Distribution Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. The headend is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1*a* (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
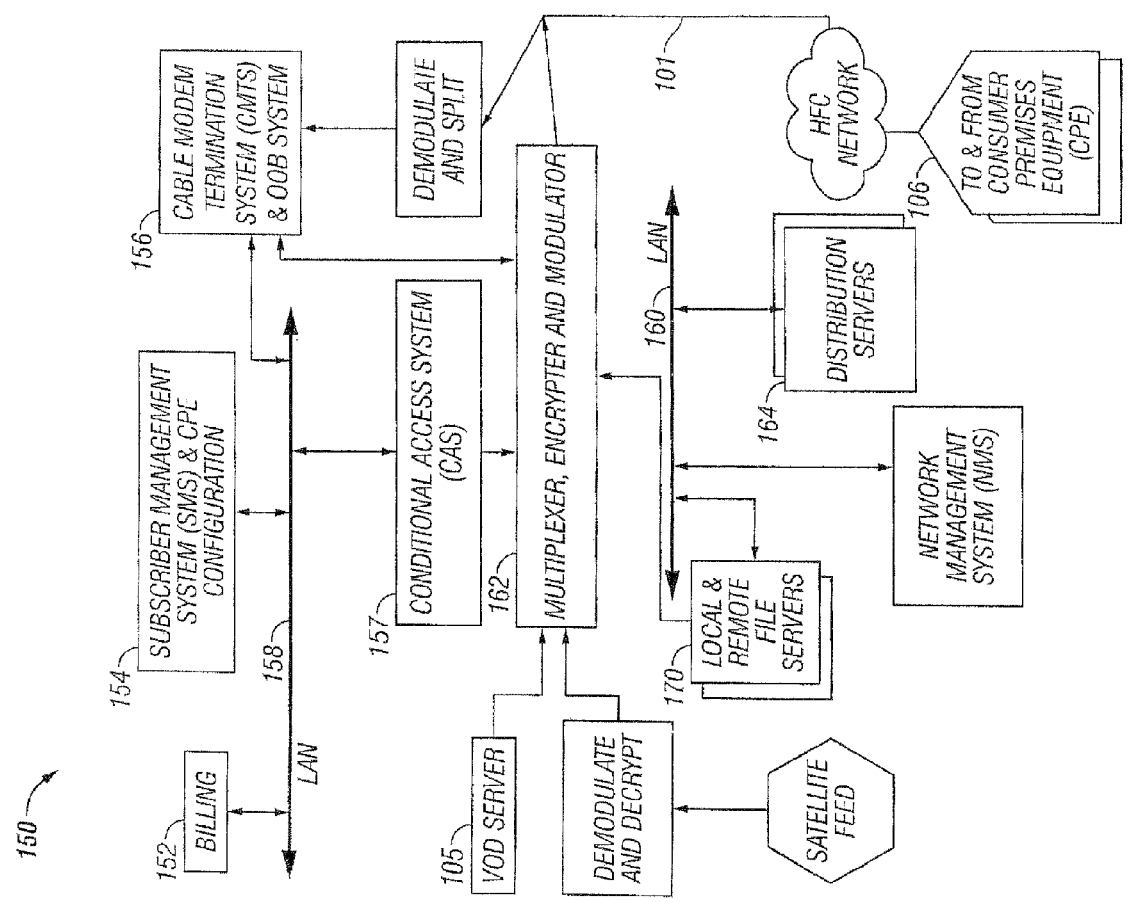
FIG. 1a is a functional block diagram illustrating one exemplary network headend configuration useful with the present invention.

Referring now to FIG. 1*a*, one exemplary embodiment of a headend architecture useful with the present invention is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1*a* is high-level, conceptual architecture and that each MSO may have multiple headends deployed using custom architectures.

The exemplary architecture 150 of FIG. 1*a* further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1*b*) via a variety of interposed network components.

It will also be recognized, however, that the multiplexing operation(s) need not necessarily occur at the headend 150 (e.g., in the aforementioned MEM 162). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feedback" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

An optical transport ring (not shown) is also commonly utilized to distribute the dense wave-division multiplexed (DWDM) optical signals to each hub within the network in an efficient fashion.

Figure 1B:
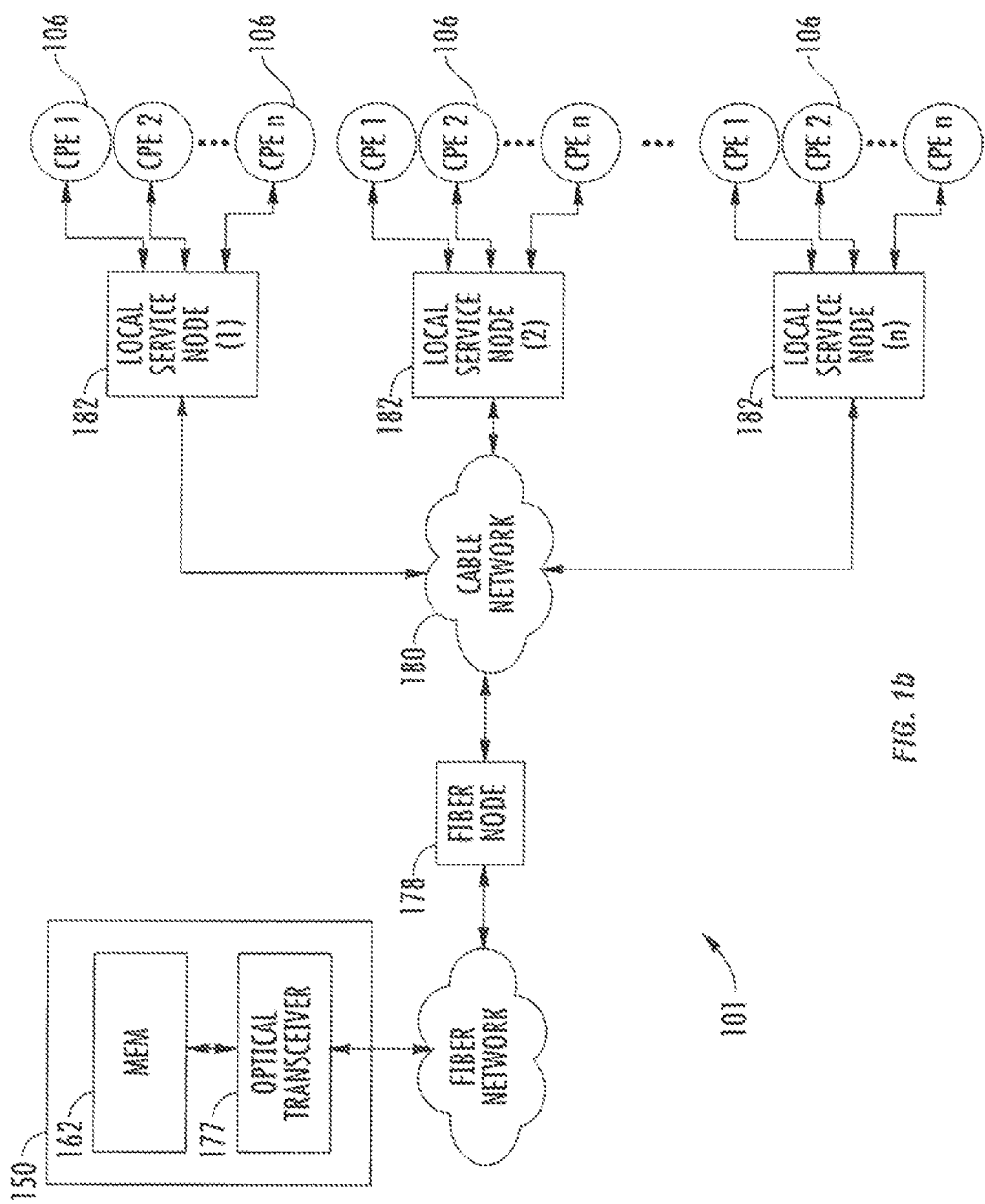
FIG. 1b is a functional block diagram illustrating one exemplary local service node configuration useful with the present invention.

In addition to on-demand and broadcast content (e.g., video programming), the system of FIGS. 1a and 1b (and 1c discussed below) also deliver Internet 111 data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as via a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs, such as described below with respect to FIG. 1c.

The CPE 106 are each configured to monitor the particular assigned RF channel (such as via a port or socket ID/address, or other such mechanism) for IP packets intended for the subscriber premises/address that they serve.

Figure 1C:
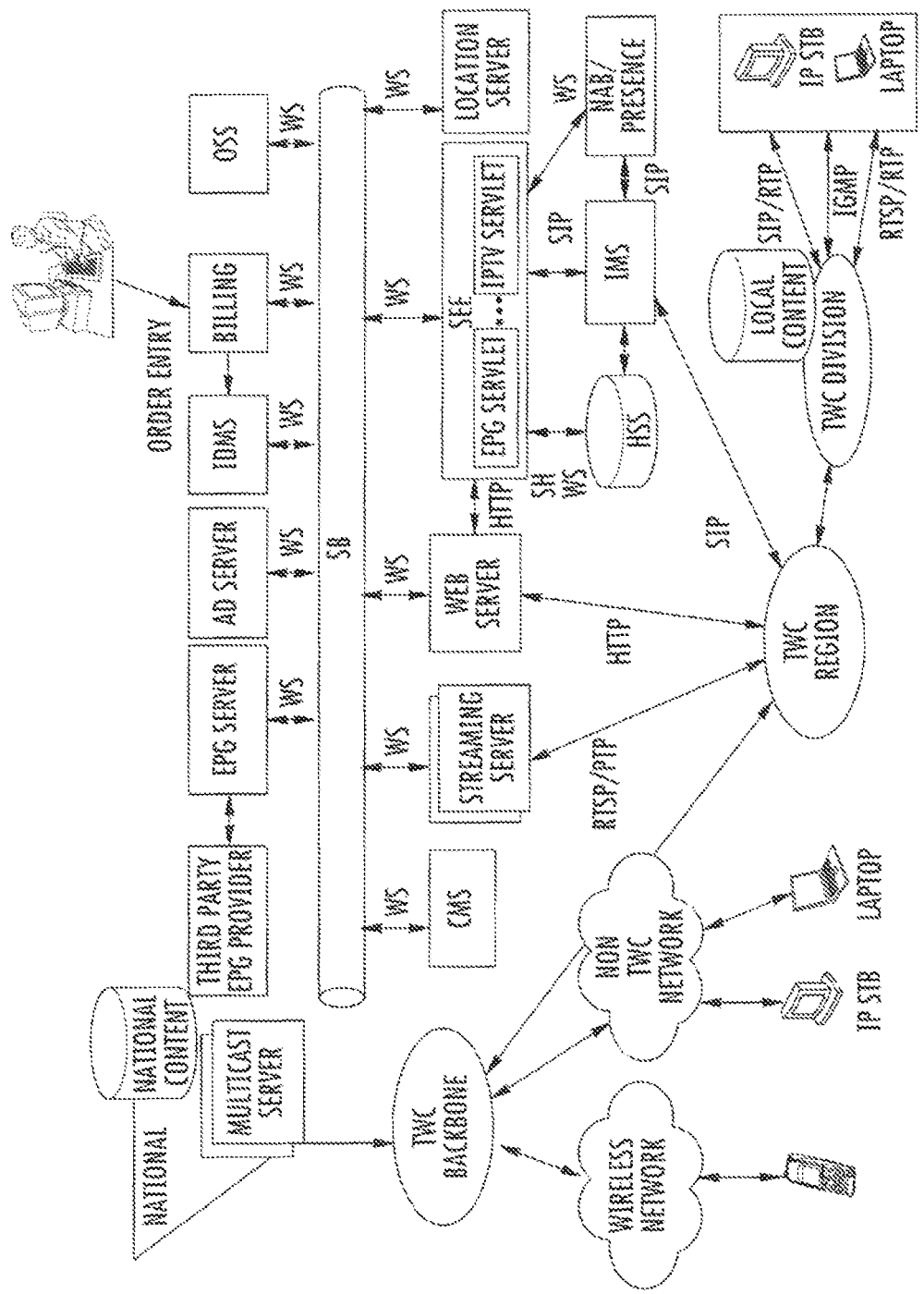
FIG. 1c is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content) when the request issues from an MSO network (see discussion of FIG. 2a below). FIG. 1c illustrates one exemplary implementation of such a network, in the context of an IMS (IP Multimedia Subsystem) network with common control plane and service delivery platform (SDP), as described in co-pending U.S. Provisional Patent Application Ser. No. 61/256,903 entitled "METHODS AND APPARATUS FOR PACKETIZED CONTENT DELIVERY OVER A CONTENT DELIVERY NETWORK", previously incorporated herein. Such a network provides significant enhancements in terms of common control of different services, implementation and management of content delivery sessions according to unicast or multicast models, quality-of-service (QoS) for IP-packetized content streams, etc.; however, it is appreciated that the various features of the present invention are in no way limited to any of the foregoing architectures.

Content Delivery Authorization and Message Exchange Architecture—

The approach to providing access to protected content outside of an MSO network described in the present disclosure are based in the exemplary embodiment on a pre-defined set of transactions or assertions which are passed between the content provider (e.g., programmer or other third-party entity) and the managed network operator (e.g., MSO). The assertions, categorized by authentication and authorization (each of which will be discussed in greater detail subsequently herein), are conducted between applications proprietary to both of the aforementioned organizations, yet externalized through a set of standards-based protocols. In one implementation of the invention, the protocols utilized include those defined by the Liberty Alliance Project, and/or by the Organization for the Advancement of Structured Information Standards (OASIS), although it will be recognized that other protocols may be used with equal success.

The Liberty Alliance, formed in 2001, created a set of open standards and guidelines for identity management with the fundamental concept of "identity federation" (or the linking of accounts within or across disparate organizations). The guidelines produced from the project, known as Liberty Alliance Identity Federation Framework (ID-FF) V1.2 specification, which is incorporated herein by reference in its entirety, define the process by which identities from trusted sources can be linked in order to reduce ongoing multiple logins, thus increasing identity assurance while reducing identity fraud. In 2003, the Liberty Alliance contributed their body of work to OASIS that was founded in 1993 under the name SGML Open. SGML Open's original charter was the creation of guidelines for interoperability among products supporting the Standard Generalized Markup Language (SGML), but in 1998 SGML Open changed its name and shifted its focus from SGML to Extensible Markup Language (XML), as it became widely adopted by the technology industry.

To date, specifications from OASIS have become the de facto standard for security and identification management between consenting business partners, which is represented through the Security Assertion Markup language (SAML) Specification (Version 2.0 released in 2005), as SAML Core: S. Cantor et al. Assertions and Protocols for the OASIS Security Assertion Markup Language (SAML) V2.0. OASIS Standard, March 2005. Document ID saml-core-2.0-os (http://docs.oasis-open.org/security/saml/v2.0/saml-core-2.0-os.pdf) and SAML Binding: S. Cantor et al. Bindings for the OASIS Security Assertion Markup Language (SAML) V2.0. OASIS Standard, March 2005. Document ID saml-bindings-2.0-os (http://docs.oasisopen.org/security/saml/v2.0/saml-bindings-2.0-os.pdf), each of which is incorporated herein by reference in its entirety. Early versions of SAML and the ID-FF were compatible; however, the two standards became incompatible based on component changes within SAML for greater consistency and component symmetry. Other key differences addressed in SAML v2.0 were encryption metadata and multi-endpoint support for a single protocol. Also, SAML v2.0 generalized the Liberty functionality to account for more options or use cases for expanded definition. However, it will be appreciated that the present invention is not limited to any particular standards or languages, the foregoing SAML and ID-FF being merely exemplary of the broader principles of the invention.

Figure 2:
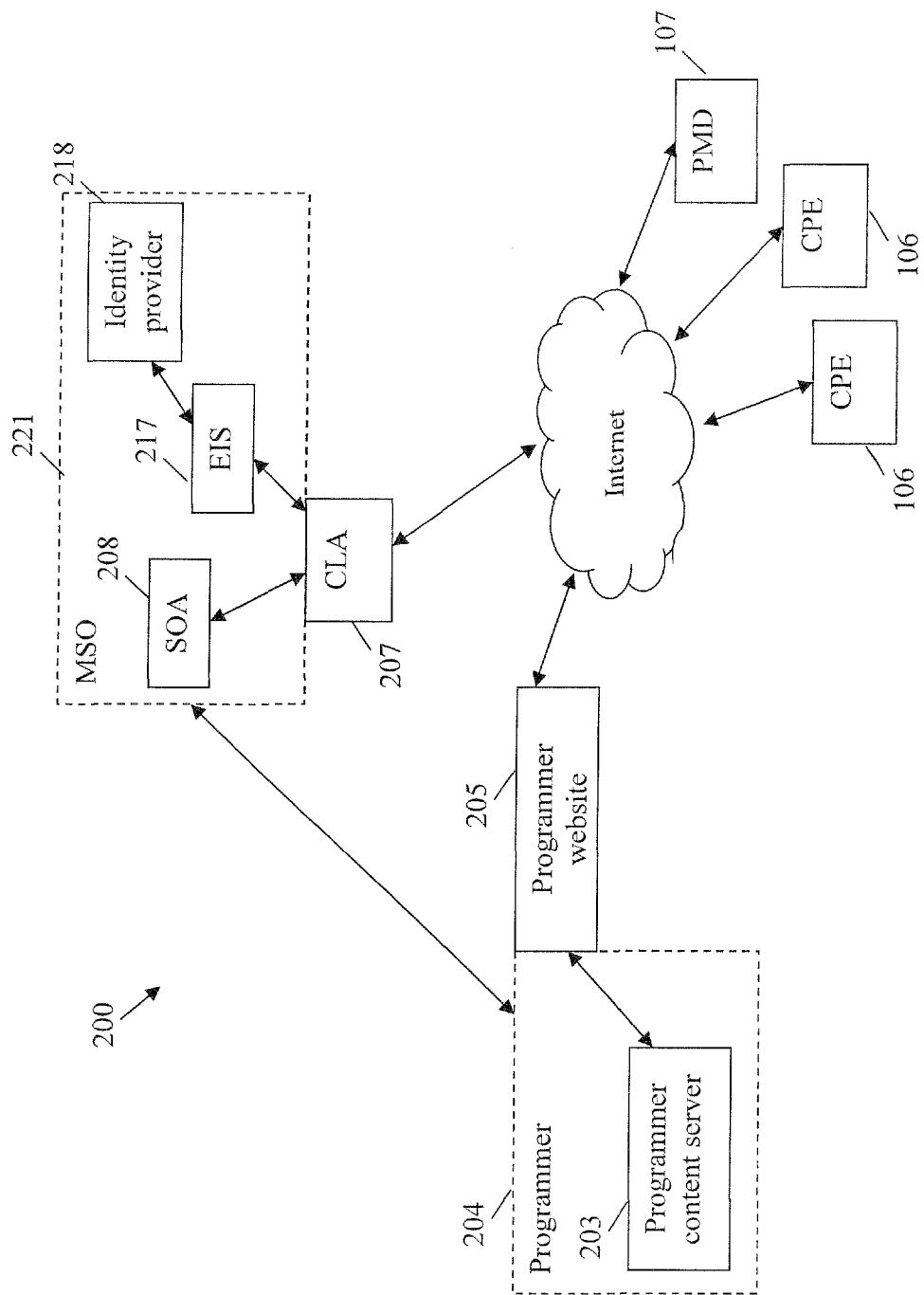
FIG. 2 is a functional block diagram illustrating a content delivery and message exchange network architecture configured in accordance with one embodiment of the present invention.

Referring now to FIG. 2, a high-level block diagram of a content delivery authorization and message exchange architecture 200 configured in accordance with one embodiment of the invention is described. This architecture is useful for, inter alia, providing delivery of protected content to so-called "entitled" viewers, as discussed in greater detail subsequently herein.

As shown in FIG. 2, the architecture 200 generally comprises three primary "outward facing" (i.e., from the MSO outward) applications of functions of the MSO 221. The applications interact with one or more third party programmers or content sources 204 and MSO subscribers and other non-MSO users, and include (i) the common login application (CLA) 207, (ii) an enterprise identity system (EIS) 214, and (iii) a service oriented architecture (SOA) 208.

The programmers/sources 204 may for example include any broadcast provider (such as e.g., NBC, Turner Broadcasting, Viacom, etc.) which distributes content across one or more mediums, or through distribution agreements with the MSO. Subscribers include the individual consumers or users of video/audio/data services.

Subscribers request access to content via user devices such as e.g., consumer premises equipment (CPE) 106, personal media devices (PMD) 107, personal computers (PC), laptop computers, mobile devices, etc. The user devices may include any apparatus capable receiving audio/video/data services from the MSO 221 or programmer 204 via the Internet. Hence, two primary request/delivery models are envisaged (although others may be used as well, or combinations or variants of the foregoing): (i) request from an MSO-network device (e.g., CPE 106 such as an IP-enabled DSTB or premises gateway 113) to an Internet site, for content to be returned back to the requesting MSO-network device (see FIG. 2a); and (ii) request from a non-MSO network device, for content to be returned back to the requesting non-MSO network device (see FIG. 2b).

An example of the former case (i) might be an IP-enabled DSTB or PC/DOCSIS cable modem registered with the MSO that utilizes MSO infrastructure to access the Internet (and the third party programmer/source site), with content being streamed back to the requesting device over a comparable pathway. Here, the MSO network acts both as a "bearer" and "authorizer" network.

An example of the latter case (ii) might be an IP-enabled mobile device (e.g., smartphone or laptop computer) which may or may not be registered with the MSO, and is being operated by an authorized MSO subscriber. The device may obtain access to the Internet via e.g., a service provider WLAN, cellular 3G/4G (e.g., LTE-A), WiMAX, or other such interface 250, whereby it may connect to the third party website and request content, the latter streamed to the device over a comparable return path when delivery is authorized. In this fashion, the MSO network is not a bearer, but rather merely an authorizer.

Figure 2B:
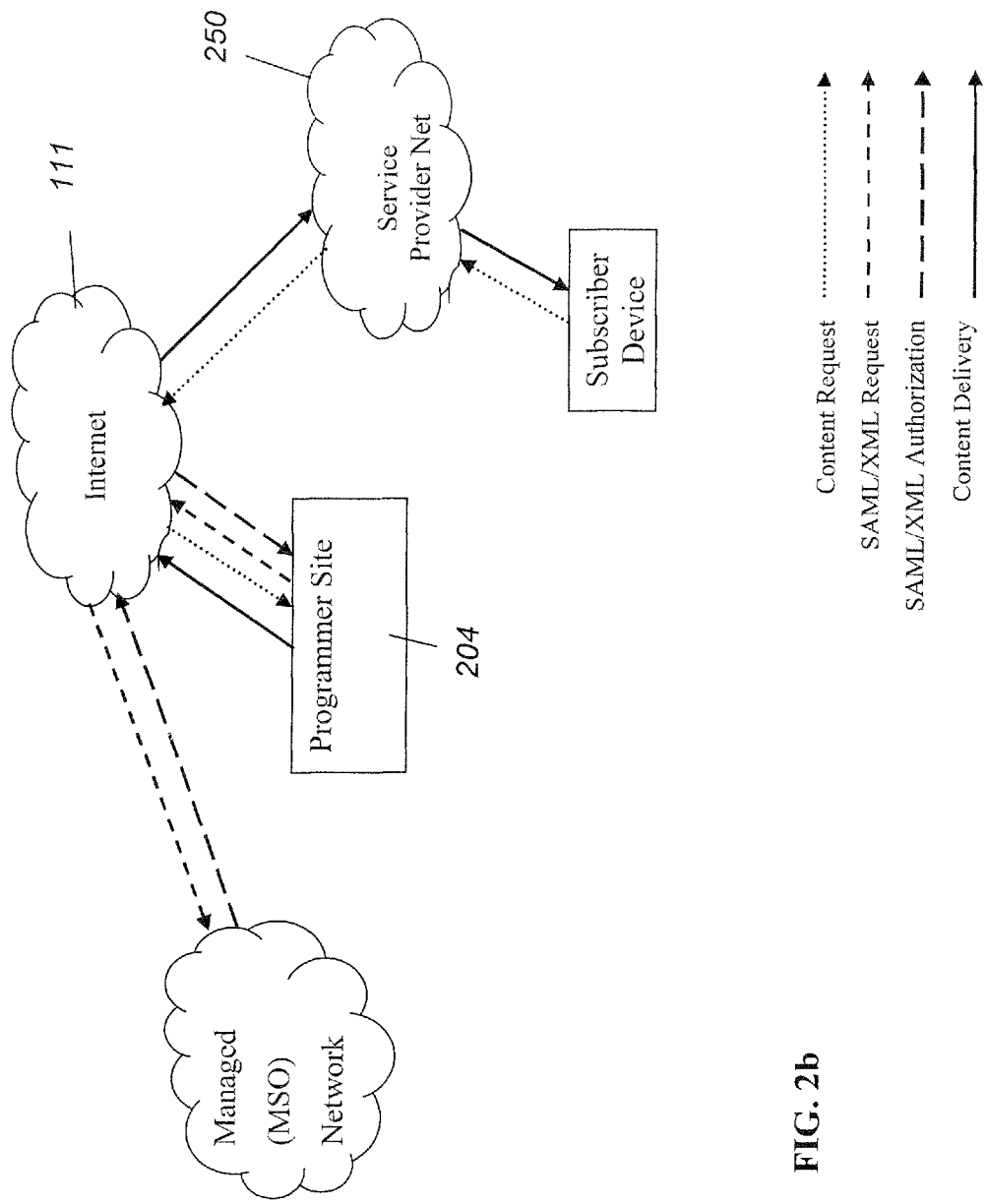
FIG. 2b is a functional block diagram illustrating a second exemplary use case of the content delivery and message exchange network architecture of FIG. 2.
Figure 2C:
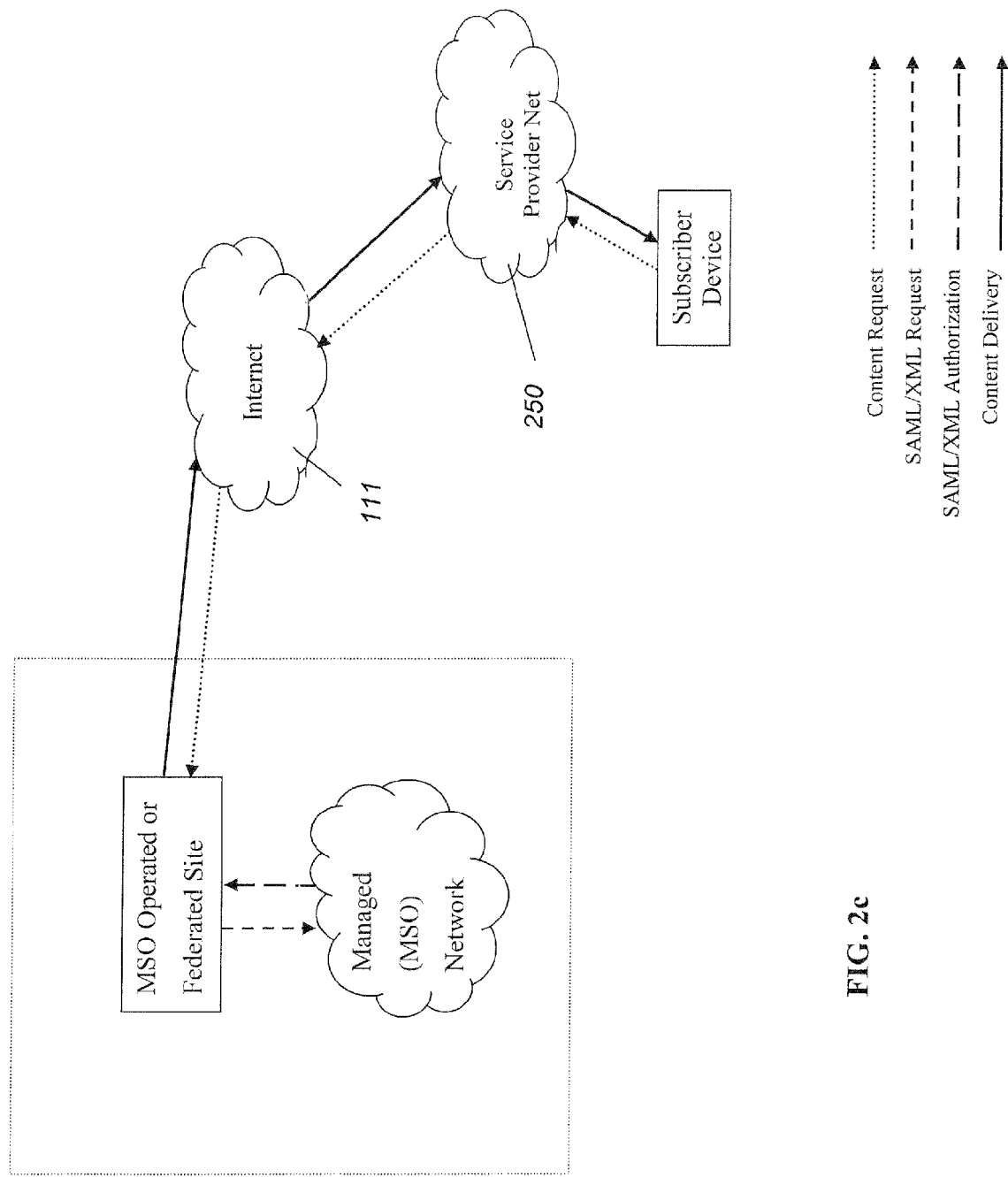
FIG. 2c is a functional block diagram illustrating a third exemplary use case of the content delivery and message exchange network architecture of FIG. 2.

FIG. 2c illustrates yet another use case of the content delivery and message exchange network architecture of FIG. 2, wherein an MSO-operated (or "federated") site is used.

The flow of various communications (and the protected content) under the foregoing exemplary scenarios are also illustrated in FIGS. 2a-2c, respectively. In various models, the subscriber request is received at: (i) the programmer website 205; and/or (ii) at the CLA 207 associated with the MSO 221. The subscriber (and/or device) requesting access to content is authenticated, and its authorization to receive the content is validated by the SOA 208, EIS 214 and identity provider 218. This authentication and authorization may take many forms, such as those described subsequently herein (e.g., authentication of the user and/or their device, authorization of the user to access content, etc.), as well as others which may be used such as IEEE Std. 802.1x authentication, use of a RADIUS server, etc.

Once the subscriber (and/or device) is authenticated and authorized, the content may be provided from the programmer content server 203 to the requesting device (e.g., CPE 106, PMD 107, etc.).

As noted above, the requested/provided content may comprise broadcast content as well as on-demand content. Other types of content may also be provided. For example, so called "quick clips" content (described in co-owned U.S. Pat. No. 7,174,126 issued Feb. 6, 2007 and entitled "TECHNIQUE FOR EFFECTIVELY ACCESSING PROGRAMMING LISTING INFORMATION IN AN ENTERTAINMENT DELIVERY SYSTEM" incorporated herein by reference in its entirety), so-called "start-over" content (described in co-owned, co-pending U.S. Patent Publication No. 2005/0034171 entitled "TECHNIQUE FOR DELIVERING PROGRAMMING CONTENT BASED ON A MODIFIED NETWORK PERSONAL VIDEO RECORDER SERVICE" incorporated herein by reference in its entirety), so-called "lookback" content (as described in co-owned, co-pending U.S. patent application Ser. No. 10/913,064 filed Aug. 6, 2004 and entitled "TECHNIQUE FOR DELIVERING PROGRAMMING CONTENT BASED ON A MODIFIED NETWORK PERSONAL VIDEO RECORDER SERVICE" incorporated herein by reference in its entirety), and/or so-called "remote DVR" content (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety) may be ingested at the third party content source. Still further, enhanced access to premium based content which is not available to non-subscribers, or which cannot be delivered across traditional transport may also be provided, such as e.g., behind the scenes outtakes, alternate endings, actor interviews, etc.

The CLA 207 is used as an entry point into the MSO network's 221 web portals by both residential and commercial users. In one embodiment, the CLA 207 communicates with the EIS 214 to store user-specific information, including a digital identity. Hence, an MSO subscriber may establish a digital identity at the CLA 207 which is stored thereon, and which may be shared with the EIS 214 and storage entities communicating with each. The creation of an MSO-specific digital identity for each subscriber will be discussed in greater detail below.

It is via the CLA 207 that a subscriber in the illustrated embodiment may access subscriber-controlled services such as Digital Video Recorders (DVRs), personal video recorders (PVR), network-based DVR and/or PVR, and self-controlled phone services (such as, e.g., call forwarding, call waiting, etc.). A subscriber may also obtain information pertaining to call records and billing information by accessing the web portals via the CLA 207.

Delivery of content to the CPE 106 and/or PMD 107 occurs within the MSO network (i.e., under the paradigm of FIG. 2a) in one embodiment, as discussed in previously incorporated co-owned U.S. Provisional Application Ser. No. 61/256,903 filed on Oct. 30, 2009 and entitled "METHODS AND APPARATUS FOR PACKETIZED CONTENT DELIVERY OVER A CONTENT DELIVERY NETWORK". As discussed therein, a substantially session-based and packetized content delivery approach (e.g., using the well-known IP network layer protocol) which allows for temporal, device, and location flexibility in the delivery of the content, and transportability/migration of user sessions (i.e., allows a user to receive any content they desire, delivered at any time and at any location, and on any device they choose, and move that "Session" to another device or location), as well as service/content personalization (e.g., on a per-session/user basis) and blending (integration). This approach uses a common or unified delivery architecture in providing what were heretofore heterogeneous services supplied by substantially different, and often vendor-specific, networks.

Moreover, the foregoing apparatus and methods provide for enhanced content access, reproduction, and distribution control (via e.g., a DRM-based approach and other security and content control measures), as well as quality-of-service (QoS) guarantees which maintain high media quality and user experience, especially when compared to prior art "Internet TV" paradigms. In one exemplary implementation, the network may be based on an IMS (IP Multimedia System, such as e.g., that defined in relevant 3GPP standards) which includes SIP session protocols, as well as a Service Delivery Platform (SDP).

In another implementation (FIG. 2b), the network comprises both "managed" and "unmanaged" (or off-network) services, so that a network operator can utilize both its own and external infrastructure to provide content delivery to its subscribers in various locations and use cases.

In one variant of this approach, network services are sent "over the top" of other provider's infrastructure 250, thereby making the service provider network substantially transparent (i.e., the protected content requests and other communications are passed over the service provider network and the Internet as if they are any other traffic). In another variant, a cooperative approach between providers is utilized, so that features or capabilities present in one service provider's network (e.g., authentication of mobile devices to an AP or RAN) can be leveraged by another provider operating in cooperation therewith. In another embodiment, requested content may be authorized via the content and data distribution architecture 200, and provided to the CPE 106 and/or PMD 107 as described in co-owned, co-pending U.S. patent application Ser. No. 11/258,229 filed on Oct. 24, 2005 and entitled "METHOD AND APPARATUS FOR ON-DEMAND CONTENT TRANSMISSION AND CONTROL OVER NETWORKS", which is incorporated herein by reference in its entirety. As discussed therein, data may be provided according to download or "on demand" paradigms. In one embodiment, the network comprises a cable television network connected with a CSP (cellular service provider) or wireless service provider (WSP), and on-demand content delivery is accomplished via a "point-to-point" approach wherein a session is established between a content receiving entity (such as a cellular telephone) and a distributing entity (e.g., a VOD server). Session establishment and data flow control are advantageously implemented using protocols and bandwidth that are typically used for (i) providing on-demand services to subscribers within the cable network, and (ii) delivery and control of streaming multimedia to client mobile devices.

Yet other mechanisms and architectures for providing content to PMDs 107 and/or CPE 106 located in or out of a managed network may be used consistent with the invention as well, the foregoing being merely exemplary of the broader principles.

As will be discussed in greater detail below, the architecture 200 utilizes information obtained from or stored at an MSO-maintained authorization server (not shown) to determine whether a requesting user device is authorized to receive the content. In one embodiment, the provision of content and use thereof are effectively controlled by the supplying web or programmer content server 203 (or any intermediary MSO-operated infrastructure). For example, once a user is authorized to receive content, the server 203 serves the content to the user device over the prescribed delivery path/model.

In another embodiment, various restrictions to the provision of content to a user at a display or rendering device associated with the user device are determined by the device (e.g., CPE 106, PMD 107, etc.) itself, as discussed in co-owned, co-pending U.S. patent application Ser. No. 12/716,131 filed on Mar. 2, 2010 and entitled "APPARATUS AND METHODS FOR RIGHTS-MANAGED CONTENT AND DATA DELIVERY", which is incorporated herein by reference in its entirety. As discussed therein, a downloadable or transferable rights profile coupled with a "smart" media player application are given. The rights profile contains information regarding the specific rights of a device and/or a subscriber to access content. It is via the rights profile that the device (via the media player and its associated rights management application) determines whether to provide content to a subscriber.

In one implementation of the architecture of FIGS. 2a-2C, one or more entities useful in delivery of content to the CPE 106 or PMD 107 may be adapted to utilize information regarding the CPE 106 or PMD 107 capabilities (e.g., such as in the event a capabilities profile is received from these devices) to perform de-encapsulation/re-encapsulation of content where necessary, as is disclosed in co-owned, co-pending U.S. patent application Ser. No. 12/582,619 filed on Oct. 20, 2009 and entitled "GATEWAY APPARATUS AND METHODS FOR DIGITAL CONTENT DELIVERY IN A NETWORK", which is incorporated herein by reference in its entirety. As discussed therein, one or more entities of the programmer 204 or MSO 221 (or located elsewhere) may be configured to process content including de-encapsulating the content from a first media file container format and subsequently re-encapsulating the content to a second media file container format which is known to be compatible with the requesting device. For example, content which is delivered from a host server or other content source may be encapsulated in e.g., MP4, if the receiving CPE 106 is not capable of reading the MP4 files, the content server (or other entity) may re-encapsulate the content to e.g., MPEG-2 or to another format that the receiving CPE 106 is capable of reading.

In another exemplary embodiment, the receiving device may comprise a converged premises device (CPD) and/or a media bridge. The CPD may for example be of the type described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety. As discussed therein, the CPD comprises a WLAN (e.g., Wi-Fi) and/or PAN (e.g., Bluetooth or 802.15) wireless interface. Packetized (e.g., IP) traffic may be exchanged between the CPD and a PMD 107 via, e.g. the WLAN/PAN interface. Hence, in one embodiment, the PMD 107 may request content from the CPD.

In another embodiment, the user device may comprise a media bridge, which may, for example, be of the type disclosed in co-owned, co-pending U.S. patent application Ser. No. 12/480,597 filed Jun. 8, 2009 and entitled "MEDIA BRIDGE APPARATUS AND METHODS", incorporated herein by reference in its entirety. As discussed therein, the media bridging apparatus acts as a connection between a PMD 107 (which may include e.g., an iPad™, handheld computer, smartphone, PDA, etc.) and a user's home network. This bridging apparatus may be used, for example, to convert content stored on the PMD 107 to a format capable of being presented on a user's set-top box or other client device. The bridging apparatus may also be utilized for transmitting content to the PMD 107 (such as by converting the content to a format capable of being stored/presented on the PMD 107) provided the user of the PMD 107 is authorized to receive the content.

Figure 2D:
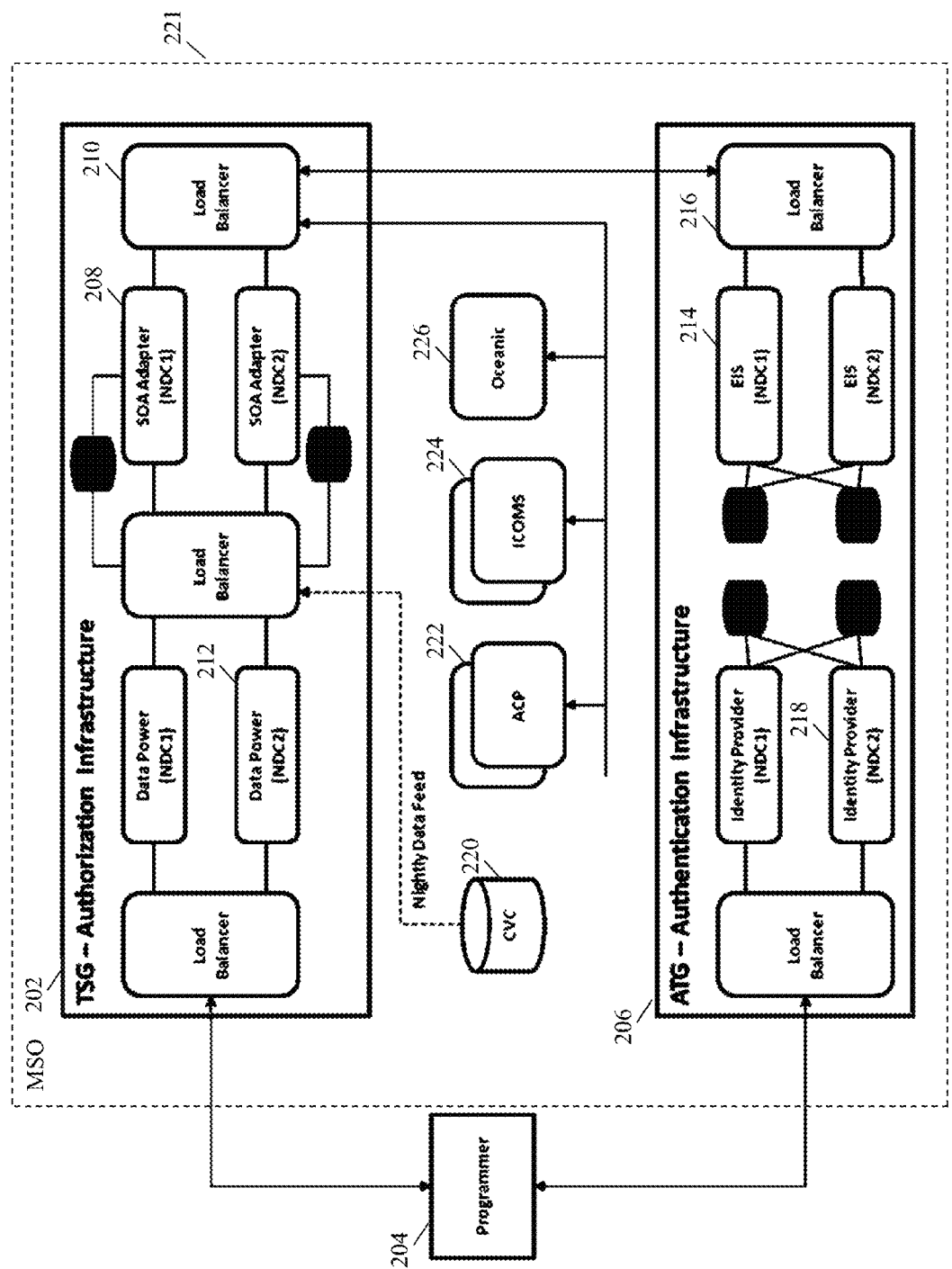
FIG. 2d is a functional block diagram illustrating a detailed view of the MSO entities of the network of FIG. 2 that are utilized for content delivery.

Referring now to FIG. 2*d*, one exemplary implementation of the content and entitlements management architecture 200 of FIG. 2 is shown and described.

As noted above in FIG. 2, the MSO 221 generally comprises a CLA 207 in communication with an SOA 208 and EIS 217 (in further communication with an identity provider 218). These components are distributed in a technology services group (TSG) authorization infrastructure 202 and an advance technology group (ATG) authentication infrastructure 206. The authorization infrastructure 202 and authentication infrastructure 206 each communicate with one or more programmers 204 prior to enabling delivery from the latter (or its designated delivery proxy) of requested content to a subscriber.

As shown in FIG. 2*d*, the authentication infrastructure 206 generally comprises a plurality load balancers 216, a plurality of identity providers 218, and the enterprise identity system (EIS) 214. The load balancers 216 are used to distribute transactional traffic across one or more servers within one or more data centers. The authentication and authorization applications of the exemplary embodiment each utilize more than one server, which are used to increase transactional throughput, and to aid in the event a server is offline (i.e., planned or unplanned outages).

Figure 2E:
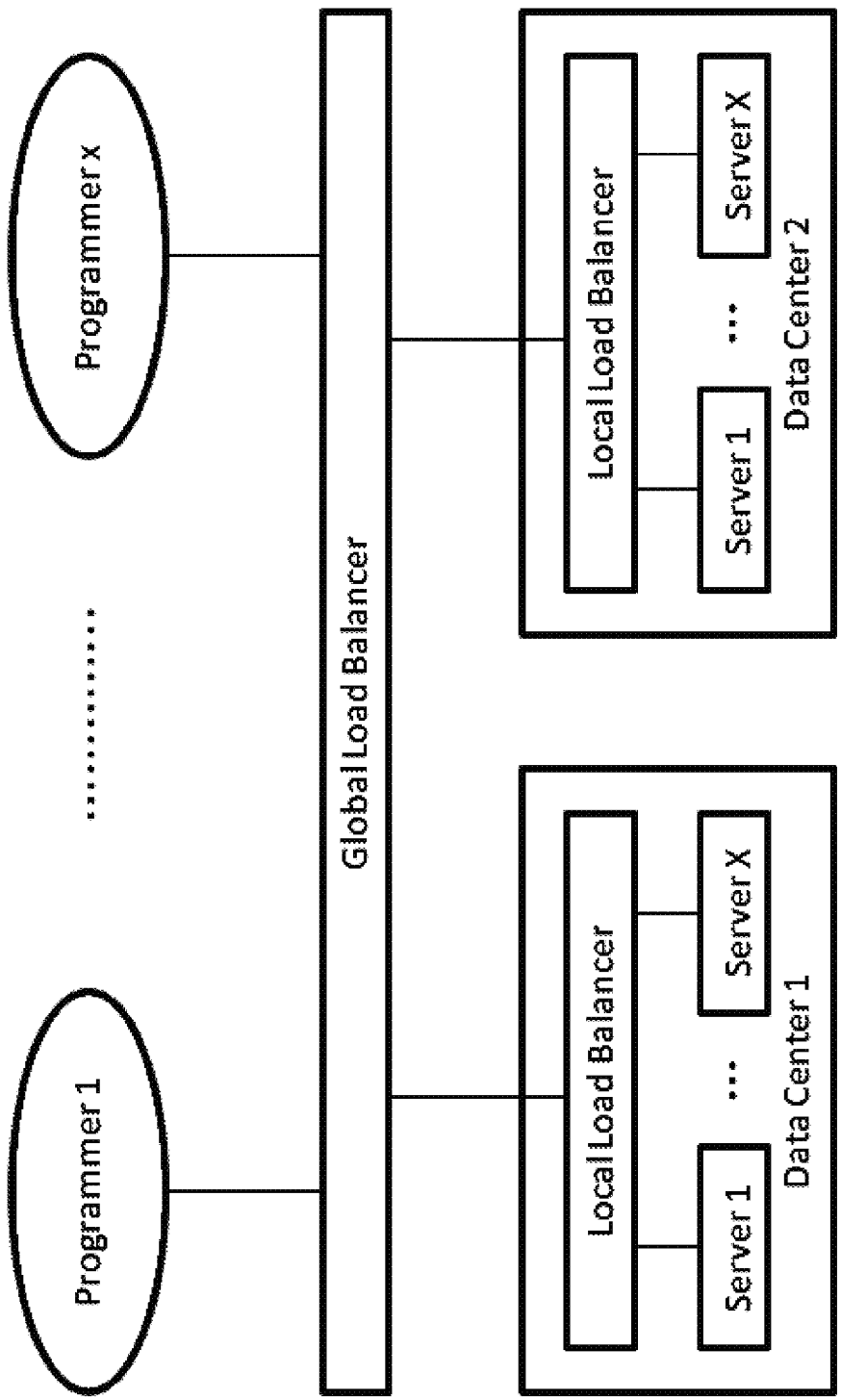
FIG. 2e is a functional block diagram illustrating an exemplary load balancer for use in one embodiment of the present invention.

In one embodiment (illustrated at FIG. 2*e*), there is a "global" load balancer which serves as the primary point of interface that routes to "local" load balancers within the corresponding data centers, which each distribute the transactional traffic to the associated. How the traffic is distributed can vary based on configuration including for example: round robin, load-based, or availability-based. This method of transaction distribution provides a highly available fault-resilient environment that maximizes operational readiness and "up-time".

The identity providers 218 are useful in accessing and evaluating subscriber information to determine if a requesting subscriber is a subscriber of the MSO 221, and/or the level of service or other service details of the subscriber's subscription. As discussed in greater detail elsewhere herein, a two-step process is used in one embodiment to authenticate the user, and then authorize what content they are entitled to access; failure can occur at either step. First, the authentication infrastructure 206 validates (i.e., authenticates) that the subscriber has an active account based on e.g., user entry of a correct username/password combination, regardless of service (e.g., video, high speed data, phone). Next, the authorization infrastructure 202 validates (i.e., authorizes) that the subscriber is entitled to access requested content based on subscription-based services (such as e.g., video).

The EIS 214 is used to store a subscriber's digital identity. A digital identity is in the present embodiment a subscriber-specific identifier which is used to uniquely (and optionally anonymously) identify the subscriber. A digital identity may further be linked to a particular MSO 221, a geographic region, demographic, subscriber type, etc. In one embodiment, the digital identity comprises a plurality of records identifiable by the subscriber's entry of a login and a password value at the CLA 207. In one such implementation, the EIS 214 and identity provider 218 in conjunction are responsible for authenticating a subscriber's identity for account linking or content delivery. For example, the EIS 214 may authenticate a subscriber if the programmer 204 has no system for validating a subscriber's identity, such as if the programmer 204 does not support its own identity management system (IDMS).

Referring again to FIG. 2*d*, the authorization infrastructure 202 generally comprises a plurality of load balancers 210 (see above and FIG. 2*e*), one or more data power sources 212, and one or more service oriented architecture (SOA) adapters. 208. The data power sources 212 are used to offload traffic from backend servers; in this case, the servers are used for the authorization application. The data power sources 212 are able to accelerate as well as throttle traffic, but may also be used to perform protocol translation of XML data streaming to and from the programmers. The data power sources 212 validate that incoming transactions are well-formed. If they are not, errors are presented back to the programmer, thus shielding the authorization servers from processing bad or even malicious requests.

The SOA adapters 208 are used to revalidate a subscriber's identity, and obtain information from multiple disparate systems having subscriber information on purchased services (i.e., monthly and on-demand) stored thereon. The obtained information is used by the SOA adapters 208 to confirm or deny entitlement of the subscriber to requested content. The SOA 208 performs an authorization of subscriber-based requests for access to protected content. In one embodiment, "protected content" comprises that content which is protected by being placed behind a firewall or other similar security barrier/mechanism. Content may be protected based on one or both of the MSO 221 or/and programmer 204 identifying the programming as such, and may further be limited to certain ones of the MSO 221 (and/or other MSO's) subscribers. For example, certain content may only be made available to a particular tier of subscriber (e.g., premium subscriber, etc.) across one or multiple different MSOs.

Various reasons may exist for protecting the content, including for example: (i) it is "first run" or recent content that is surreptitiously obtained and distributed, would usurp significant revenue and advertising opportunities from the MSO and/or source; (ii) it is content that is not suitable for all classes of viewers (e.g., adult content); (iii) it is copyright or otherwise legally protected; (iv) it must be pre-processed before delivery in order to ensure one or more attributes such as proper advertisement insertion, encoding format/QoS, etc.

Additionally, content may be placed in a protected class according to e.g., franchising agreements which do not allow certain pieces of content to be distributed outside a set geographical area(s). Local sports, educational and government programming that cannot be or has not paid for the right to distribute across specified physical boundaries based on local franchising rights (or those of third-parties that distribute such content on behalf of the MSO), would be examples of such protected content.

Environment Setup—

Figure 3:
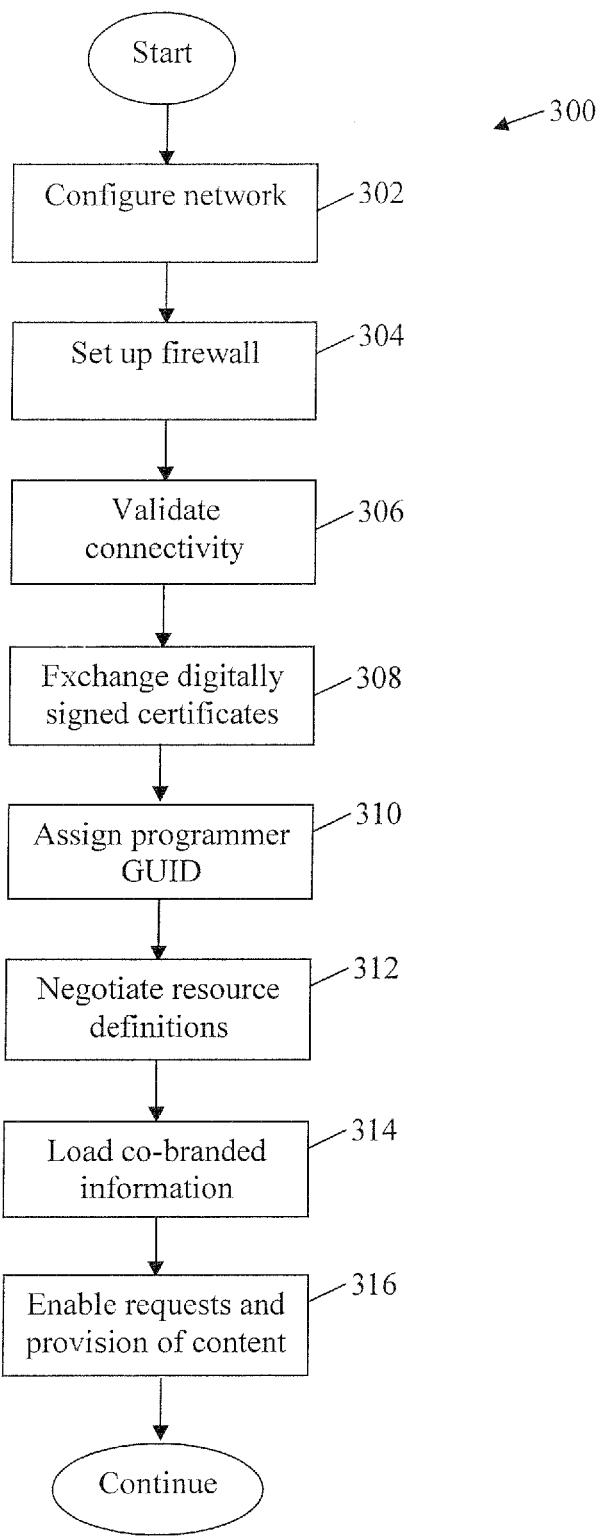
FIG. 3 is a logical flow diagram illustrating an exemplary method for connecting and establishing a relationship between the MSO and a programmer according to the present invention.

Referring now to FIG. 3, an exemplary embodiment of the method for connecting and establishing a relationship between the MSO 221 and a programmer 204 according to the invention is provided. The connection and establishment of a relationship between these entities is necessary for the transaction of information therebetween, including e.g., information useful in authenticating and/or authorizing a subscriber, and specifying their rights with respect to various uses of the requested content.

As shown, per step 302, both the MSO 221 and the programmer 204 independently configure their networks to support connectivity between servers of each network. In one embodiment, this may include e.g., creating firewall policies, and/or translating the external Internet Protocol (IP) address to an internal address (as required). The well known network address translation (NAT) approach may be utilized for translating the external IP address to an internal address. Alternatively other mechanisms may be utilized, including those configured to masquerade and/or hide a network address, or change/rotate it as a function of time or accesses (e.g., for security reasons).

Next, at step 304, at least one of the MSO 221 and the programmer 204 set up a firewall. The policies set forth during the configuration step (step 302) may be implemented to establish the firewall as discussed above. In general terms, a formal firewall request is submitted to the MSO TSG 202 operators to process and add the programmer's IP address, addresses or address ranges to internal firewall policies. The TSG 202 operators add a policy to the firewall that allows two-way traffic between the programmer and the MSO (i.e., "white-lists" the programmer by IP address, etc.). White-listing of the type discussed herein is required because the MSO in many instances maps a specific port on the authorization server and does not allow the port to be open to the public. In another embodiment, no firewall setup is needed for the authentication servers 206. Rather, all traffic comes across port 443, which is already secure (i.e., HTTPS with encrypted transactions).

Then, per step 306, the connectivity between the MSO 221 and programmer 204 is validated. In one embodiment, the validation may include exchanging of port designations and IP addresses (as discussed above). Alternatively, the MSO may schedule a formal connectivity test that includes a "ping" and telnet set of tests between the programmer's servers and the MSO authentication and authorizations servers. During this connectivity test, the MSO and the programmer confirm access to one another's servers. If access cannot be confirmed, then corresponding operators for each the programmer and the MSO are contacted to aid in troubleshooting issues.

Next, executions of sample authentication and authorization transactions are performed. To accomplish this, the MSO provides the programmer a set of sample authentication and authorization transactions (i.e., formatted XMLs), which the programmer uses to "push" to the associated servers in its certification environment. The MSO and the programmer then confirm that the transactions are processed appropriately. If not, various troubleshooting techniques are used to determine why the transactions are failing, including e.g., looking through log files for corresponding request/response transactions.

Per step 308, digitally signed certificates used within the Secure Sockets Layer (SSL) 2-way interfaces are exchanged between the MSO 221 and programmer 204. In one embodiment, different servers may be used for the aforementioned authentication and authorization. Hence, separate Uniform Resource Locators (URLs) may be required for each server by the programmer 204.

For example, the authentication process may make use of Security Assertion Markup Language (SAML) for exchanging authentication and authorization data between security domains. As noted previously, SAML is a product of the OASIS® Security Services Technical Committee. The authentication process may follow the specification for Single Sign-On (SSO) between a service provider and the identity provider (e.g., the programmer 204 and MSO 221 respectively). Within the SAML domain, digital certificates are contained within a set of metadata that also includes other specific interface control values such as Time-To-Live (TTL) along with an applicable KeyDescriptor (i.e., public key portion of public/private encryption key pair). In the exemplary embodiment, both the MSO 221 and the programmer 204 generate specific metadata that is exchanged and loaded on one another's web servers. It is noted that the exchange of metadata may need to be accomplished using secure data exchange techniques (e.g., encryption, integrity protection such as cryptographic residues, etc.) as, in many instances, the metadata exchanged between the MSO 221 and programmer 204 is humanly readable. Once the metadata is loaded, then the trust relationship is formed, and assertions between parties can begin.

With respect to authorization, however, a more traditional Extensible Markup Language (XML) interface may be used. This may include, for example, passing data in a set of element structures that closely follows the concepts of eXtensible Access Control Markup Language (XACML). Within this framework, digitally signed certificates are exchanged and loaded to the MSO 221 and the programmer's 204 web servers, similar to the metadata. To complete the setup, a Common Secure Interoperability (CSI) session is conducted between the MSO 221 and the programmer 204, wherein the public key information is exchanged and both parties verify certificate signature, validity times, and revocation status.

Additional configurations by the MSO 221 and the programmer 204 may also be required outside the connectivity setup and certificate exchange. SAML general services are configured on associated web servers which further define attribute details used for processing of authentication assertions. The precise configuration of the SAML general services is performed within the framework of the application server being used and may vary based on product (e.g., Weblogic®, WebSphere®, Apache®, etc.).

Per step 310, the programmer 204 is then provided with a globally unique identifier (GUID) from the MSO 221; the programmer GUID is used during all authorization requests. Each time an authorization request is made from the programmer to the MSO 221, the programmer 204 provides its assigned programmer GUID. The programmer GUID is verified prior to any further processing by the MSO 221. The programmer GUID may, in one embodiment, comprise a 36 alpha/numeric-character string uniquely identifying the programmer in an obfuscated (non-readable) manner.

Appendices A-D hereto detail the functional requirements to which the provision of service according to one embodiment of the present invention must adhere. Appendix A hereto contains information on the formatting of the exemplary request (and response) according to one embodiment of the invention.

Appendix B illustrates exemplary requirements of the service request. The table of Appendix B includes both: (i) the XML element definitions, and (ii) any validation and behavioral rules to be applied by the request. The table describes the service specific XML elements in the body of the service's request (note that other elements common to all services may also be required). The element list includes basic XML element descriptions. The request header is assumed to be the standard header used unless otherwise indicated. Each service must use a standard header when sending responses or receiving requests from SOA.

Each element listed in the table is unique for this service, and is validated by a series of standard validation requirements. See Appendix C for the list of validation requirements that are common to all SOA services for the elements listed. Any additional unique validation requirements that should be implemented for this service are fully described as an exception requirement (as described elsewhere herein).

The table of Appendix D illustrates additional exemplary request requirements according to an exemplary embodiment of the invention.

A specific set of values defining the resources (e.g., channels) supported by a programmer 204 are also negotiated as part of the setup process of the method of FIG. 3. This set is implemented and maintained within the SOA 208 throughout the entire life expectancy of the trust relationship between the MSO 221 and programmer 204 (step 312). Any changes to these resource identifiers are communicated to the MSO 221; otherwise, authorization attempts may fail. This negotiation proceeds via a response to the aforementioned request. Methods for managing authorization requests/responses are discussed in greater detail below.

The table(s) of Appendices E, et seq. provides the detailed requirements for the service request definition, including the XML element definitions, as well as any validation and behavioral rules to be applied by the response.

Appendix E illustrates exemplary service-specific XML elements in the body of the service's response. The hierarchy of the requests is: subject (SubscriberID), resource (ResourceID), action (ActionID), environment (EnvrionmentID and SubscriberIP). The table of Appendix F illustrates exemplary response requirements.

Next, per step 314, after the MSO 221 and programmer 204 have begun communication, certain types of information, such as e.g., "co-branded" information, may be configured and displayed to the subscriber during the login process. In one embodiment, the co-branded information may comprise information such as banners, advertisements, etc., which have been pre-defined and approved by both the MSO 221 and the programmer 204. The co-branded text and images from the MSO 221 and/or the programmer 204 (i.e., co-branded information) are loaded to each party's web servers. The co-branded information is mapped to the content display pages on the programmer's 204 site, and login pages on MSO's site, which is mapped to the appropriate HTML forms/fields. Co-branded text and images are set up by the MSO 221 for each of the programmers 204 and each content or virtual channel. When a subscriber logs in via either the programmer 204 or the MSO 221 site, the co-branding information is displayed in the pre-approved manner as mutually defined and agreed upon between the MSO 221 and the programmer 204.

Lastly, per step 316, the subscriber is able to request content, and have the requested content delivered thereto using authentication and authorization processes discussed in greater detail below.

The table of Appendix G illustrates exemplary exception requirements according to one embodiment of the present invention. The table contains exemplary requirements related to business exceptions that pertain specifically to this service. In addition, this service includes any common SOA framework exceptions outlined in the SOA error guidelines of Appendix H.

Account Creation—

Figure 4:
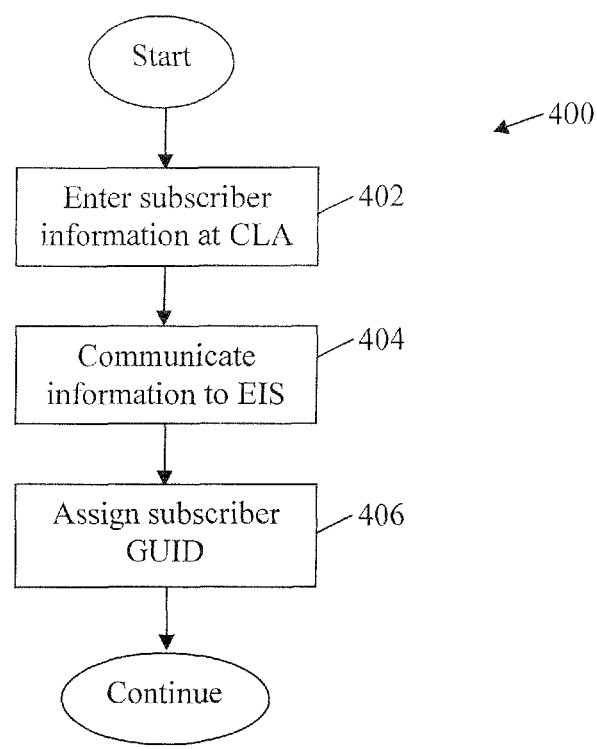
FIG. 4 is a logical flow diagram illustrating an exemplary method for creating a digital identity according to the present invention.

Methods for authentication and authorization (discussed in detail below) of a subscriber requesting access to content according to the present invention rely on the requesting subscriber having set up a digital identity. FIG. 4 illustrates one embodiment of an exemplary method for creating a digital identity according to the invention.

In this implementation, the subscriber is responsible for establishing his/her digital identity through the CLA 207, maintained in one embodiment by the MSO 221. As shown, per step 402, the subscriber is prompted to enter, and enters, information at the CLA 207. The subscriber enters information which is used to validate the subscriber's identity. Additional information may be entered, and/or the above-provided information may further be used to associate the subscriber to an MSO 221 business market (such as a demographic, service level type, etc.) or division (e.g., a geographic region, advertisement zone, etc.). Correlation of the subscriber to a division may be useful for example in enabling account records to be correlated to the subscriber, and/or for performing searches for service details during the authorization process (discussed below).

The subscriber may also be prompted for login and password values as part of the digital identity creation process of step 402. The login and password values are defined by the subscriber within for example, a given MSO 221 policy. The login and password values, once established and stored (at the MSO 221 or programmer 204) may then be used for future login attempts to the MSO site and/or to the programmer site in order to access services supported thereby.

It will be appreciated that while a login and password combination are described above, other implementations of the invention may utilize other security mechanisms or approaches. For example, in one variant, the login and password are also coupled with a challenge question (for which the user has previously provided an answer). In another variant, a user-specific or pseudo-unique icon is used, such that the user must enter (i) the login identity; (ii) the password, and (iii) a selection of "their" icon from among many possible icons. In yet another variant, the IP address and/or MAC address from which the user request is issued id evaluated in conjunction with the user-supplied login information to further validate that the request is coming from a registered address or device, respectively.

Per step 404, the CLA 207 communicates with the EIS 214. These entities communicate to set various attributes surrounding the subscriber's profile and per step 406, the EIS 214 assigns to the subscriber a subscriber identifier (e.g., GUID). In one embodiment, similar to the aforementioned programmer GUID, the subscriber GUID may comprise a 36 alpha/numeric character value, or may take other forms. The subscriber GUID uniquely identifies the subscriber in an obfuscated manner (i.e., not exposing any private information to internal or external parties). As will be discussed in greater detail below, the subscriber GUID is utilized to provide authentication and authorization of the subscriber when the subscriber requests content at the MSO and/or programmer site.

It is appreciated that various mechanisms for providing assistance in the event the subscriber is unable to create their digital identity may be employed. For example, by entering the subscriber's zip code or region (e.g., state, city), the subscriber may be directed to division-specific contact details, along with online information aiding the user with usage on various service offerings. Frequently asked questions (FAQs) and access to an online help via an "ask" or "help" feature may also be provided. Access to online assistance may also be provided during the authentication process, if required.

As noted above, the subscriber may, in one embodiment, be required to also create a login and password (or enter other verification information) at the programmer's website. According to this embodiment, the programmer 204 implements its own IDMS-based solution which may or may not link accounts stored therein to those of the MSO 221. The aforementioned linking being used to reduce the need for ongoing authentications (discussed herein below).

In order to provide content to a requesting subscriber, the subscriber must be authenticated and authorized to view the requested content.

Authentication with Linked Accounts—

In one embodiment of the invention, a single subscriber is authenticated only once, the process creating a link between the MSO 221 information for the subscriber and the programmer information for the same subscriber (i.e., federating the accounts). According to this embodiment, the subscriber will not have to be authenticated each time they attempt to view content, but rather are authenticated only once. In one variant, the methods and apparatus of co-owned, co-pending U.S. patent application Ser. No. 12/834,801 filed concurrently herewith and entitled "APPARATUS AND METHODS FOR CONTENT MANAGEMENT AND ACCOUNT LINKING ACROSS MULTIPLE CONTENT DELIVERY NETWORKS" which has been previously incorporated by reference in its entirety, may be utilized for providing identity federation.

Figure 5:
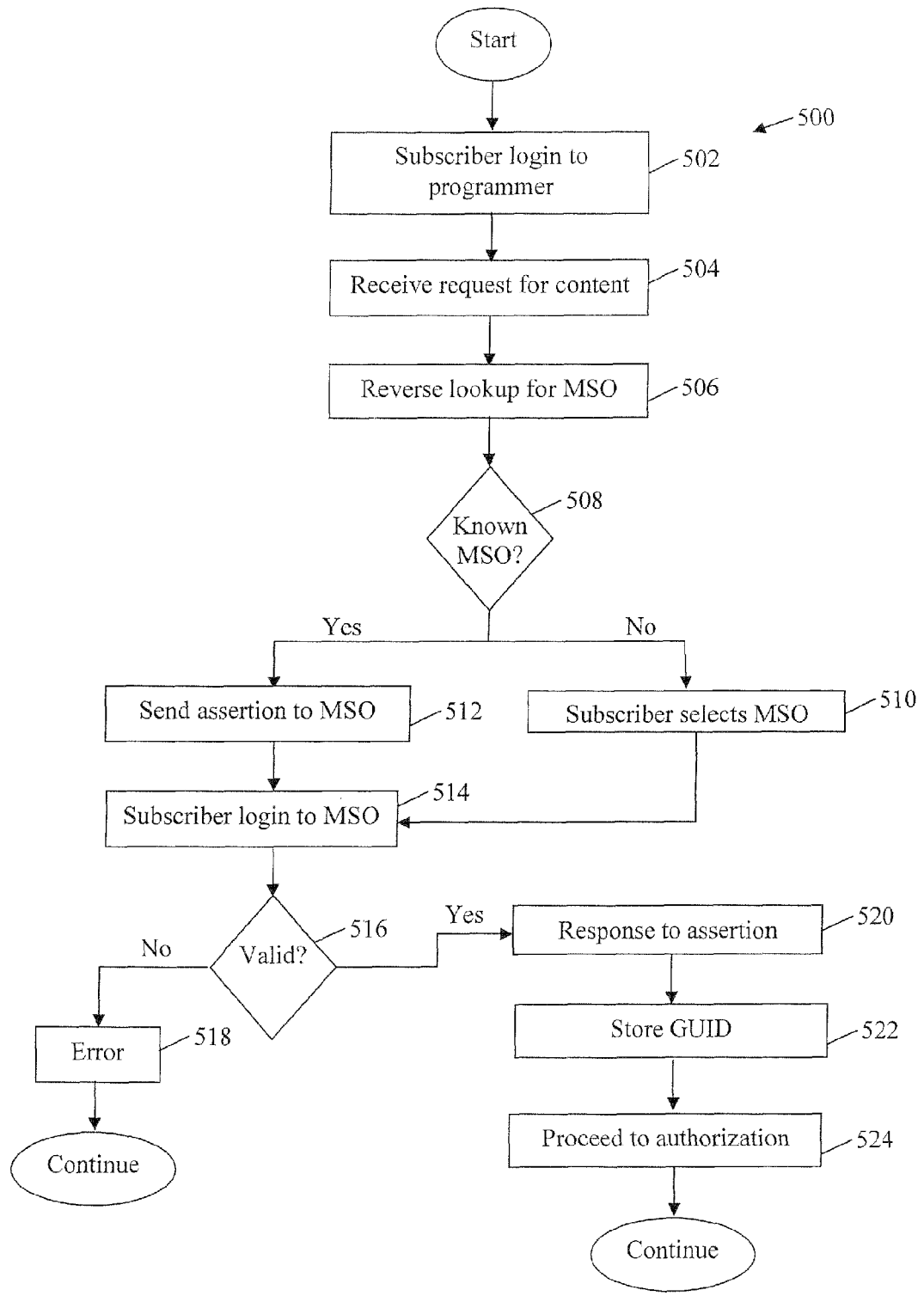
FIG. 5 is a logical flow diagram illustrating an exemplary method for federated authentication according to the present invention.

To accomplish the aforementioned account federation, the programmer 204 must employ at least a basic mechanism for identity management (such as e.g., an IDMS). An exemplary method of federated authentication is illustrated in FIG. 5.

As shown, per step 502, the subscriber logs into a programmer web site in order to request access to protected content (step 504). As noted above, the content may be protected by being placed behind a firewall, however other methods of content protection may alternatively or additionally be employed (such as e.g., encryption, hashing or cryptographic residue for integrity protection, etc.). The type of login (e.g., password and user ID combination), information required at login and creation of a login identity are each controlled by the programmer 204 itself. For example, the programmer 204 determines whether the subscriber may identify him/herself within the programmer website by e.g., providing an email address and password combination, or any of the other mechanisms previously described with respect to FIG. 4 (e.g., challenge question, user-specific icon, etc.).

At step 506, upon subscriber login, the programmer 204 uses the IP address of the requesting subscriber device to perform a reverse lookup of the MSO 221 associated to that device (i.e., IP address aaa.bbb.ccc.ddd is associated with MSO XYZ). It is determined at step 508 whether the MSO 221 (XYZ) associated to the subscriber device address is a "known" MSO 221; i.e., is at that point known to the programmer 204. It will be appreciated, however, that alternative methods for determining the MSO 221 associated to the subscriber and/or to the subscriber device may be utilized, the reverse lookup method being merely exemplary. For instance, the programmer 204 may obtain a MAC address for the device issuing the request, and use that MAC address to perform the reverse lookup. As yet another alternative, a programmer or third party database of user/MSO associations (such as by user name, email address, etc.) may be accessed. Myriad other approaches may be used as well to make this determination.

If the MSO 221 of the requesting device is unknown or cannot be determined, then the subscriber is provided with a list of MSO's from which the subscriber may select the appropriate provider (step 510). In one embodiment, the list may be provided as a pop up window, or alternatively the subscriber may be redirected to an alternate web page for selecting the appropriate MSO 221. Alternatively, the user may be prompted to simply enter the name or identifier of their MSO (e.g., TWC). A "word wheel" type function of the type known in the user interface arts may optionally be used; i.e., as the user enters the letter "T", the available choices of MSOs are narrowed to only those beginning with the letter "T", and so forth.

Once the appropriate MSO 221 is selected (step 510), or if the MSO 221 of the requesting device is known to the programmer 204, the programmer 204 sends an assertion to the identity provider 218 of the appropriate MSO 221 (step 512). In one embodiment, the assertion comprises an SAML Extensible Hypertext Markup Language (XHTML) form; e.g., a Hypertext Transfer Protocol (HTTP) POST message. The exemplary POST message is transmitted to the identity provider server 218, and includes the following information fields or elements:

SAMLRequest—contains a NameIDPolicy type of Persistent

RequestedAuthnContext—URI used to identify the programmer

RelayState—optional

©Copyright 2010 Time Warner Cable, Inc. All rights reserved.

The "Persistent" value is optional, and defines the constraint on the request. For example, the use of "Persistent" means the requestor (programmer) expects to use the subscriber GUID value returned from the MSO to federate logins. In some cases the field, while optional, does not hold much value, as the MSO may in many instances always pass the same subscriber GUID value regardless of whether the programmer intends to federate or not. However, the "Persistent" value may be utilized in cases where the "Transient" subscriber GUIDs that change each time (occurs when federation is not used) are utilized.

At step 514, the subscriber is redirected to a login page for the MSO 221. At the MSO 221 login page, the subscriber is prompted to provide login information (e.g., MSO-specific login information). The subscriber must log into the MSO 221 web page via the identity provider server 218, since no session has been started. That is to say, a session is started each time the subscriber logs into the identify provider. The session remains active for a predefined period (e.g., 15 minutes), and terminates automatically after this time period expires for security purposes, regardless of whether the user is still on the programmer's web site. Having the session active allows the subscriber to move from one programmer to another without re-authenticating or across video assets if asset based authorizations are invoked. However, authorizations are still required regardless of the presence of an active session when changing programmer sites and/or video assets.

In one embodiment, the login requires the subscriber to enter the login and password values which were established during creation of that subscriber's digital identity (see FIG. 4 above). Although separate logins are required under this embodiment; i.e., for the programmer website and the MSO website, it will be appreciated that the user may be permitted to use the same or similar information to log into both sites. For example, both the programmer website and the MSO website may permit the user to use an email address as a username. Accordingly, a single subscriber may use the same username (email address) to log into both sites. A common password, challenge phrase, etc. may also be utilized if desired.

The MSO identity provider 218 examines the provided login information to determine whether it is valid at step 516. If the login information is not valid, an error message is transmitted to the subscriber (step 518).

If the subscriber's login to the MSO 221 fails at step 516, the subscriber may be provided an opportunity to be redirected to the CLA 207 in order to resolve the issue. For example, the subscriber may resolve the issue by directly logging into the MSO website. A successful login at the MSO website causes the subscriber to be redirected back the programmer site, and the method repeats at step 512. If the subscriber is unsuccessful at logging into the MSO website directly, the subscriber may be directed to a support page, phone number, email address, or live chat. In another example, if the subscriber has not yet created a digital identity, the subscriber may do so at the MSO website (see FIG. 4 above).

If the subscriber's login to the MSO 221 is successful (at step 516), the MSO identity provider server 218 processes the assertion (sent at step 512), and provides a response at step 520. In one embodiment, the response to the SAML assertion is an XHTML form which is sent to the browser containing the following elements:

SAMLResponse—contains a Pseudonym and Subscriber GUID

RelayState—if provided in the initial request

©Copyright 2010 Time Warner Cable, Inc. All rights reserved.

The "Pseudonym" is a permanent name identifier which the MSO provides to the requestor or programmer that opaquely identifies the user or for MSO the subscriber. This value can be used by the programmer to federate with the account, and may be used across multiple sessions and for extended periods of time. In one embodiment, the Pseudonym is not used, and instead the GUID is used as both a persisted and temporary value provided to the programmer in either a federated or non-federated model.

The "RelayState" identifies the destination that the user (e.g., MSO subscriber) is attempting to access (i.e., programmer URL or guarded deep link). This value is passed by the programmer with the SAML request to the MSO's identity provider. Upon successful user login, the SAML response is passed back to the user's browser, which includes the RelayState that routes the user to the associated URL containing guarded content.

The browser then sends the information (e.g., SAML assertion) back the programmer 204. Per step 522, the programmer 204 may link its stored subscriber login information to that of the MSO 221 by storing the subscriber's GUID within the programmer's protected data store(s) of their IDMS framework, so that future linking or authentication assertions are advantageously not required.

Lastly per step 524, the process continues to authorization of the subscriber to view the requested content. The process of authorization will be discussed in greater detail below.

Authentication Without Linked Accounts—

Figure 6:
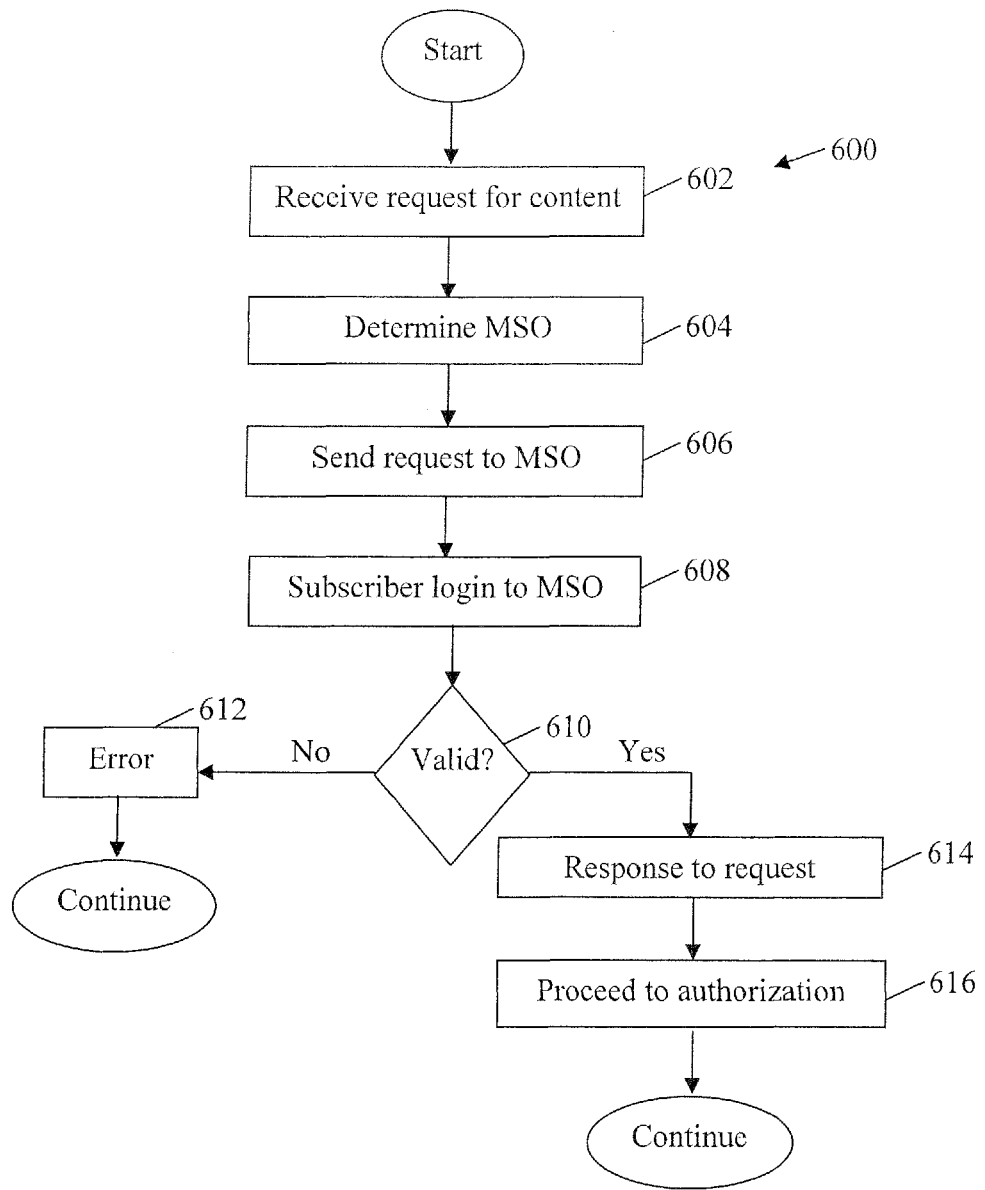
FIG. 6 is a logical flow diagram illustrating an exemplary method for authenticating a user according to the present invention.

Referring now to FIG. 6, a second exemplary method for authenticating a user is illustrated. The method of FIG. 6 is utilized in the instance the programmer 204 does not link subscriber information stored therein with that of the MSO 221 (e.g., does not utilize identity federation). According to the method of FIG. 6, the programmer does not support any form of identity management, and simply relies on the MSO 221 to handle the login process for access to content which the programmer has placed behind protected firewalls (or has otherwise protected in some fashion).

As noted above, SAML supports both federated (linked accounts) and non-federated authentication models, each having their own relative strengths and weaknesses. For example, in the federated model, the user only needs to access the MSO login page once to authenticate; thereafter, the user simply uses the programmer's login capabilities. This eliminates the need to access the MSO login page if the programmer's site is the primary origin for content viewing. However, in the federated model, the MSO has no control over session management, and is reliant on the authorization service 202 to validate whether the user is still an active subscriber. Furthermore, in certain implementations, the federation model requires that the user remember two sets of usernames/passwords.

Alternatively, in the non-federated model, the programmer does not have to support IDMS functionality, and may be totally reliant on the MSO to manage username/password functions and associated identities (i.e., sub-accounts). Furthermore, the MSO is able to recognize during the authorization request that a subscriber is no longer active, and may eliminate the need for a programmer to execute an authorization request for that subscriber. However, under the non-federated model, the user is required to access the MSO's login page for each browser session, and again after a predetermined period from the start of a session, which is based on the expiry value contained in the authorization response (e.g., 24 hours). Still further, the MSO may be required to support complex login pages managed through iframes and pop-ups to mask redirection from the programmer's site to an MSO hosted login page Per step 602 of the method, a request for access to protected content is received from the subscriber at the programmer website. According to this method, the subscriber need not login to the programmer's site, because the programmer 204 does not support an IDMS or other system for maintaining subscriber information. For instance, in one case, the subscriber directly or indirectly enters the programmer's website URL into their Internet browser (e.g., clicks on a hyperlink or the like), and when at the site, selects content for download, thereby causing a request to be sent to the programmer's content server.

When the request is received, an MSO 221 associated with the subscriber and/or the device is determined at step 604. This can be accomplished for example using the methods previously described herein, or other approaches. For example, the subscriber may be redirected to a page on the programmers' site where the user can select from a dropdown list or menu structure or other mechanism, their associated MSO. Thereafter, the corresponding login page will be displayed to complete the authentication process based on the implemented approach (i.e., redirect, popup or iframe). Note that the programmer may provide MSO selection capabilities on a main page, foregoing the need to redirect to a sub-page.

In another embodiment, the programmer only supports guarded content for the MSO, and when the user selects something requiring login, the subscriber is presented a login page based on the implemented approach (i.e., redirect, popup or iframe).

In yet another embodiment, the programmer can derive the subscriber's MSO based on the IP address from which they originated. Then, the programmer can elect to initiate the MSO login process based on the implemented approach (i.e., redirect, popup or iframe) and/or confirm with the subscriber their MSO to ensure the correct login page is presented.

Next, per step 606, the programmer 204 sends the request to the identity provider 218 of the associated MSO identified in step 604. In one embodiment, the programmer 204 sends an XHTML form that POSTs to the identity provider server 218, the POST containing the following elements:

SAMLRequest—contains a value of AuthnRequest type of Transient

RelayState—optional

©Copyright 2010 Time Warner Cable, Inc. All rights reserved.

The AuthnRequest type from the programmer can contain a value of either "Transient" or "Persistent" that denotes their intended use of the GUID returned in the response. The Transient value indicates that there is no federation involved, and the GUID will be used for the length of the session, whereas the Persistent value indicates the programmer intends to federate or link accounts.

The identity provider 218 determines that no login session has been created or is active, and redirects the subscriber to the MSO login page, where the subscriber must login to validate credentials (step 608). According to this method 600, the subscriber has only one set of login credentials (i.e., those necessary to log into the MSO site). Since the programmer 204 in the embodiment of FIG. 6 does not store the subscriber GUID, the subscriber must log into the MSO 221 (via the identity provider 218) for every new web session.

Per step 610, the login credentials are validated. If the entered credentials are not valid (do not match stored information for the subscriber, and/or no stored information for the subscriber can be found), an error message is presented to the subscriber (612). Failure during the login process may cause the subscriber to be redirected to CLA 207 to resolve the conflict by re-trying the login process, creating a digital identity (if one has not yet been created), seeking help from online resources, or directly contacting the MSO 221.

If the credentials are valid, the identity provider 218 returns a response to the request at step 614. In one embodiment, an XHTML form is returned to the browser which returns the following elements to the programmer 204:
  SAMLRepsonse—contains Pseudonym (used as transient Subscriber GUID)
  RelayState—if provided in the initial requests
  ©Copyright 2010 Time Warner Cable, Inc. All rights reserved.

Lastly, once the subscriber is authenticated, the method proceeds to subscriber authorization (step 616), where it is determined whether the subscriber is authorized to view the requested content. The process of authorization will be discussed in greater detail below.

Account Decoupling (De-Federation)—

As noted above, in certain embodiments, the programmer 204 may utilize a separate IDMS, and may link a subscriber account contained therein to an MSO 221 subscriber account for the same subscriber. Later, it may be necessary to decouple or unlink the subscriber's account, such as if the subscriber is no longer a customer of a first MSO, and instead now is a customer of a second MSO. This may be executed through a backoffice "call" or communication from the programmer 204 to the MSO 221.

Figure 7:
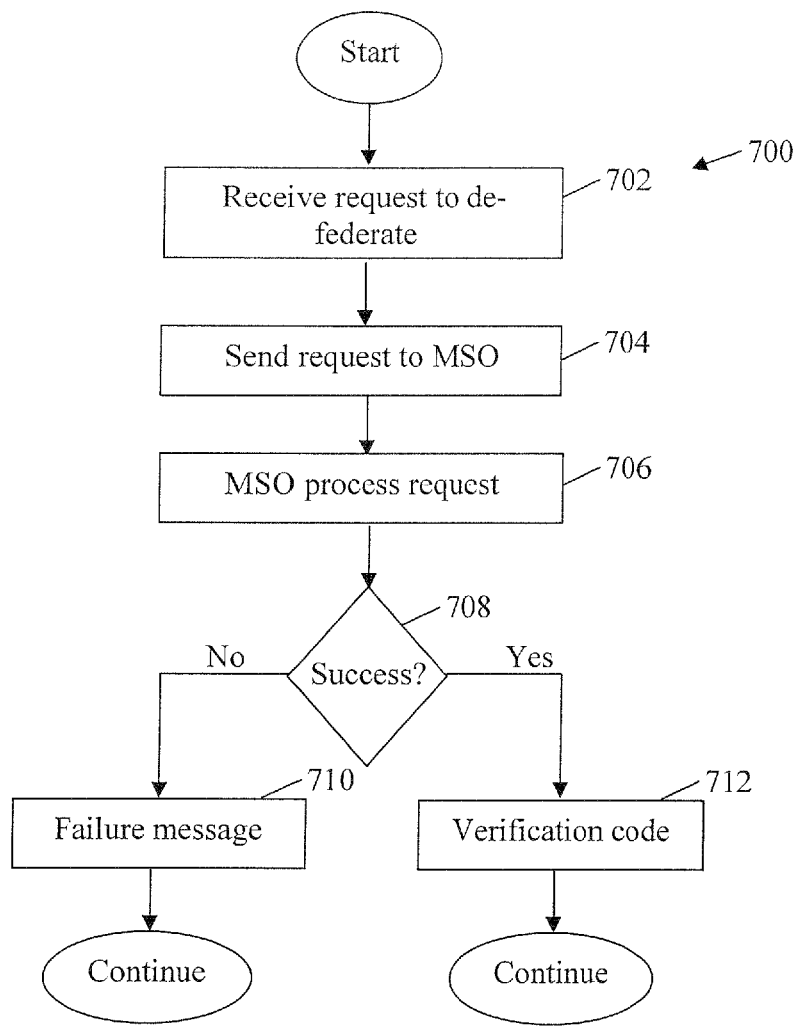
FIG. 7 is a logical flow diagram illustrating an exemplary method for decoupling or unlinking a subscriber account according to the present invention.

To accomplish the de-federation process, the programmer 204 in one embodiment must create a set of web pages which allow the subscriber to conduct the unlinking process, including verifying the subscriber wants to remove the link of their account with the programmer 204 to the MSO 221. FIG. 7 illustrates an exemplary embodiment of a method which may generally be used for decoupling or unlinking a subscriber account.

As shown, per step 702 a request to de-federate the account is received from the subscriber at the programmer 204. In response to receiving the subscriber request, the programmer 204 develops a request to be sent to the MSO 221 (step 704). The programmer 204 may utilize the Name Identifier Management Protocol or other such mechanism to generate and send the request to the identity provider 218, for example, an <ManageIDNameRequest> containing the subscriber's pseudonym may be sent.

The Name Identifier Management Protocol provides mechanisms to change the value or format of the name of a principal (subscriber). The issuer of the request can be either the service provider (programmer) or the identity provider (MSO). The protocol also provides a mechanism to terminate an association of a name between an identity provider and service provider.

The ManageNameID within the Name Identifier Management Protocol provides a way to initiate name identifier changes or terminations. For example, after establishing a name identifier for use when referring to a principal, the identity provider may want to change its value and/or format. Additionally, an identity provider might want to indicate that a name identifier will no longer be used to refer to the principal. The identity provider will notify service providers of the change by sending them a ManageNameIDRequest. A service provider also uses this message type to register or change the SPProvidedID value (included when the underlying name identifier is used to communicate with it), or to terminate the use of a name identifier between itself and the identity provider.

The identity provider 218 (and/or other MSO 221 entities) processes the request at step 706. If the request is processed successfully (step 708), then per step 712, a verification code is returned to the programmer 204. In one embodiment, the verification code may comprise a <ManageIDNameResponse> with a code verifying the success of the unlinking. If the de-federation is successful, any future attempts by the subscriber to view protected content will be denied. The subscriber must re-establish its identity via the authentication process (FIG. 5 or 6), which may result in the re-linking of the subscriber's account (e.g., in the case of the methodology of FIG. 5).

If the request is not processed successfully (step 708), then, per step 710, a failure message is returned to the programmer 204. In one embodiment, the failure message may comprise a <ManageIDNameResponse> with a code indicating the failure of the unlinking. The programmer 204 can initiate another request if the response provided by the MSO 221 indicates failure to unlink the accounts.

In another embodiment, the methods and apparatus of co-owned, co-pending U.S. patent application Ser. No. 12/834,801 and entitled "APPARATUS AND METHODS FOR CONTENT MANAGEMENT AND ACCOUNT LINKING ACROSS MULTIPLE CONTENT DELIVERY NETWORKS" which has been previously incorporated by reference in its entirety may be utilized for de-federating accounts.

Authorization—

Figure 8:
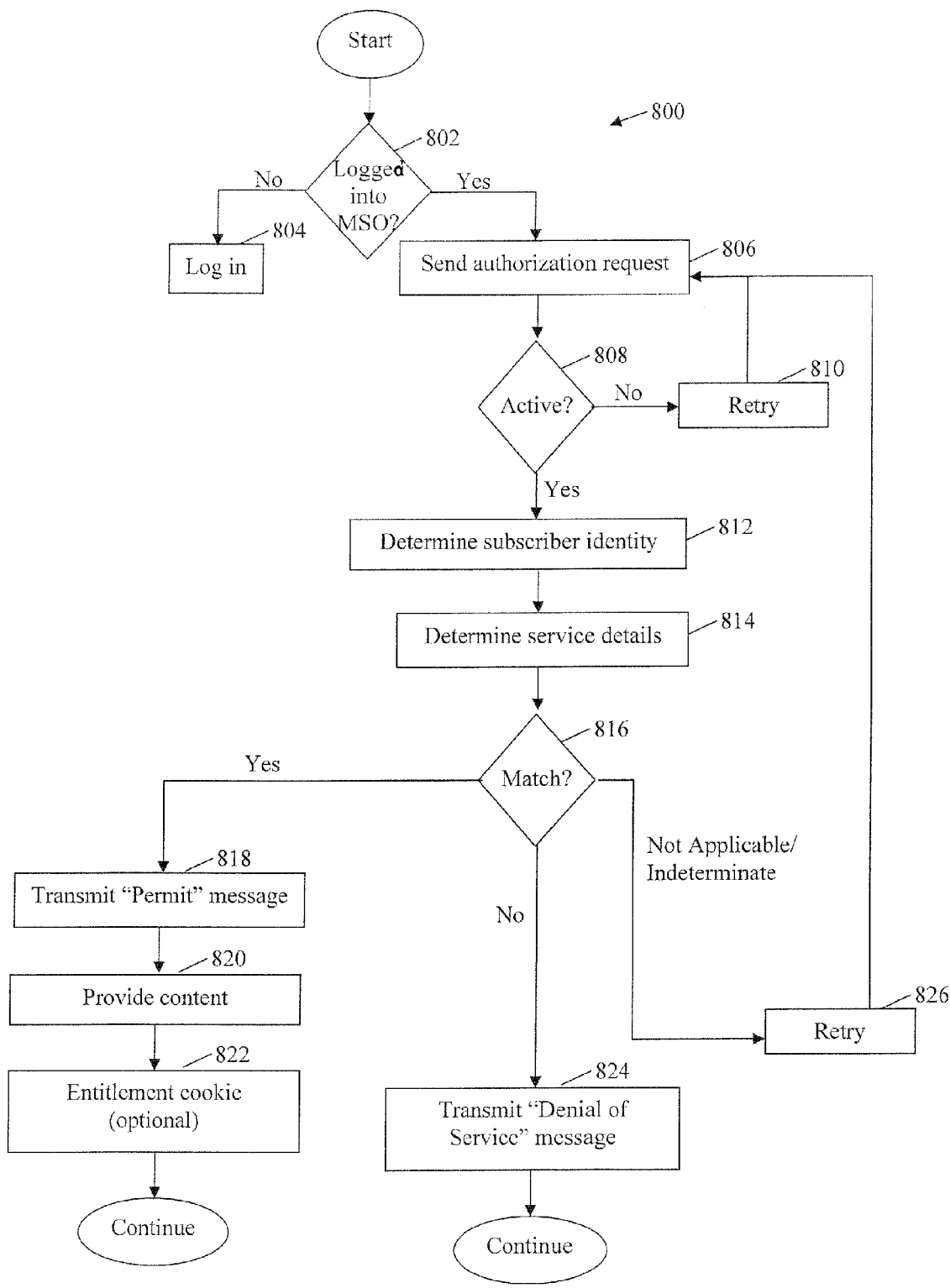
FIG. 8 is a logical flow diagram illustrating an exemplary method for validating a subscriber's entitlement to content being requested from a programmer according to the present invention.

As discussed above, once a subscriber is authenticated, it must be determined whether the subscriber is authorized to view the particular content requested, and optionally if any use (or even distribution) restrictions apply. An exemplary authorization process is illustrated in FIG. 8. The authorization process is used to validate a Subscriber's entitlement to content being requested from a programmer 204.

In one embodiment, authorization is conducted real-time against various backend information management systems within the MSO 221. In one example, the authorization process (e.g., FIG. 8) is performed at least once within a 24-hour period. However, the frequency and level of authorization transactions may vary according to e.g., pre-determined, mutually defined schemes implemented by the MSO 221 and/or the programmer 204.

As illustrated, per step 802, before an authorization can take place, it is determined whether the subscriber is logged into the MSO site. The subscriber must have started a session through either the programmer's IDMS application (if account linking is supported by the programmer 204), or by logging into the identity provider server 218 (if account linking is not being supported by the programmer 204). If it is determined that the subscriber has not yet logged in, per step 804, the subscriber is redirected to either the programmer's or MSO's co-branded login pages, where a session may be setup.

Next, per step 806, an authorization request is sent from the programmer 204 to the SOA 208 (at the MSO 221). In one embodiment, the request may include the subscriber GUID acquired during the authentication process, along with other information including one or more of the following elements:

SubscriberID—contains the Subscriber GUID

ResourceID—Identifies the content being requested (individual channels or 'ALL')

ActionID—default value of "View" (reserved for future use)

MediumID—default value of "Internet" (reserved for future use)

SubscriberIP—contains the originating IP address (reserved for future use)

©Copyright 2010 Time Warner Cable, Inc. All rights reserved.

The authorization request may also include the pre-assigned programmer GUID provided by the MSO 221 (discussed above), which is in one embodiment, defined within the XML element structure.

Note that in one embodiment, the ResourceID element contains identifiers for multiple resources supported by a programmer 204 (i.e., 1 thru X channels, or a request for ALL), thus reducing the number of individual authorizations per subscriber. As will be discussed below, the MSO 221 may then return a single response which provides individual decisions for each resource.

At step 808, when an authorization request is received, the SOA 208 immediately interrogates the EIS 214 to validate that the subscriber GUID is active. If the subscriber GUID is not active, a message is returned to the programmer 204 indicating that the programmer may retry (step 810) sending the authorization request.

If the subscriber GUID is active, the SOA 208 continues to process the request for information. Per step 812, the SOA 208 determines the subscriber identity. Acquisition of subscriber identity may include determining an associated division ID, billing system ID, etc.

At step 814, the SOA 208 begins collection of service details associated to the subscriber including e.g., service level. The SOA 208 initiates a series of requests to backend information management systems, or to local data caches within the MSO 221, for retrieval of service details after the identity of the subscriber's account has been obtained from the EIS 214. The information collected is then compared to the request to determine authorization at step 816.

If the service details match the requirements for the requested content, a "Permit" message is transmitted to the programmer 204 (step 818). For example, if the service details indicate that the subscriber is currently purchasing a premium level of service, and the requested content is within the premium package, the subscriber will be permitted access to the content. The Permit message indicates that the subscriber was found to have rights to the resource (i.e., active account and active service). Accordingly, the content may be provided to the subscriber (step 820).

At step 822, the programmer 204 may elect to set an entitlement cookie on the subscriber's browser after receiving a Permit decision from the MSO 221 (step 818). The entitlement cookie allows the subscriber to view content from the programmer's site without requiring an additional authorization request to be issued, unless the cookie is cleared or the subscriber uses a different device. While the user experience is heightened by establishing a cookie and eliminating delays in content viewing when another authorization request is conducted, security concerns may be raised. For example, a risk of fraud through reuse of the cookie across a wider user community that is not subscribing to paid services of the MSO 221 and/or the programmer 204 is increased.

However, it is noted that each authorization request has an expiry value in the exemplary embodiment, and the programmer must adhere to the same value in the cookie, which is tested during certification. The default is 24-hours, but the value is configurable by the MSO based on ResourceID. Reducing the expiry value can help reduce fraud possibilities by requiring more frequent authorizations. In addition, the cookie is meant to be specific to a programmer and associated resource (i.e., channel or brand), and not ubiquitous across programmers or other resources, thus, requiring the subscriber to login each time if outside the 15-minute authentication session and execution of another authorization, regardless of within the 15-minute session, or if accounts are federated.

It is appreciated that, if a cookie is used, the cookie does not contain the subscriber GUID in order to protect the privacy of the subscriber. In other words, the GUID should not be persisted in the cookie. While an obfuscated value, the GUID is still permanently linked to the subscriber's account under one embodiment of the authentication service.

In lieu of the cookie, the programmer 204 may elect instead to persist the value of the last good authorization request for each subscriber within the programmer's 204 backoffice application(s). The stored authorization request may be used for future subscriber requests within for example, a 24-hour period for the same content. Using this embodiment, additional authorization requests for the same subscriber (and for the same content) are reduced. The programmer 204 may resort to the stored authorization request as well as in the event of a failed authorization from the MSO 221 indicating an "Indeterminate" response. As discussed elsewhere herein, an Indeterminate response indicates that the lookup to MSO 221 backend information systems failed to return expected results or timed out during the request.

The programmer 204 can reference the last successful authorization (as discussed above) when the subscriber terminates and reestablishes their web session. For example, if the content requested and associated length of time is within e.g., a 24-hour expiration window, then no further authorizations are required. However, if the authorization is no longer within the 24-hour (or other predetermined length of time) expiration window for the requested content, then the programmer 204 is required to execute another authorization, such as according to the method of FIG. 8.

As noted previously, the aforementioned process can be used by the programmer 204 for authorizations that failed to produce any response from the MSO 221, or for those which receive an Indeterminate response. In these situations, the programmer 204 may elect to default to the last positive authorization, and provide content to the Subscriber according to one or more policies for doing so, which are predetermined and agreed upon by the MSO 221 and programmer 204. For instance, the content may be provided with copyright/DRM or other types of protection in order to limit its distribution/copying. Or, the content may only be provided with certain "trick mode" or Start-over type features (or lack thereof).

Referring again to FIG. 8, if the service details do not match the requirements for the requested content, a "Deny" message is transmitted to the programmer 204 (step 824). The Deny message indicates that the subscriber was found not to have rights to the resource (e.g., they have an active account, but not an active service). If service is denied, the programmer 204 provides a pre-defined message to the subscriber indicating the reason; in one embodiment, the message may further include instructions or a link for online help to aid in resolving the denial.

In some instances the MSO 221 may not be able to determine whether the request for content and subscriber service details match. Accordingly, the MSO 221 may transmit a "Not Applicable" or an Indeterminate message. The Not Applicable message indicates that the SystemID, ResourceID, and/or SubscriberID are not configured, associated and/or recognized. As discussed elsewhere herein, an Indeterminate response indicates that the lookup to MSO 221 backend information systems failed to return expected results or timed out during the request.

The decision table of Appendix I illustrates an exemplary mechanism for how the service renders a decision, what should be logged to the SOA logging system, and what reason should be returned to the programmer with the rendered decision. Note that the numeric value in the "Reason" column of Appendix I may be returned in the reason field of the response as discussed elsewhere herein. In one embodiment, the text in the "Reason Description" column is not returned as part of the service response.

In response to receiving the Not Applicable or an Indeterminate message, the programmer 204 may elect to automatically issue another authorization request to the MSO 221 (i.e., retry) in an attempt to obtain a less ambiguous response (step 826). As noted above, in response to an Indeterminate message, other methods for authorizing the subscriber may be used, such as reverting to a previously authorized request.

In many instances, a decision value of Indeterminate may be used to indicate that one or more pieces of information passed on the request were not recognized/provided, and are likely outdated and require updating, by either the programmer 204 or the MSO 221, if a different response is to be expected.

The decision to use an automated retry process (step 826) is an implementation detail which is determined by both the MSO 221 and the programmer 204, including the amount of retries (i.e., number and frequency) permissible. Generally, the method of FIG. 8 does not employ a retry step where the decision value is Deny, since (1) data on a subscriber's account is static for e.g., a 24-hour period and unlikely to change, and (2) continued delays in determining authorization (positive or negative) will frustrate the subscriber during the experience. However, it such a retry step may be included if desired.

It is also noted that while authorization under the method of FIG. 8 discusses evaluation of the service level or tier of the subscriber, the individual channels to which a subscriber may have access may also be evaluated as the subscriber's service details (step 814). According to this embodiment, any resource or channel falling within e.g., the MSO (for instance, cable) programming service tier (CPST) will qualify for a Permit response against a subscriber's account that is in an active status, and where service is purchased. In yet another embodiment, the status on the account (e.g., seasonal or non-pay) may also be evaluated in addition to checking individual channels on a division-by-division basis.

In one exemplary embodiment, the transmitted Permit, Deny, Not Applicable and Indeterminate messages received from the SOA 208 will each contain the following information:

ResourceID—identifies the content being requested

Decision—identifies the authorization status (e.g., Permit, Deny, NotApplicable, Indeterminate) for each ResourceID provided in the authorization request Reason—identifies the reason for any Decision other than "Permit"

Expiration—contains W3C combined data/time UTC (e.g., YYYY-MM-DDTHH:MM:SSZ)

©Copyright 2010 Time Warner Cable, Inc. All rights reserved.

Exemplary business rules which may be utilized to make decisions on whether to send any of the aforementioned messages are illustrated in the table of Appendix J.

It is also noted that rules or functional restrictions can be relayed from the MSO to the programmer 204 via messaging conducted pursuant to a particular subscriber request, or alternatively can be pre-positioned within the programmer site as a rule set (i.e., every Gold subscriber request has Rule Set 1 applied, every Silver subscriber has Rule Set 2 applied, and so forth). The former approach has the advantage of being able to particularly tailor the rule(s) sent to the programmer 204 to the individual subscriber (e.g., via the subscriber GUID, MAC address, or other unique information), yet necessitates extra messaging traffic and latency.

Additionally, the MSO 221 and/or programmer 204 may, throughout the authorization process (FIG. 8) provide so-called "eye wash" to the subscriber in the form of e.g., advertisements, co-branding messages, telescoping materials, audio, or other forms of streaming content to reduce "dead air", thus enhancing the overall user experience.

Potential delays in the authorization process may be addressed by causing the programmer to return the subscriber to the RelayState URL and start playing advertisements within their player while the authorization completes. In many instances, advertisements are shown prior to displaying a requested video; therefore, pre-running the advertisement would be consistent in the current user experience while the authorization is executed.

In the event a DENY response is returned, then the programmer can use the opportunity to suggest an "up-sell" of MSO services and/or supply a message to contact the MSO for additional information on how to access online content including telephone numbers and web site URLs.

Appendix K illustrates exemplary reason codes per MSO organizational unit (e.g., per division). Each cell in the table represents the subscriber message content to be returned for that reason for that division(s). Although only the Greensboro (GSO) divisions are illustrated in the given table, it is appreciated that other divisions may use similar messages and/or reason codes (such as e.g., New York City (NYC), Rochester (ROC), Syracuse (SYR), Charlotte (CLT), etc.). The table contains the values to be configured for development (DEV) and quality assurance (QA) environments. The development environment is used for the development of the authentication and authorizations services. The quality assurance environment is used for testing of the authentication and authorizations services. For the authorization service, there are multiple QA environments used for functional, performance and regression testing as well as one used for external testing with programmers during the formal certification process (discussed above).

Various MSO 221 entities are responsible for working with the business owners (or programmers) to determine values to be used in production. However, in the absence of explicit business input on production values, all divisions are configured to use the "Other" value listed in the table.

Session Control—

Control of a subscriber's web session may be directed by the programmer 204 in one embodiment (such as via the account linking or federation discussed above). Alternatively, the MSO 221 may control the web session by e.g., hosting all or part of content streamed by programmers 204, and/or both the MSO 221 and programmer 204 may provide control mechanisms thereby allowing one or dual paths for subscriber access.

According to the linked or federated embodiment, the MSO 221 will only have session awareness during the initial authentication process for account linking (see FIG. 5). Therefore, the programmer 204 is responsible for session management fraud protection (limiting the number of simultaneous sessions on the site) as long as the MSO 221 and programmer accounts for the particular subscriber remain linked.

Alternatively, if the programmer 204 relies on the MSO 221 to manage the login process (e.g., the non-federated approach of FIG. 6), then session control is established through the MSO's identity provider server 218 each time the subscriber elects to access protected content (e.g., "guarded" behind the programmer's 204 firewall) where there is not already an established session. If there is not an established session, the subscriber is redirected to the MSO's login page, where the subscriber must establish a session (i.e., log in) before continuing as described above; i.e., the aforementioned authentication and authorization methods.

For either of the above described embodiments (linked and non-linked accounts), the programmer 204 is provided a pseudonym and GUID upon successful login (i.e., at authentication). The GUID may then be used for authorization requests throughout the established session.

In one embodiment, the pseudonym is transient and only valid during the session. It is the responsibility of the programmer 204 to destroy the invalid pseudonym and information relating thereto, once the session expiry time (or other condition, such as number of accesses) has elapsed, or when the programmer 204 detects that the subscriber has exited the programmer's site or a restricted set of web pages. In addition, the programmer 204 may send an XHTML form that will POST to the identity provider server 218 containing the following information:

LogoutRequest
Transient NameID pseudonym
Optionally—Session Index
©Copyright 2010 Time Warner Cable, Inc. All rights reserved.

The identity provider server 218 processes the request, and returns a XHTML form to the browser which is redirected to the programmer 204 with the following elements:

LogoutResponse
Status
©Copyright 2010 Time Warner Cable, Inc. All rights reserved.

The programmer 204 then displays to the subscriber a message that the subscriber's session has terminated, and may provide the subscriber with the ability to re-establish a session (as desired).

It is appreciated that various metrics on the "user experience" may be collected and shared by both the MSO 221 and the programmer 204 throughout each user session. The scope of the information gathered and related web analytics applied is defined by both the MSO 221 and programmer 204. For example, such metrics may include the time an established session lasts, the ratio of successful login attempts to total login attempts, etc. Examples of authorization based metrics are listed in the tables of FIG. 9.

Performance, Operational, and Security Requirements, Errors and Logging—

The performance requirements utilized with the exemplary embodiments of the invention address expected service response times and required task-level accuracy. Exemplary performance requirements are illustrated in Appendices L-S. As defined therein, the requirements are only measurable within the internal service boundaries.

Appendix L illustrates exemplary volume and speed requirements.

Appendix M illustrates exemplary reliability and availability requirements.

Appendices N-O illustrate exemplary operational requirements; the operational requirements describe the environment in which the service will exist. This table contains requirements on the physical environment, hardware, software, communication interfaces and data formats.

The table of Appendix P illustrates exemplary requirements related to the security of the service. More specifically, this table provides details related to service access and the sensitivity of data processed by the service.

Exemplary requirements for logging, monitoring and alarming are illustrated in Appendix Q.

Sample SOA service summary logging reports are illustrated in Appendix R.

Appendix S illustrates exemplary disaster recovery requirements.

User Device—

Generally, the exemplary user devices useful with the present invention will include e.g., a network interface (including an interface for accessing the Internet), a processor and associated storage, and optionally a plurality of back end interfaces for communication with other devices. The user device can assume literally any discrete form factor, including those adapted for settop/desktop, hand-held, or wall-mounted use, or alternatively may be integrated in whole or part (e.g., on a common functional basis) with other devices if desired. Additionally, the user device may include other elements and interfaces such as for example an interface for the HomePlug A/V standard which transmits digital data over power lines, a PAN (e.g., 802.15), Bluetooth, or other short-range wireless interface for localized data communication, etc.

In one embodiment, the network interface receives content and/or data via one or more RF tuners configured to receive content from an HFC network 101. The RF tuner(s) may comprise traditional video RF tuner(s) adapted to receive video signals over, e.g., a QAM. For example, the RF tuner(s) may comprise one or more tuners, a demodulator, decryption module, and demultiplexer of the type well known in the art, although other configurations may be used. A wideband tuner arrangement such as that described in co-owned and co-pending U.S. patent application Ser. No. 11/013,671 entitled "METHOD AND APPARATUS FOR WIDEBAND DISTRIBUTION OF CONTENT" filed Dec. 15, 2004 and incorporated herein by reference in its entirety, may also be utilized, such as where the content associated with one or more program streams is distributed across two or more QAMs. Additionally, the RF tuner(s) may incorporate functionality to modulate, encrypt/multiplex as required, and transmit digital information for receipt by upstream entities such as the CMTS.

Alternatively, the network interface may comprise any other means for receiving content from a network. Digital data received via the network interface may include for example MPEG-2 encoded programming data that is forwarded to a television monitor via a video interface. Programming data may also be stored on the storage unit for later distribution by way of the video interface, or using a Wi-Fi interface, Ethernet interface, FireWire (IEEE Std 1394), USB/USB2, or any number of other such options.

Programming and other types of data including pictures, video, music or MP3 files, software applications, metadata files, etc. may also be received by way of the various digital interfaces in the user device. These data may be stored locally (e.g., in the storage unit) or even on a device or network agent in communication with the user device, for later use by a user as is discussed in co-owned co-pending U.S. patent application Ser. No. 11/378,129 entitled "METHODS AND APPARATUS FOR CENTRALIZED CONTENT AND DATA DELIVERY", previously incorporated herein.

During operation of the user device, a client application (located in the storage unit) is run on the microprocessor. The client application follows appropriate protocol for sending requests for content and receiving requested content as well as for providing additional information to the network to facilitate authentication and authorization (discussed above) by providing information regarding the subscriber/user and/or device to the network entities discussed above. For example, the client application may provide subscriber account information upstream in order for the EIS 217, SOA 208, and other entities to identify the subscriber and provide content based on what is known (at the MSO 221) about the subscriber.

While the foregoing embodiments of the invention have been described primarily with respect to the network-side elements (i.e., programmer site 204, MSO, etc.), it will be appreciated that other implementations of the invention may utilize a specially adapted CPE or client device (e.g., PMD) used by the subscriber in generating the request for protected content. For example, the CPE or client software application or stack component may obtain and format request messages or other messages (e.g., logins) for certain programmer sites according to a prescribed configuration. In one such implementation, a subscriber accesses a designated programmer website, wherein the website passes the subscriber its programmer GUID or other identifying information. The client application then uses this information to recognize the site as "MSO affiliated", and thereby necessarily being compliant with the aforementioned protocols and EDL. The client application then formats and requests for protected content or other messages between the subscriber device and that website according to the EDL, such as by including MAC address, subscriber GUID, etc. In this fashion, the website is relieved of some of the burden of such formatting, and one or more subsequent messages between the two entities may be obviated (i.e., the website does not have to go back and ask the client device for each requisite piece of information it requires to process the subscriber's request). In order to address privacy and security concerns with this model, it is appreciated that in one embodiment, authentication and authorization interfaces may be created with additional content management systems (CMS) entities including utilization of this model where data is stored more securely at a server.

In another embodiment, the various restrictions (if any) to the provision of content to a user at a display or rendering device associated with the user device are determined by the device (e.g., CPE 106, PMD 107, etc.) itself, as discussed in co-owned, co-pending U.S. patent application Ser. No. 12/716,131 filed on Mar. 2, 2010 and entitled "APPARATUS AND METHODS FOR RIGHTS-MANAGED CONTENT AND DATA DELIVERY", which is incorporated herein by reference in its entirety. As discussed therein, a downloadable or transferable rights profile coupled with a "smart" media player application are given. The rights profile contains information regarding the specific rights of a device and/or a subscriber to access content. It is via the rights profile that the device (via the media player and its associated rights management application) determines whether to provide content to a subscriber, and/or what restrictions or privileges to apply. Hence, in the present context, the MSO (e.g., CLA 207) might generate a rights profile and pass this profile (or information indicating which of a plurality of pre-positioned profiles to apply) to the programmer 204 for transmission to the smart media player on the client device.

In addition, the client application may be configured to collect information regarding the user's actions with respect to content, and pass this upstream (whether to the programmer or the MSO). For example, the client application may record button presses, playback events, trick mode events, etc. and pass this information to MSO 221 entities which may use the information to make various business decisions including e.g., secondary content insertion decisions.

Methods and apparatus for providing such secondary content insertion may be of the type discussed in co-owned, co-pending U.S. patent application Ser. No. 11/441,476 filed on May 24, 2006 and entitled "SECONDARY CONTENT INSERTION APPARATUS AND METHODS", which is incorporated herein by reference in its entirety, and may be utilized to provide dynamic secondary content insertion (e.g., replacement of dated or geographically inappropriate advertisements or promotions), and thereby allow the MSO or other network operator to adjust the secondary content to make it more applicable to the remote user's context (e.g., location, hardware/software environment, date/time, etc.). Additionally, the apparatus and methods discussed in co-owned, co-pending U.S. patent application Ser. No. 11/198,620 filed on Aug. 4, 2005 and entitled "METHOD AND APPARATUS FOR CONTEXT-SPECIFIC CONTENT DELIVERY", which is incorporated herein by reference in its entirety, may be utilized consistent with the present invention. As discussed therein, contextually-related "secondary" content (e.g., advertising messages, useful informational links, etc.) may be provided in association with other primary content selected by the user.

While there are no limitations on the user devices in reference to the authentication and authorization services discussed herein, in one embodiment, the devices may include an operating system (e.g., Windows 2000, Windows XP, Windows Vista, Windows 7, Mac OS X 10.2 "Jaguar", 10.3 "Leopard", 10.4 "Tiger"), RAM (e.g., 128 MB or 512 MB), video card (e.g., 32 MB or 128 MB), Internet browser (e.g., Internet Explorer 5.5 (or higher), or Firefox/Mozilla 1.5 (or higher)), Internet broadband Connection, and media player application (e.g., Adobe Flash or similar).

It is further noted that power line-based Internet adapters and other wireless technology such as Wi-Fi, Bluetooth and wireless data cards may be used consistent with the exemplary embodiment as long as they can support the proper download speeds necessary to render video play at an acceptable user level (i.e., not causing jerkiness, freezing, dropout, pixilation, etc.).

Anonymity—

As noted above, certain data (including collected data, etc.) may be particular to or identified with a particular subscriber, user, or user device. Accordingly, such data may, in addition to being obfuscated as described above, also be anonymized by inter alia, the use of a cryptographic hash to protect the privacy of the identified subscriber, user, and/or device. In one embodiment, the techniques for providing anonymity utilizing a cryptographic hash described in U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, may be utilized in conjunction with the present invention. As disclosed therein, the identity of a subscriber device or subscriber is anonymized by using a cryptographic hash coupled with an optional "opaque" variable which carries information relating to the subscriber device of the hash with which it is associated. The hash and opaque variable frustrate de-encryption or reverse-engineering of the individual subscriber's identity or specific location. Alternative methods of providing anonymization may also be utilized consistent with the present invention.

While complete anonymization (i.e., there is no way of tracing or identifying the source) is generally not applicable to information which must be used to uniquely identify an individual and/or device, partial anonymization such as that described above is readily used with the present invention. For example, it may be desirable to perform a one-way hash of a user's IP address or MAC address so that someone surreptitiously obtaining the information cannot determine the source data (actual address), but the hash algorithm produces a known deterministic result with the same "seed", and hence the hash output can be used to uniquely identify a given user/device, such as by matching that hashed output with known outputs from the same algorithm corresponding to existing subscribers/devices. This hashing is to be distinguished from encryption, wherein the original source data (address) can in fact be recovered and read when the encrypted data is decrypted (such as via a public/private encryption key pair).

Business/Operational Decision Engine—

In another aspect of the invention, a so-called "decision" engine may be disposed at e.g., the SOA 208, EIS 217, CLA 207, identity provider 218, content server 203, CPE 106, or other location (e.g., rendered as one or more computer programs disposed thereon). This engine comprises, in an exemplary embodiment, one or more software routines adapted to control the authentication/authorization and content delivery processes in order to achieve one or more goals relating to operations or business (e.g., profit or revenue or subscriber retention). Included within these areas are network optimization and reliability goals, increased maintenance intervals, increased subscriber or user satisfaction/longevity, increased subscription base, higher profit (e.g., from increased advertising revenues, more subscriber "views" of given content, greater flexibility in the types and locations of platforms from which the subscriber may access content, and so forth).

These decision rules may comprise a separate entity or process, and may also be fully integrated within other processing entities (such as the applications running on the aforementioned entities and/or the client application), and controlled via e.g., a GUI displayed on a device connected to the relevant server, network entity, or even CPE. In effect, the rules engine comprises a supervisory entity which monitors and selectively controls content access and delivery operation at a higher level, so as to implement desired operational or business rules. The decision engine can be considered an overlay of sorts to the more fundamental algorithms used to accomplish required network operation, such as IP address assignment, secondary content selection and insertion, statistical multiplexing, BSA switching, and so forth.

For example, the SOA 208, EIS 217, CLA 207, identity provider 218, content server 203, CPE 106 may invoke certain operational protocols or decision processes based on information or requests received from the CPE 106 or PMD 107, conditions existing within the network, demographic data, geographic data, etc. However, these processes may not always be compatible with higher-level business or operational goals, such as maximizing profit or system reliability. Hence, when imposed, the business/operational rules can be used to dynamically (or manually) control access to and delivery of content. The decision rules may be, e.g., operational or business-oriented in nature, and may also be applied selectively in terms of time of day, duration, specific local areas, or even at the individual user level (e.g., via specific identification of the CPE or client device via TUNER_ID, IP address, MAC address, or the like, or via a user-based login or "entitlements" profile of the type previously described herein).

For example, one decision rule implemented by the decision engine may comprise providing protected content from the third party (e.g., programmer 204) according to a tiered system. Content under such an approach might be selected in part on the revenue such delivery will bring to the MSO based on the content source.

In another variant, the use rights or features provided with the requested (protected) content may be varied as a function of e.g., subscriber subscription level, time of day, requesting device capability, etc. For instance, a request received from a premium level of "Gold" subscriber might be serviced with a content stream that includes complete "trick mode" functionality (i.e., FF, REW, Pause, etc.), or for broadcasts a "start over" functionality, whereas a lower tier subscriber's request might not include one or any of these capabilities. The number of plays can be limited as well; e.g., Gold subscribers receive unlimited plays, while lower tiers receive only one or a finite number of plays of the content. As noted above, these rules or functional restrictions can be relayed from the MSO to the programmer 204 via messaging conducted pursuant to a particular subscriber request, or alternatively can be pre-positioned within the programmer site as a decision rule set.

Moreover, the quality of content provided can be varied as needed or desired. For instance, use of different encodings or bitrates (e.g., HD versus SD), QoS parameters, latency, etc. can be employed depending on the subscriber (individually), the general classification of the subscriber (e.g., Gold), time of day, available resources, revenue/profit implications of each option, etc.

Secondary content (e.g., advertisements, promotions, featured links, etc.) insertion decisions may also be governed by these business/operational rules, as previously noted.

It will also be recognized that both the MSO and the third party (e.g., programmer) may employ different business or operation decision rules to one another. For example, the MSO might establish preferential rules or classes for the various programmers, such that service provided to these different programmers is differentiated in some fashion. In one such case, those programmers paying the MSO a fee, or with which the MSO has a pre-existing business relationship, may be given preferential service and capabilities.

The MSO and/or programmer may also structure a business relationship whereby one "pays" the other via some sort of consideration for servicing of requests. For example, an MSO might pay a given programmer $X for each valid MSO subscriber request serviced by the programmer, since the MSO is in effect leveraging the programmer's infrastructure to extend the reach of its capabilities for the MSO customers (i.e., extension of the "four any's" model described in co-owned U.S. Provisional Application Ser. No. 61/256,903 entitled "METHODS AND APPARATUS FOR PACKETIZED CONTENT DELIVERY OVER A CONTENT DELIVERY NETWORK" previously incorporated herein. Conversely, the programmer might pay the MSO consideration for each MSO subscriber request serviced, or an advertisement click-through basis, etc. in that if the MSO instructs its subscribers to use the programmer's site preferentially over others, this may generate additional revenue (such as via the aforementioned click-throughs) for the programmer or its advertisers.

In one embodiment, the so called "Roadrunner Video Channel" or "Symphoni™ Online" products of Assignee hereof may use the authentication/authorization applications. Under this model the MSO can conduct its own regional or localized advertising as part of programmer ingested content or outside, including eventually targeted personalization of advertisements based on user demographics and viewing heuristics. This includes e.g., click-through to advertiser's web sites that can be monitored via web analytics for monetary remittance or collection.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX A

© Copyright 2010 Time Warner Cable, Inc. All rights reserved.

| Table Column | Description/purpose | Note |
| --- | --- | --- |
| Element Name | English Name of the element being described | |
| Tag | Proposed Tag Name | Tag Names should meet the MSO SOA Standard Naming Conventions for XML element names. It is expected that XML Name Spaces are unique within a service definition |
| Description | Description of the XML Element | Description should allow the reader enough detail to understand the use of the Element being described |
| Cardinality | The minimum number of times the XML Element can exist in the XSD. Example:<br>4. 1<br>2. 0 . . . 1<br>3. 1 . . . 2 | 4. This tag must occur 1 and only 1 times<br>2. Tag may occur 0 or 1 times but must not occur more than one times<br>3. Tag may occur once or twice but not less than once or more than twice |
| Valid Values | The valid values acceptable in the Element being described. | "N/A", any value meeting Min Length/Max Length and Type rules will be accepted<br>List = XSD and/or service will enforce validation (Example: List is Y, N the XSD or the service will validate that the value provided in the Element is either a "Y" or an "N")<br>"NULL", included in the List when a value in the list is Optional (Example: 1, 2, 3, NULL). |
| Type | Represents the type of Element and/or the data type of the Element | String - string data type<br>Decimal - decimal data type<br>Integer - integer data type<br>Date - Date data type, to conform to W3C data standard formatting<br>Time - ??<br>Etc . . . .<br>(Note - additional element Types may be included, based on XML standards) |
| Size | Minimum and Maximum length of the value accepted in the Element | "UNL", the value has no upper limit<br>"n-nn", the value has "n" as Min value and "-nn" as Max value. Ex: 1-9, the value has Min value of 1 and Max value of 9. |
| Conditionality | 4. Optional<br>2. Required<br>3. Conditional<br>4. Prohibited<br>Designates if field is Optional, Required, or Conditional (required under specified conditions). | 4. Field may or may not be present, no validation required<br>2. Tag must be present<br>3. Tag must be present under specified conditions (If Customer Type = B)<br>4. Tag is prohibited |
| Default | The default value of the Element value | |
| Format Mask | The format mask of the Element value | |

APPENDIX B

© Copyright 2010 Time Warner Cable, Inc. All rights reserved.

| Data Element | Description | Tag | Cardinality | Type | Size | Conditionality | Valid Values | Default | Format Mask |
|---|---|---|---|---|---|---|---|---|---|
| | | | Subject 1 . . . 1 | | | | | | |
| SubscriberID | The Subscriber GUID (provided to the programmer through EIS prior to calling this service) | SubscriberID | 0 . . . 1 | String | | Conditional, Required if DivitionId+ Account Number are not specified. | | | |
| DivisionId | The MSO Division the Subscriber is associated with | DivisionID | 0 . . . 1 | String | | Conditional, Required if SubscriberId not specified, Will be ignored if SubscriberID is specified. | | | BPS Style DivisionId - e.g. GSO.056 |
| AccountNumber | The Subscribers Billing Account Number | AccountNumber | 0 . . . 1 | String | | Conditional, Required if SubscriberId not specified, Will be ignored if SubscriberID is specified. | | | |
| | | | Resource 1 . . . 1 | | | | | | |
| ResourceID | The ResourceID of the Resource to check for Entitlement or the special value "ALL" to check for entitlement on all resources associated with their programmer. | ResourceID | 1 . . . m | String | | Required | "ALL" or a specific set of values negotiated with each Programmer. These values will be specified in each programmers ICD (Interface Control Document) | | |
| | | | Action 1 . . . 1 | | | | | | |
| ActionID | The action the Entitlement check is requested to check | ActionID | 1 . . . 1 | String | | Required | "View*" (The value View may be followed by any number of characters of text) | | |
| | | | Environment 1 . . . 1 | | | | | | |
| MediumID | The Environment the Action will be taken in | MediumID | 1 . . . 1 | String | | Required | "Internet" | | |
| SubscriberIP | The IP address of The Subscriber | SubscriberIP | 0 . . . 1 | String | | Conditional (Required if MediumID = Internet) | | | IPV4 address format |

APPENDIX C

© Copyright 2010 Time Warner Cable, Inc. All rights reserved.

| Column | Meaning | Content | Intent (Validation) |
|---|---|---|---|
| Cardinality | How many times a tag can (or must) occur. Causes | 1. 1<br>2. 0 . . . 1 | 1. This tag must occur 1 and only 1 times |

APPENDIX C-continued

© Copyright 2010 Time Warner Cable, Inc. All rights reserved.

| Column | Meaning | Content | Intent (Validation) |
|---|---|---|---|
| | error 2020 | 3. 1 . . . 2 | 2. Tag may occur 0 or 1 times but must not occur more than one times<br>3. Tag may occur once or twice but not less than once or more than twice |
| Type | The data type of the tag content. Causes error 2021 | String - string data type<br>Decimal - decimal data type<br>Integer - integer data type<br>Date - Date data type, to conform tom W3C data<br>Standard formatting<br>Time - time reference<br>Etc . . . .<br>(Note - additional element Types may be included, based on XML standards) | 1. Must be of type string (no real validation to do as everything qualifies)<br>2. Date data type must conform to W3C data standard formatting. |
| Size | Minimum and Maximum length of the value accepted in the Element | n-nn | "UNL", the value has no upper limit<br>"n-nn", the value has "n" as Min value and "-nn" as Max value. Ex: 1-9, the value has Min value of 1 and Max value of 9. |
| Conditionality | Designates if field is Optional, Required, Prohibited or Conditional specified conditions. Causes errors 2001 or 2023 | 1. Optional<br>2. Required<br>3. Conditional<br>4. Prohibited | 1. Field may or may not be present, no validation required<br>2. Tag must be present<br>3. Tag must be present under specified conditions (If Customer Type = B) |
| Valid Values | If a field has a small set of Enumerated values, all of the valid values are specified. Causes error 2024 | 1. 1.0<br>2. Mr., Ms., Mrs.<br>3. B, R | |
| Format | Must follow the specified format. Causes error 2025 | (###) ###-#### | Must be of the specified format |

APPENDIX D

© Copyright 2010 Time Warner Cable, Inc. All rights reserved.

| Req. Num | Requirement | Comments |
|---|---|---|
| FR-0005 | If the ResourceID "ALL" is specified it should be the one an only ResourceID specified or the request should be rejected. | |

APPENDIX E

© Copyright 2010 Time Warner Cable, Inc. All rights reserved.

| Data Element | Description | Tag | Cardinality | Type | Size | Conditionality | Valid Values | Default | Format Mask |
|---|---|---|---|---|---|---|---|---|---|
| Authorization 1 . . . m (1 per ResourceID) | | | | | | | | | |
| ResourceID | | | 1 . . . 1 | String | | Required | A specific set of values negotiated with each Programmer. These values will be specified in each programmers ICD (Interface Control Document) | | |
| Decision | | | 1 . . . 1 | String | | Required | "Permit", "Deny", "Not Applicable", "Indeterminate" | | |
| Reason | | | 0 . . . 1 | String | | Optional | | | |
| SubscriberMessage | | | 0 . . . 1 | String | | Optional | | | |

APPENDIX E-continued

© Copyright 2010 Time Warner Cable, Inc. All rights reserved.

| Data Element | Description | Tag | Cardinality | Type | Size | Conditionality | Valid Values | Default | Format Mask |
|---|---|---|---|---|---|---|---|---|---|
| Expiration | | | 0...1 | String | | Conditional (Required if Decision = "Permit") | W3C Combined Date/Time UTC (Zulu) | | YYYY-MMDDT HH: MM:SSZ |

APPENDIX F

© Copyright 2010 Time Warner Cable, Inc. All rights reserved.

| Req. Num | Requirement | Comments |
|---|---|---|
| FR-0010 | For each valid ResourceID, the Service must respond with a decision of "Permit" if the request was successfully validated and processed end to end without error and the service unequivocally determined that the subscriber should have the right to perform the requested action via the specified medium on the specified resource. | The request was successfully processed and the subscriber should be granted access to the resource through the specified expiry without further entitlement requests. |
| FR-0020 | For each valid ResourceID, the Service must respond with a decision of "Deny" if the request was successfully validated and processed end to end without error and the service unequivocally determined that the subscriber should not have the right to perform the requested action via the specified medium on the specified resource. | The request was successfully processed and the subscriber should not be granted access to the resource. This decision is based on dynamic information so an identical request in the future may result in a different decision. |
| FR-0030 | Expiry must be returned for Permit responses and should be calculated as system time + a configurable amount of time based on external resource ID. | |
| FR-0040 | EIS may return mixed case DivisionID's so they must be converted to upper case prior to any further processing | |
| FR-0050 | The Programmer must display to the subscriber any content returned in the SubscriberMessage. The programmer may not use any data retuned in the SubscriberMessage for any reason other than displaying it to a subscriber. | |

APPENDIX G

© Copyright 2010 Time Warner Cable, Inc. All rights reserved.

| Req. Num | Requirement | Comments |
|---|---|---|
| ER-0010 | The service must implement any global validation rules (as outlined in section 2.2 or SOA Error Guidelines) based on the Request and Response tables in this FRD | Refer to SOA Error Handling Guidelines |
| ER-0030 | The service must be designed and built according to the Standard Contract Guidelines when using the MSO SOA Environment. | Refer to Standardized Contract Guidelines |
| ER-0040 | The components providing this service must log Messages and Exceptions according to the guidelines outlined in the SOA Logging Standards in the MSO SOA Environment | Refer to SOA Logging Guidelines |
| ER-0050 | For each ResourceID, the Service must respond with a decision of "Not Applicable" if the request could not be successfully validated because an unknown ResourceID or SubscriberID was provided or if a ResoureeID was specified that was not associated with the specified Programmer (SystemID) | The request was not successfully processed because one or more values in the request were invalid. This indicates a value passed by the programmer was not recognized and the] programmer needs to take steps to correct this before issuing a revised request. |
| ER-0060 | For each valid ResourceID, the Service must respond with a decision of "Indeterminate" if the successfully validated request could not be successfully processed due to a system error during the end to end process of the service. | The validated request was not successfully processed due to a MSO system error. MSO operation will be alerted to these so normal operations can be restored. A programmer can periodically retry a request receiving this response. |

APPENDIX H

© Copyright 2010 Time Warner Cable, Inc. All rights reserved.

| Code | Message | Notes |
|---|---|---|
| 2000 | Validation Exception: <details of exception> | Request not executed due to a violation or violations of business rules for a request. This error is only issued for validation errors not enumerated in the remaining 2000 series errors below. |
| 2001 | Missing Required Field: <Field> | This should only occur when a blank value is specified for a required field. This is enough to get by the WSDL which only checks length, but the adapter will trim blanks before testing length. |
| 2002 | More than one wildcard in request: <fieldname with wildcards> | Issued in SearchForAccountBySet when more than one wildcard ("*") is used in a request. |
| 2003 | Invalid Range in Request Field, beginning of range must be less than or equal to end of range: <tag:range> | Used in multiple services when a range is not of the format <low>-<high> |
| 2004 | DivisionID Not Found: <DivisionId> | Used when a component does not recognize a DivisionID |
| 2005 | Maximum Return Rows must be greater than zero | Used in Search for Account by set when MaxReturnRows = blank or zero |
| 2006 | Wildcard must be in last position: <fieldvalue> | Used in search for account by set when a wildcard ("*") is in any other position but the end/last of a field. |
| 2007 | No Search Parameters Provided | Used in search for account by Set when none of the search fields have search criteria in them. |
| 2008 | Invalid Value for Request Field: <tag:value> | Used when an invalid value is detected in a field |
| 2009 | Invalid Search Combination: <explanation> | Used in SearchForAccountBy set and RetrieveStatementLedger when an invalid combination of search criteria is used. |
| 2010 | Multiple wildcard searches not allowed. | Used in SearchForAccountBySet when wildcard ("*") is specified in more than one search field. |
| 2011 | Missing Conditional Field: <tag:condition> | Used to indicate that a conditional field is required due to some condition but that there is no tag for that field or there is no data content for the tag. |
| 2012 | IBS Type invalid for destination IBS | Used by Conductor if IbsType = ICOMS and the DivisionId indicates an ACP division as the destination or IbsType = ACP and the DivisionId indicates an ICOMS division |
| 2013 | Invalid IBS Type: <tag:value> | Used by conductor if IbsType<>ICOMS or ACP |
| 2014 | Element to replace not found: <element> | Used by Conductor when the field it is supposed to replace with a value in a subsequent service call is not present (therefore it can not do the substitution) |
| 2015 | Multiple values for element to replace found: <Element>:<Values> | Used by Conductor when there are multiple instances of the field it is supposed to replace with a value in a subsequent service call (therefore it can not do the substitution) |
| 2016 | Syntax error in request: <error> | Used by Conductor when it detects a syntax error in the request it is processing (therefore it can not process the request). |
| 2017 | Invalid Content for Tag: <tag:content> | Used by Conductor when it detects an invalid value for the content of a field. |
| 2018 | Conditional Cardinality violation: <tag:value:condition> | Used to indicate a conditional cardinality violation. Static violations will be handled by WSDLs but where this validation is conditional based on complex business rules or in downstream components, this error would indicate the validation error. |
| 2020 | Conditional Type Violation: <tag:type:condition> | Used to indicate a conditional type violation. Static violations will be handled by WSDLs but where this validation is conditional based on complex business rules or in downstream components, this error would indicate the validation error. |
| 2021 | Conditional Length Violation.: <tag:length:condition> | Used to indicate a conditional type violation. Static violations will be handled by WSDLs but where this validation is conditional based on complex business rules or in downstream components, this error would indicate the validation error. |
| 2022 | Conditional Length Violation.: <tag:length:condition> | Used to indicate a conditional length violation. Static violations will be handled by WSDLs but where this validation is conditional based on complex business rules or in downstream components, this error would indicate the validation error. |
| 2024 | Conditional Valid Value Violation: <tag:value:condition> | Used to indicate a conditional value violation. Static violations will be handled by WSDLs but where this validation is conditional based on complex business rules or in downstream components, this error would indicate the validation error. |
| 2025 | Conditional Format Violation: <tag:value:condition> | Used to indicate a conditional format violation. Static violations will be handled by WSDLs but where this validation is conditional based on complex business rules or in downstream components, this error would indicate the validation error. |
| 2026 | Business Rule Violation: <tag:value:rule> | Used to indicate a complex business rule violation. Static violations will be handled by WSDLs but where this validation is conditional based on complex business rules or in downstream components, this error would indicate the validation error. |
| 2028 | Service Temporarily Disabled: <service> | Used to indicate that a service could not be executed because the entire service has been temporarily disabled via SOA configuration. Note if there is more than one reason a service could not be executed, all reasons should be returned. |
| 2029 | Division Temporarily Disabled: <division> | Used to indicate that a service could not be executed because the entire destination division has been disabled via SOA configuration. Note if there is more than one reason a service could not be executed, all reasons should be returned. |
| 2030 | Constituent Temporarily Disabled: <constituent> | Used to indicate that a service could not be executed because this constituent has been disabled via SOA configuration. Note if there is more than one reason a service could not be executed, all reasons should be returned. |
| 2031 | Constituent:service:division combination temporarily disabled: <constituent:service:division> | Used to indicate that a service could not be executed because this combination of Service/Constituent/Division has been temporarily disabled via SOA configuration. Note if there is more than one reason a service could not be executed, all reasons should be returned. |
| 2032 | Service not configured | Used to indicate that a service could not be executed because the entire service has not been authorized via SOA configuration. Note if there is more than one reason a service could not be executed, all reasons should be returned. |
| 2033 | Division not configured | Used to indicate that a service could not be executed because the entire destination division has not been authorized via SOA configuration. Note if there is more than one reason a service could not be executed, all reasons should be returned. |

APPENDIX H-continued

© Copyright 2010 Time Warner Cable, Inc. All rights reserved.

| Code | Message | Notes |
|---|---|---|
| 2034 | Constituent not configured | Used to indicate that a service could not be executed because this constituent has been not been authorized via SOA configuration. Note if there is more than one reason a service could not be executed, all reasons should be returned. |
| 2035 | Constituent:service:division combination not configured: <constituent:service:Division> | Used to indicate that a service could not be executed because this combination of Service/Constituent/Division has not been authorized via SOA configuration. Note if there is more than one reason a service could not be executed, all reasons should be returned. |
| 2040 | API Not Supported: <BosslApiName> | Used by RadBossl service when the requested BOSSL API is not in the configurable list of authorized APIs |
| 2042 | Validation Exception, request exceeded maximum allowed duration: <duration> | Used by RadBossl service when the requested BOSSL API exceeds the configurable maximum duration. |
| 2043 | Retrieval by MAC address not supported yet | Used by services who's WSDL's have been updated to accept MAC address in addition to Account# but who's adapters have not yet been updated to accept MAC address |
| 2044 | Fraud Detection Alert - Too many active requests: <Service:MaxRequests:Duration:Sessions:IP> | Indicates too many calls from too many locations in a given period of time. While originally developed for QueryEntitlement it could be useable for other services in the future.<br>e.g. Fraud Detection Alert - Too many active requests: QueryEntitlement: MaxRequests = 20: Duration = 2 hours: 51 Requests: RequestIp = 1.2.4.4 |

APPENDIX I

© Copyright 2010 Time Warner Cable, Inc. All rights reserved.

| Decision | Condition | SOA Logging | Reason | Reason Description | Programmer Expectation |
|---|---|---|---|---|---|
| Permit | The QE service executed end to end with no system errors and the subscriber was found to have rights to the Resource (Archive account and active service) | Routine success logging with no exceptions | 0000 | | The programmer will permit the subscriber to begin access to the specified resource at any time through the EXPIRY and display to the subscriber any SubscriberMessage returned whenever a subscriber attempts to access that resource. |
| Deny | The QE service executed end to end with no system errors and the subscriber was found to NOT have rights to the Resource (Active Account but not Active service) | Routine success logging with no exceptions | 0001 | Not subscribed to view content. Please contact MSO to find out further details for accessing on-line programming | The programmer will deny the subscriber access to the specified resource at any time through the EXPIRY and display to the subscriber any SubscriberMessage returned whenever a subscriber attempts to access that resource. |
| Deny | The QE service received requests from too many unique IP addresses for a particular subscriber (configurable) within a period of time (configurable). If in the last X hours there were more than Y QE requests for this Subscriber with unique SubscriberIPs then DENY all requested ResourceIds | SOA Exception log 2044 - Fraud Detection Alert - Too many active requests: QueryEntitlement: MaxRequests = 20: Duration = 2 hours: 51 Requests: RequestIp = 1.2.3.4 | 0002 | Too many active viewing locations. There have been WW requests from unique locations in the past XX hours and only YY requests are permitted. Please ensure your login credentials are secure. | The programmer will deny the subscriber access to the specified resource at any time through the EXPIRY and display to the subscriber any SubscriberMessage returned whenever a subscriber attempts to access that resource. |
| Not Applicable | If friendly rollout feature is turned on for the programmer and the subscriber is not in the list of friendlies for that programmer the service should respond in this way | SOA Exception log 2024 Conditional Valid Value Violation: <Subscriber: xxx not part of Friendly Rollout Group) | 0003 | This system is currently in TRIAL with a limited number of specific Subscribers. Your ID was not in the list selected for this trial. | The programmer will deny the subscriber access to the specified resource at any time through the EXPIRY and display to the subscriber any SubscriberMessage returned whenever a subscriber attempts to access that resource. |
| Not Applicable | If the MarketTrial feature is turned on for the service and the division has not been configured for the service the service should respond in this way. | SOA Exception Log 2029 - Division Temporarily Disabled: <division> | 0004 | The system is currently in Market Trial limited to particular markets and the subscriber was not within a TRIAL Market. | The programmer will deny the subscriber access to the specified resource at any time through the EXPIRY and display to the subscriber any SubscriberMessage returned whenever a subscriber attempts to access that resource. |
| NotApplicable | The QE service passed a SystemID that was not configured. | SOA Exception log 2024 Conditional Valid Value Violation: <tag:value:condition> | 0005 | SystemID not Recognized | The programmer will deny the subscriber access to the specified resource at any time through the EXPIRY and display to the subscriber any SubscriberMessage returned whenever a subscriber |

APPENDIX I-continued

© Copyright 2010 Time Warner Cable, Inc. All rights reserved.

| Decision | Condition | SOA Logging | Reason | Reason Description | Programmer Expectation |
|---|---|---|---|---|---|
| | | | | | attempts to access that resource. As this is likely a configuration issue between the programmer and MSO, they will open trouble tickets and work to resolve the configuration issue. |
| NotApplicable | The QE service passed a ResourceID that was not configured. | SOA Exception log 2024 Conditional Valid Value Violation: <tag:value:condition> | 0006 | ResourceID not Recognized | The programmer will deny the subscriber access to the specified resource at any time through the EXPIRY and display to the subscriber any SubscriberMessage returned whenever a subscriber attempts to access that resource. As this is likely a configuration issue programmer and MSO, they will open trouble tickets and work to resolve the configuration issue. |
| NotApplicable | The QE service passed a SubscriberID that was invalid or not found in EIS or Billing System or not Active in the billing system | Routine success logging with no exceptions | 0007 | SubscriberID not Recognized | The programmer will deny the subscriber access to the specified resource at any time through the EXPIRY and display to the subscriber any SubscriberMessage returned whenever a subscriber attempts to access that resource. This means the SubscriberID is no longer valid and that the programmer should have the subscriber re-authenticate with MSO (and in the case of a federated identity, remove that federation until the subscriber re-authenticates and re-federates) It is possible that this entity is no longer a subscriber and will not be able to re-authenticate/re-federate) |
| NotApplicable | The QE service passed a DivisionID and AccountNumber that was invalid or not found in SOA or Billing System or not Active in the billing system | Routine success logging with no exceptions | 0008 | Account not Recognized | The programmer will deny the subscriber access to the specified resource at any time through the EXPIRY and display to the subscriber any SubscriberMessage returned whenever a subscriber attempts to access that resource. This means the SubscriberID is no longer valid and that the programmer should have the subscriber re-authenticate with MSO (and in the case of a federated identity, remove that federation until the subscriber re-authenticates and re-federates) It is possible that this entity is no longer a subscriber and will not be able to re-authenticate/re-federate) |
| NotApplicable | The QE service passed a ResourceID that was not Associated with the SystemID | SOA Exception log 2024 Conditional Valid Value Violation: <tag:value:condition> | 0009 | ResourceID not associated with SystemID | The programmer will deny the subscriber access to the specified resource at any time through the EXPIRY and display to the subscriber any SubscriberMessage returned whenever a subscriber attempts to access that resource. As this is likely a configuration issue between the programmer and MSO, they will open trouble tickets and work to resolve the configuration issue. |
| NotApplicable | The QE service passed a ResourceID of "ALL" and one or more additional ResourceID's | 2020 Conditional Cardinality violation: <tag:value:Only one ResourceID may be specified when using ALL> | 0010 | Only one ResourceID may be specified when using ALL | The programmer will deny the subscriber access to the specified resource at any time through the EXPIRY and display to the subscriber any SubscriberMessage returned whenever a subscriber attempts to access that resource. As this is likely a configuration or code issue between the programmer and MSO, they will open trouble tickets and work to resolve the issue. |

APPENDIX I-continued

© Copyright 2010 Time Warner Cable, Inc. All rights reserved.

| Decision | Condition | SOA Logging | Reason | Reason Description | Programmer Expectation |
|---|---|---|---|---|---|
| NotApplicable | Any 2000 series SOA error not explicitly addressed above | Standard SOA error logging | 0011 | Standard SOA error message sent to SOA log. E.g. "2033 - Validation Exception - Division not configured: GSO.056" | The programmer will deny the subscriber access to the specified resource at any time through the EXPIRY and display to the subscriber any SubscriberMessage returned whenever a subscriber attempts to access that resource. As this is likely a configuration or code issue between the programmer and MSO, they will open trouble tickets and work to resolve the issue. |
| Indeterminate | QE call to EIS failed or timed out | SOA Exception log 4024 - EIS Call Failure: <apiName:apiREsponse>) | 0012 | Unable to complete authorization request at this time, please try again later. | The programmer will either DENY access to the subscriber and display to the subscriber any SubscriberMessage Returned OR The programmer may use a cached Authorization response for this subscriber for this resource for this IP address that had a response other than Indeterminate and has expired within the last 30 days to determine Authorization. As this is likely a temporary system outage on MSO's part a new authorization request should be performed each time a subscriber attempts access until the outage is corrected. An outage should be reported to MSO by the programmer. |
| Indeterminate | QE call to BILLING failed (for a reason other than Account not found) or timed out | OA Exception log applicable 4000 series issue (SQL, API, BOSSL etc) | 0013 | Unable to complete authorization request at this time, please try again later. | The programmer will either DENY access to the subscriber and display to the subscriber any SubscriberMessage Returned OR The programmer may use a cached Authorization response for this subscriber for this resource for this IP address that had a response other than Indeterminate and has expired within the last 30 days to determine Authorization. As this is likely a temporary system outage on MSO's part a new authorization request should be performed each time a subscriber attempts access until the outage is corrected. An outage should be reported to MSO by the programmer. |
| Indeterminate | QE call to CVC failed or timed out or CVC DBI or Org ID does not exist | SOA Exception log applicable 4000 series issue or "4012, description = Retrieval Exception, message = Value not Found, CVC Data need updating: -DBI xxx/Org Id xxx, system = SOA." in the case of a missing DBI/OrgId | 0015 | Unable to complete authorization request at this time, please try again later. | The programmer will either DENY access to the subscriber and display to the subscriber any SubscriberMessage returned OR The programmer may use a cached Authorization response for this subscriber for this resource for this IP address that had a response other than Indeterminate and has expired within the last 30 days to determine Authorization. As this is likely a temporary system outage on MSO's part a new authorization request should be performed each time a subscriber attempts access until the outage is corrected. An outage should be reported to MSO by the programmer. |
| Indeterminate | QE translation of External ResourceID or CVC Common Code to Internal ResourceID could not be completed due to missing mapping. | SOA Exception log 2024 Conditional Valid Value Violation: <tag:value:condition> | 0016 | Unable to complete authorization request at this time, please try again later. | The programmer will either DENY access to the subscriber and display to the subscriber any SubscriberMessage returned OR The programmer may use a cached Authorization response for this subscriber for this resource for this IP address that had a response other than Indeterminate and has expired within the last 30 days to |

APPENDIX I-continued

© Copyright 2010 Time Warner Cable, Inc. All rights reserved.

| Decision | Condition | SOA Logging | Reason | Reason Description | Programmer Expectation |
|---|---|---|---|---|---|
| | | | | | determine Authorization. As this is likely a temporary system outage on MSO's part a new authorization request should be performed each time a subscriber attempts access until the outage is corrected. An outage should be reported to MSO by the programmer. |
| Indeterminate | QE configuration does not permit this operation | SOA Exception Log 2028-2035 | 0017 | Unable to complete authorization request at this time, please try again later. | The programmer will either DENY access to the SU display to the subscriber any SubscriberMessage returned OR The programmer may use a cached Authorization response for this subscriber for this resource for this IP address that had a response other than Indeterminate and has expired within the last 30 days to determine Authorization. As this is likely a temporary system outage on MSO's part a new authorization request should be performed each time a subscriber attempts access until the outage is corrected. An outage should be reported to MSO by the programmer and/or subscriber |
| Indeterminate | Any other SOA error (3000-6000) not explicitly noted above. | SOA Exception Log Entry | 0018 | An unexpected error occurred within MSO systems - Please refer to SOA error #### if you follow up with MSO support | The programmer will either DENY access to the subscriber and display to the subscriber any SubscriberMessage returned OR The programmer may use a cached Authorization response for this subscriber for this resource for this IP address that had a response other than Indeterminate and has expired within the last 30 days to determine Authorization. As this is likely a temporary system outage on MSO's part a new authorization request should be performed each time a subscriber attempts access until the outage is corrected. An outage should be reported to MSO by the programmer. |

APPENDIX J

© Copyright 2010 Time Warner Cable, Inc. All rights reserved.

| BR Identifier | Name | Description | Example |
|---|---|---|---|
| BR-0010 | Decision | The Decision must be calculated based on the table below | |
| BR-0020 | SOA Logging | SOA Logging must be performed as detailed in the table below | |
| BR-0030 | Decision | The Reason must be returned based on the table below | |
| BR-0040 | SOA Condition | In SOA errors there is often additional information included after the predefined error message (condition, details etc). It is recommended that the data sent to the programmer in Reason be included as this part of the SOA error message | |
| BR-0050 | Programmer Entitlement Enforcement | A programmer must possess an unexpired PERMIT response for a particular subscriber, for a particular IP address, for a particular resource prior to allowing a subscriber access to that protected resource. | It is recommended that a programmer perform a QE call (ResourceID = ALL preferred) upon a successful subscriber login (for either federated or non federated logins) of MSO subscribers. |

APPENDIX J-continued

© Copyright 2010 Time Warner Cable, Inc. All rights reserved.

| BR Identifier | Name | Description | Example |
|---|---|---|---|
| BR-0060 | Programmer Entitlement caching for "Permit" results | A programmer must cache QE PERMIT responses such that subsequent QE calls are only made when a programmer no longer possesses an unexpired PERMIT for a specified subscriber/ipaddress/resource. | Note that an entitlement PERMIT duration specifies a period for which INITIATING a viewing request should be granted. The viewing duration of the requested content is immaterial and the viewing duration within a session may continue past a PERMIT expiry period without another entitlement request. |
| BR-0065 | Programmer Entitlement caching for "Indeterminate" results | A programmer may cache QE PERMIT results for up to a maximum of 30 days beyond their Expiry and use these cached results ONLY in the event of an "Indeterminate" response from the QE service (note this is optional at the programmer's discretion). | An "Indeterminate" QE response indicates a system outage of some sort on MSO's end and that an entitlement check could not be completed. In this case, if a programmer has cached a previous QE result for a particular SubscriberID/ipaddress/resource and this result has expired within the last 30 days, the programmer may use that cached result to determine entitlement even though it is expired. |
| BR-0070 | Programmer Entitlement Expiry honorin | A programmer must honor QE response expiry data and make another QE request prior to allowing a subscriber to view protected content (when no unexpired PERMIT remains for that content) | |
| BR-0080 | SOA Fraud Detection Config | SOA must provide two configurable values associated with the QueryEntitlement Service<br>1) MaxUniqueIP's per period<br>2) HoursForUniqueIPCheckPeriod | |
| BR-0090 | SOA Entitlement Expiry | SOA must provide a EntitlementExpiriryPeriod configuration Parameter per ResourceID that will be used as the default PERMIT expiration duration for that resource (previously one default of 24 hours was used for all resources) The default value for this period will be 2 hours. | Units = hours |
| BR-0095 | SOA Fraud Prevention | SOA must DENY all resources on a QE request if more than MaxUniqueIp's unique IP addresses were contained in QE requests for a particular subscriber in the previous HoursForUniqueIPCheckPeriod hours. | |
| BR-0110 | Market Trial Mode | The service must provide the configurable ability by programmer for the service to translate 2029 - Division Temporarily Disabled: <division> errors to Programmer Reason 0004 This must be configurable via the SOA admin console and not require any code change or deployment. | If programmer TBS is in a Market trial in NYC only (they may be in a trial in multiple markets) and a\ request is received for a market that is not enable for that programmer—say Los Angeles, the Reason should be 0004 if the market trial flag is ON and 0017 if OFF |
| BR-0120 | Subscriber Message Configuration | The service must provide the configurable ability by Reason, by Division to return configurable text in the SubscriberMessage response tag. (see SubscriberMessage table for details) These messages must be configurable via the SOA Admin console and require no coding or deployment to change. | If in DEV or QA a QE response is PERMIT for a GSO subscriber (Reason 0000), the value of SubscriberMessage should be "GSO Subscriber Permitted Access Message 0000" |

APPENDIX K

© Copyright 2010 Time Warner Cable, Inc. All rights reserved.

| | NYC | GSO | OTHER |
|---|---|---|---|
| 0000 | NYC Subscriber Permitted Access Message 0000 | GSO Subscriber Permitted Access Message 0000 | |
| 0001 | NYC Subscriber Denied Access Message 0001 | GSO Subscriber Denied Access Message 0001 | It does not appear that you are currently subscribed to this content via MSO. Please visit http://www.website.com and click on CONTACT US to subscribe or answer any questions you may have |
| 0002 | NYC Subscriber Denied Fraud Detection Message 0002 | GSO Subscriber Denied Fraud Detection Message 0002 | You have too many active Authorizations from too many locations at this time. Please ensure your MSO login credentials are secure. Go to http://www.website.com and click on CONTACT US to answer any questions you may have. |
| 0003 | NYC Not Applicable Friendlies Trial Message 0003 | GSO Not Applicable Friendlies Trial Message 0003 | This system is currently only open to a limited number of TRIAL users and it does not appear you are on the list of trial users. If you believe you have gotten this message in error please follow the trouble shooting instructions included in your TRIAL notifications. |
| 0004 | NYC Not Applicable Market Trial Message 0004 | GSO Not Applicable Market Trial Message 0004 | This system is currently only open to a limited number of TRIAL markets and it does not appear you are in one of the trial markets. If you believe you have gotten this message in error please follow the trouble shooting instructions included in your TRIAL notifications. |
| 0005 | NYC Not Applicable Unknown Programmer Message 0005 | GSO Not Applicable Unknown Programmer Message 0005 | |
| 0006 | NYC Not Applicable Unknown Resource Message 0006 | GSO Not Applicable Unknown Resource Message 0006 | |
| 0007 | NYC Not Applicable Subscriber Identifier Message 0007 | GSO Not Applicable Subscriber Identifier Message 0007 | Your SubscriberId was not recognized. Try logging in again or Go to http://www.website.com and click on CONTACT US to answer any questions you may have. |
| 0008 | NYC Not Applicable Account Identifier Message 0008 | GSO Not Applicable Account Identifier Message 0008 | Your Account Number was not recognized. Try logging in again or Go to http://www.website com and click on CONTACT US to answer any questions you may have. |
| 0009 | NYC Not Applicable ResourceID not Associated with Programmer Message 0009 | GSO Not Applicable ResourceID not Associated with Programmer Message 0009 | |
| 0010 | NYC Not Applicable Too Many Resources specified with ALL Message 0010 | GSO Not Applicable Too Many Resources specified with ALL Message 0010 | |
| 0011 | NYC Not Applicable Unenumerated Validation Error Message 0011 | GSO Not Applicable Unenumerated Validation Error Message 0011 | |
| 0012 | NYC Indeterminate EIS Failure Message 0012 | GSO Indeterminate EIS Failure Message 0012 | Your request cannot be processed at this time but we are working to restore normal operation. Please try your request again later. If you still have questions or concerns please Go to http://www.website.com and click on CONTACT US |
| 0013 | NYC Indeterminate BILLING Failure Message 0013 | GSO Indeterminate BILLING Failure Message 0013 | Your request cannot be processed at this time but we are working to restore normal operation. Please try your request again later. If you still have questions or concerns please Go to http://www.website.com and click on CONTACT US |
| 0014 | NYC Indeterminate MiddleTier Failure Message 0014 | GSO Indeterminate MiddleTier Failure Message 0014 | Your request cannot be processed at this time but we are working to restore normal operation. Please try your request again later. If you still have questions or concerns please Go to http://www.website.com and click on CONTACT US |
| 0015 | NYC Indeterminate CVC OrgID Failure Message 0015 | GSO Indeterminate CVC OrgID Failure Message 0015 | Your request cannot be processed at this time but we are working to restore normal operation. Please try your request again later. If you still have questions or concerns please Go to http://www.website.com and click on CONTACT US |

APPENDIX K-continued

© Copyright 2010 Time Warner Cable, Inc. All rights reserved.

| | NYC | GSO | OTHER |
|---|---|---|---|
| 0016 | NYC Indeterminate ResourceID Translation Failure Message 0016 | GSO Indeterminate ResourceID Translation Failure Message 0016 | Your request cannot be processed at this time but we are working to restore normal operation. Please try your request again later. If you still have questions or concerns please Go to http://www.website.com and click on CONTACT US |
| 0017 | NYC Indeterminate SOA Config Restriction Failure Message 0017 | GSO Indeterminate SOA Config Restriction Failure Message 0017 | Your request cannot be processed at this time but we are working to restore normal operation. Please try your request again later. If you still have questions or concerns please Go to http://www.website.com and click on CONTACT US |
| 0018 | NYC Indeterminate Unenumerated SOA Failure Message 0018 | GSO Indeterminate Unenumerated SOA Failure Message 0018 | Your request cannot be processed at this time but we are working to restore normal operation. Please try your request again later. If you still have questions or concerns please Go to http://www.website.com and click on CONTACT US |

APPENDIX L

© Copyright 2010 Time Warner Cable, Inc. All rights reserved.

| Req Num | Requirement | Comments |
|---|---|---|
| PR-0010 | The average response time for QueryEntitlement must not exceed 2 seconds | All response times are measured from initial request to final response. For all response times in QA this is to be measured using 1000 or more random calls and in production this is measured as the average of all calls over a 24 hour or greater reporting period. |
| PR-0020 | The Maximum response time of QueryEntitlement must not exceed 5 seconds. | Any response time over 5 seconds will be considered an outage. |
| PR-0030 | QueryEntitlement Must initially support 300 transactions per second average in Production (500tps peak) | A load test at this level is expected in the production or a production like environment before turning up Production access for programmers. |
| PR-0040 | Query Entitlement must be scalable to 20,000 transactions per second average as defined by a series of quarterly forecasts provided to operations 3 months in advance of increased need. (subject to budget constraints). | |
| PR-0050 | Operations is responsible for providing 1TB of production SOA Config DB space to house CVC data feeds and is responsible for the production nightly loads of the nightly CVC Extracts in production. | |
| PR-0060 | Operations is responsible for providing 100 gb of DEV and QA space house CVC data feeds for two divisions (GSO, NYC) for development and testing purposes and for loading periodic feeds on a weekly to monthly basis. | |
| PR-0070 | Operations is responsible for providing 3TB of additional SOA logging DB space to account for the additional logging volumes from this service and tuning the database for appropriate performance (logged items must be available in the logging database within 5 minutes of being logged to the JMS queue). | |
| PR-0080 | CVC is responsible for providing periodic DEV and QA feeds for GSO and NYC divisions as well as providing nightly feeds for all divisions in Production as defined in the SDA Business Requirements Document (Sep09) | |

APPENDIX M

© Copyright 2010 Time Warner Cable, Inc. All rights reserved.

| Req Num | Requirement | Comments |
| --- | --- | --- |
| PR-0010 | Query Entitlement must have an up time of 99.99% measured on any period of not less than one day and not more than one year. (note this is for TRIAL purposes. | Any responses of Indeterminate are considered an outage. Any responses exceeding a maximum of 5 seconds response time are considered an outage. The sum total duration of all transactions having an indeterminate value or taking longer than 5 seconds will be added to the outage duration for any given period. |

APPENDIX N

© Copyright 2010 Time Warner Cable, Inc. All rights reserved.

| Req Num | Requirement | Comments |
| --- | --- | --- |
| OR-0010 | SOA must access "Services on Account" data and "Division Specific ServiceCode to EnterpriseServiceCode" mappings in a middle tier data store and NOT retrieve any information directly from the billing systems. | Scalability requirement. |
| OR-0020 | Prior to each release Development and Operations will meet with the BA to revise/update the List of Resources, and all mapping to/from those resources through to the Service code to resource mappings. | |

APPENDIX O

© Copyright 2010 Time Warner Cable, Inc. All rights reserved.

| Req Num | Requirement | Comments |
| --- | --- | --- |
| OR-0020 | The Service must provide a public XML interface to Constituents using SOAP over HTTPS | |

APPENDIX O-continued

© Copyright 2010 Time Warner Cable, Inc. All rights reserved.

| Req Num | Requirement | Comments |
| --- | --- | --- |
| OR-0030 | The Service must use a socket-based protocol when communicating with the ICOMS API. | |
| OR-0040 | The Service must communicate with the CSG Smartlink BOS interface via XML using HTTP over TCP/IP protocol. | |

APPENDIX P

© Copyright 2010 Time Warner Cable, Inc. All rights reserved.

| Req Num | Requirement | Comments |
| --- | --- | --- |
| SR-0010 | The Service must meet all MSO Security Compliance requirements for customer payments. | |
| SR-0020 | The Service must require encrypted data transfers from the Calling Constituent (but not between the back end systems) | It is assumed that all calling Constituents will call this service from outside the MSO firewall but backend calls will be behind MSO corporate firewalls. |

APPENDIX Q

© Copyright 2010 Time Warner Cable, Inc. All rights reserved.

| Req Num | Requirement | Comments |
| --- | --- | --- |
| MR-0010 | Logging must occur for both the request and response XML of this Service. | |
| MR-0020 | Logging information must be recorded such that transaction usage volumes can be reported upon by calling Constituent. | |
| MR-0030 | Logging information must be recorded such that the time in milliseconds for the Request, Response, and Producing Constituent processing time can be reported. | Producing Constituents for this service include CSG and ICOMS. |
| MR-0040 | The system must satisfy all Logging requirements outlined in SOA Logging Requirements Document | |
| MR-0050 | The production SOA DB Logging system must be up 99.99% of the time | |

APPENDIX Q-continued

© Copyright 2010 Time Warner Cable, Inc. All rights reserved.

| Req Num | Requirement | Comments |
| --- | --- | --- |
| MR-0060 | The QE service must log the following business keys as part of this services log entries:<br>a) SubscriberID (NEW)<br>b) AccountNumber<br>c) DivisionId<br>d) Constituent<br>e) ServiceName<br>f) Response (NEW)<br>g) Reason (NEW)<br>h) IP (NEW) | |
| MR-0070 | Query Entitlement must be monitored such that an operational alert is generated whenever there are a configurable number of consecutive errors occur in any of the following categories:<br>a) From a particular Programmer<br>b) For a particular Division<br>c) For a particular Resource<br>d) Any single SOA error code<br>e) Transactions > max permitted transaction time | The initial value for each of these categories is 5 This is the suggested value for TRIAL and would be raised for production based on expected transaction volumes. Alternatively just raise an alert when more than a given number of exceptions occurred (of any type) in a given period of time for a given service. |
| MR-0080 | QueryEntitlement must be issued a health check transaction every configurable number of minutes. | The initial value is 10 minutes. If the health check fails an outage will be calculated for the time between the last successful transaction before the health check and the next successful transaction after the health check. |
| MR-0090 | Daily, Weekly, and Monthly outage reports must be generated for QueryEntitlement totaling the outage duration and % for the reports given period. | Daily reports will be generated before noon on a given day and report on the 24 hour period of the preceding day. Weekly Reports will be generated before noon every Sunday and report on the preceding 7 days Monthly reports will be generated before noon on the first of each month and report on the preceding month. |
| MR-0100 | Operations must create a trouble ticket for any operational alert within 10 minutes 95% of the time, deliver an initial "acknowledgement" of the ticket within 10 minutes @ 95% of the time, provide status updates to a pre-define distribution list every 15-30 minutes @ 95% of the time, and resolve issues within 60 minutes of ticket submission @ 95% of the time. | |
| MR-0110 | Any Outage(s) resulting in non compliance with operational up time shall cause a post mortem to be convened in order to identify the root cause of the issue and produce a costed scheduled plan to correct it in a future release of the service. | 99.999% permits about 9 hours of down time a year and 99.99% permits about 90 hours of down time a year. |
| MR-0120 | Operations will provide daily, weekly, and monthly SOA Service Summary Logging Report by Service Reports (see sample below) to business owners of TVE | Fields and definitions in these reports are taken from the SOA Logging Requirements Document Reporting section. |

APPENDIX Q-continued

© Copyright 2010 Time Warner Cable, Inc. All rights reserved.

| Req Num | Requirement | Comments |
| --- | --- | --- |
| MR-0130 | Operations will provide daily, weekly, and monthly SOA Service Summary Logging Report by Service Reports (see sample below) to business owners of TVE for the Query Entitlement Service | Fields and definitions in these reports are taken from the SOA Logging Requirements Document Reporting section. |
| MR-0140 | Operations will provide daily, weekly, and monthly SOA Service Summary Logging Report by Service by Constituent (see sample below) to business owners of TVE for the Query Entitlement Service | Fields and definitions in these reports are taken from the SOA Logging Requirements Document Reporting section. |
| MR-0150 | Operations will provide daily, weekly, and monthly SOA Query Entitlement Response Summary by Programmer Reports (see sample below) to business owners of TVE for the Query Entitlement Service | Fields and definitions in these reports are taken from the SOA Logging Requirements Document Reporting section. |
| MR-0160 | Operations will provide daily, weekly, and monthly SOA Summary—Transaction Volumes by Service By Hour of Day Reports (see sample below) to business owners of TVE for the Query Entitlement Service | Fields and definitions in these reports are taken from the SOA Logging Requirements Document Reporting section. |

APPENDIX R

© Copyright 2010 Time Warner Cable, Inc. All rights reserved.

Sample SOA Service Summary Logging Report by Service

| SOA Service Summary Logging Report by Service | Jun. 01, 2009-Jun. 07, 2009 |
| --- | --- |
| Query Entitlement | |

| | |
| --- | --- |
| Average total successful service call duration | 1.5 Seconds |
| Average total successful service call wait | 1 Seconds |
| Percentage wait/duration | 66.67% |
| Average total unsuccessful service call duration | 1.2 Seconds |
| Percentage unsuccessful Duration/successful Duration | 80.00% |
| Number of successful transactions | 120,960,000 Transactions |
| Percentage successful transactions | 95.24% |
| Number of unsuccessful transactions | 6,048,000 Transactions |
| Percentage unsuccessful transactions | 4.76% |

SOA Service Summary Logging Report by Service by Constituent

| SOA Service Summary Logging Report by Service by Constituent | Jun. 01, 2009-Jun. 07, 2009 |
| --- | --- |
| Query Entitlement | |
| Turner Broadcasting | |

| | |
| --- | --- |
| Average total successful service call duration | 1.4 |
| Average total successful service call wait | 0.9 |
| Percentage wait/duration | 71.43% |
| Average total unsuccessful service call duration | 1.2 |
| Percentage unsuccessful Duration/successful Duration | 85.71% |
| Number of successful transactions | 79,833,600 |
| Percentage successful transactions | 97.09% |
| Number of unsuccessful transactions | 2,395,008 |
| Percentage unsuccessful transactions | 2.91% |
| NBCU | |
| Average total successful service call duration | 1.6 |
| Average total successful service call wait | 1.2 |

APPENDIX R-continued

© Copyright 2010 Time Warner Cable, Inc. All rights reserved.

| | |
| --- | --- |
| Percentage wait/duration | 75.00% |
| Average total unsuccessful service call duration | 1.2 |
| Percentage unsuccessful Duration/successful Duration | 80.00% |
| Number of successful transactions | 39,916,800 |
| Percentage successful transactions | 95.24% |
| Number of unsuccessful transactions | 1,995,840 |
| Percentage unsuccessful transactions | 4.76% |

APPENDIX S

© Copyright 2010 Time Warner Cable, Inc. All rights reserved.

| Req Num | Requirement | Comments |
| --- | --- | --- |
| DR-0010 | The system must support DR that that provides continuous normal operations with the partial or complete failure of any single data center. | |
| DR-0020 | The System must support DR that provides for the reestablishment of normal operations within 30 days after the partial or complete failure of multiple data centers. | |

What is claimed is:

1. An apparatus of a managed content distribution network configured to enable distribution of protected content to a subscriber of said managed content distribution network via an unmanaged content distribution network, said apparatus comprising:

a first interface configured to communicate with a third party content source within said unmanaged network yet affiliated to said managed content distribution network, said affiliation being identified via utilization of a uniform description language; and a storage apparatus configured to store at least one computer program thereon, said at least one computer program comprising a plurality of instructions configured to, when executed by a processor, cause said apparatus of said managed content distribution network to:

receive a request for said protected content from said third party content source, said request being rendered in said uniform description language and comprising at least network login information specific to said subscriber of said managed content distribution network;

utilize at least portions of said network login information to access a subscriber database maintained by said managed content distribution network to determine whether said subscriber associated with said network login information is entitled to access said requested protected content; and issue a message in said uniform description language to said third party content source to authorize or deny delivery of said requested protected content to said subscriber;

wherein when said delivery is authorized, said third party content source being further configured to deliver said content to said subscriber; and wherein when said delivery is denied, said third party content source being further configured to provide a message in said uniform description language to said subscriber that indicates said denial.

2. The apparatus of claim 1, wherein said third party content source comprises a website, said unmanaged content distribution network comprises an Internet, and said subscriber logs into said website via said network login information specific to said subscriber of said managed network in order to cause said communication to be sent to said managed network.

3. The apparatus of claim 1, wherein said request for said protected content from said third party content source is carried over at least a portion of said managed content distribution network, and wherein said delivery of said content to said subscriber comprises delivery over at least a portion of said unmanaged content distribution network.

4. The apparatus of claim 1, wherein said request from said subscriber is issued via a mobile device associated with said subscriber yet not registered with, known to, or in communication with said managed content distribution network.

5. A method of enabling distribution of protected content to a subscriber of a managed network via an unmanaged content distribution network, said method comprising:

receiving, at a content server, a request for said protected content from a third party content source within said unmanaged content distribution network yet affiliated to said managed network, said request being rendered in a uniform description language and comprising at least network login information specific to said subscriber of said managed network;

utilizing, at said content server, at least portions of said network login information to access a subscriber database maintained by said managed network to determine whether said subscriber associated with said network login information is entitled to access said requested protected content; and issuing, at said content server, a message in said uniform description language to said third party content source authorizing or denying delivery of said requested protected content to said subscriber;

wherein when said delivery is authorized, said third party content source being further configured to deliver said content to said subscriber; and wherein when said delivery is denied, said third party content source being further configured to provide a message in said uniform description language to said subscriber that indicates said denial.

6. The method of claim 5, wherein said third party content source comprises a website, said unmanaged content distribution network comprises an Internet, and said subscriber logs into said website using said network login information specific to said subscriber of said managed network in order to cause said request to be sent to said managed network.

7. The method of claim 5, wherein said request for said protected content from said third party content source is carried over at least a portion of said managed network, and wherein said delivery of said content to said subscriber comprises delivery over at least a portion of said unmanaged content distribution network.

8. The method of claim 5, wherein said request from a subscriber is issued using a mobile device associated with said subscriber yet not registered with, known to, or in communication with said managed network.

9. The method of claim 5, further comprising authenticating said third party entity using at least a Security Assertion Markup Language (SAML) exchange.

10. The method of claim 9, further comprising authenticating said third party entity using at least an eXtensible Access Control Markup Language (XACML)-based digitally signed certificate and a Common Secure Interoperability (CSI) session.

11. The method of claim 5, wherein said request is issued using consumer premises equipment (CPE) registered within said managed network and in operative communication therewith.

12. The method of claim 5, wherein said delivery occurs without using said managed network.

13. A non-transitory computer readable apparatus having a storage medium, said medium comprising at least one computer program configured to enable distribution of protected content to a subscriber of a managed network via an unmanaged content distribution network, said at least one program comprising a plurality of instructions configured to, when executed, cause said apparatus to:

receive a request for said protected content from a third party content source within said unmanaged content distribution network yet affiliated to said managed network, said request being rendered in a uniform description language and comprising at least network login information specific to said subscriber of said managed network;

utilize at least portions of said network login information to access a subscriber database maintained by said managed network to determine whether said subscriber associated with said network login information is entitled to access said requested protected content; and issue a message in said uniform description language to said third party content source to authorize or deny delivery of said requested protected content to said subscriber;

wherein when said delivery is authorized, said third party content source being further configured to deliver said content to said subscriber; and wherein when said delivery is denied, said third party content source being further configured to provide a message in said uniform description language to said subscriber that indicates said denial.

14. The apparatus of claim 13, wherein said third party content source comprises a website, said unmanaged content distribution network comprises an Internet, and said subscriber logs into said website via said network login information specific to said subscriber of said managed network in order to cause said request to be sent to said managed network.

15. The apparatus of claim 13, wherein said request for said protected content from said third party content source is carried over at least a portion of said managed network, and wherein said delivery of said content to said subscriber comprises delivery over at least a portion of said unmanaged content distribution network.

16. The apparatus of claim 13, wherein said request from a subscriber is issued via a mobile device associated with said subscriber yet not registered with, known to, or in communication with said managed network.

17. The apparatus of claim 13, wherein said plurality of instructions are further configured to, when executed, authenticate said third party entity using at least a Security Assertion Markup Language (SAML) exchange.

18. The apparatus of claim 17, wherein said plurality of instructions are further configured to, when executed, authenticate said third party entity using at least an eXtensible Access Control Markup Language (XACML)-based digitally signed certificate and a Common Secure Interoperability (CSI) session.

19. The apparatus of claim 13, wherein said request is issued by use of a consumer premises equipment (CPE) registered within said managed network and in operative communication therewith.

20. The apparatus of claim 13, wherein said delivery occurs without use of said managed network.

* * * * *